United States Patent
Kaku et al.

(10) Patent No.: US 7,974,467 B2
(45) Date of Patent: Jul. 5, 2011

(54) IMAGE-TAKING SYSTEM

(75) Inventors: Toshihiko Kaku, Kanagawa (JP);
Masashi Shirata, Kanagawa (JP);
Masahiro Kubo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1306 days.

(21) Appl. No.: 11/547,128

(22) PCT Filed: Mar. 8, 2006

(86) PCT No.: PCT/JP2006/304488
§ 371 (c)(1),
(2), (4) Date: Oct. 4, 2006

(87) PCT Pub. No.: WO2006/095779
PCT Pub. Date: Sep. 14, 2006

(65) Prior Publication Data
US 2007/0200938 A1    Aug. 30, 2007

(30) Foreign Application Priority Data

Mar. 10, 2005 (JP) .................................. 2005-067929
Mar. 10, 2005 (JP) .................................. 2005-067943

(51) Int. Cl.
*G06K 9/00* (2006.01)
*G06K 9/34* (2006.01)

(52) U.S. Cl. ........................................ 382/167; 382/173
(58) Field of Classification Search .................... 382/167
See application file for complete search history.

(56) References Cited

U.S. PATENT DOCUMENTS

| | | | |
|---|---|---|---|
| 6,088,541 A * | 7/2000 | Meyer | 396/155 |
| 6,490,006 B1 * | 12/2002 | Monjo | 348/587 |
| 7,071,953 B2 | 7/2006 | Matsuoka et al. | |
| 2003/0085907 A1 | 5/2003 | Matsuoka et al. | |
| 2004/0114193 A1 * | 6/2004 | Inage et al. | 358/302 |
| 2007/0133880 A1 * | 6/2007 | Sun et al. | 382/195 |
| 2007/0252900 A1 * | 11/2007 | Iwaki et al. | 348/222.1 |
| 2009/0119808 A1 * | 5/2009 | Giakos | 850/31 |

(Continued)

FOREIGN PATENT DOCUMENTS

EP    0 756 419 A1    1/1997

(Continued)

OTHER PUBLICATIONS

International Preliminary Report on Patentability issued in corresponding application PCT/JP2006/304488. mailed Sep. 20, 2007.

(Continued)

*Primary Examiner* — Brian P Werner
*Assistant Examiner* — Nirav G Patel
(74) *Attorney, Agent, or Firm* — Sughrue Mion, PLLC

(57) ABSTRACT

An image-taking system includes an image-taking device which takes an image of a subject; a flashing device which emits a flash to the subject; an illumination device which has a surface positioned opposite the image-taking device and which illuminates the subject interposed between the image-taking device and the surface with light emitted from the surface. The system further includes a background replacement device which acquires a plurality of images of the subject taken by the image-taking device under a respective plurality of image-taking-light conditions created by the flashing device and the illumination device, discriminates between the subject and a background in a taken image based on the acquired images, and replaces the background with another background.

6 Claims, 55 Drawing Sheets

U.S. PATENT DOCUMENTS

2009/0153873 A1 * 6/2009 Chan et al. .................. 356/495

FOREIGN PATENT DOCUMENTS

| EP | 1 100 262 A1 | 5/2001 |
|---|---|---|
| JP | 07-046606 A | 2/1995 |
| JP | 8-65705 A | 3/1996 |
| JP | 10-093859 A | 4/1998 |
| JP | 10-210340 A | 8/1998 |
| JP | 10-257518 A | 9/1998 |
| JP | 2000-030040 A | 1/2000 |
| JP | 2000-224410 A | 8/2000 |
| JP | 2000-354202 A | 12/2000 |
| JP | 2001-197352 A | 7/2001 |
| JP | 2002-325200 A | 11/2002 |
| JP | 2003-58873 A | 2/2003 |
| JP | 2004-046776 A | 2/2004 |
| JP | 2004-282167 A | 10/2004 |
| JP | 2004-295423 A | 10/2004 |
| JP | 2005-003463 A | 1/2005 |
| WO | 94/26057 A1 | 11/1994 |

OTHER PUBLICATIONS

EP Communication, dated Dec. 15, 2009, issued in corresponding EP Application No. 06715408.8, 6 pages.

JP Notification of Reasons for Refusal, dated Jul. 27, 2010, issued in corresponding JP Application No. 2007-507155, 16 pages in English and Japanese.

* cited by examiner

M2  M3  M1

M2  M3  M1

IMAGE-TAKING SYSTEM

TECHNICAL FIELD

The present invention relates to an image-taking system which takes an image of a subject and replaces the background portion in the taken image with another background, and generates a background-replaced image.

BACKGROUND ART

Conventionally, a background screen is used in taking an image in a photo studio, etc. However, in such image taking, a large background screen is used to generate a sufficient background, and a large image taking space is required. Furthermore, it also requires a laborious operation in exchanging a background screen, etc., and results in a costly image-taking process.

In this situation, it is desired to develop a small image-taking system which requires no large background screen or image taking space as in the conventional techniques so that a user can more easily enjoy taking images. In such a small image-taking system, since an image is taken in front of a provisional background in place of the background screen, it is proposed to perform a background replacing process of replacing a background in a taken image obtained by an image-taking process with a background desired by a client.

As an example of a technique of the background replacing process, for example, an image of a subject is taken with a background panel, etc. painted blue, etc. as a background of the subject, a portion of the same color as the background panel and a portion of a different color are discriminated from each other respectively as the background and the subject in the image obtained in the image-taking process, and the portion discriminated as the background in the taken image is replaced with a desired background. This process is known as a chroma key process.

In this chroma key process, when the shadow of the subject is taken on the background panel in the taken image, the shadow can prevent the subject from being discriminated from the background. Accordingly, a technique of taking an image is proposed (for example, refer to the patent document 1) using a background panel which emits light from a surface thereof as a background when an image as a target of the chroma key process is to be taken with the shadow of the subject on the background panel suppressed by the light emitted by the background panel. Furthermore, the patent document 1 also proposes a process of combining a portion discriminated as a subject with a desired background in the chroma key process by adjusting the color tone of the portion discriminated as the subject into the color tone depending on the color tone of the desired background, thereby generating a composite image in which the subject appears naturally with the desired background.

There is also a technique of taking an image of a subject in an open place as the background of the subject such as an outdoor background, etc. under two illumination conditions of the state in which the illumination is turned on toward the subject and the state in which the illumination is turned off, acquiring two taken images, discriminating in the two taken images the portions indicating different brightness levels from the portions indicating similar brightness levels as the subjects and the backgrounds of the taken images, respectively, and replacing the portion discriminated as the background in the taken image with a desired background (for example, refer to the patent document 2).

[Patent Document 1]
Japanese Patent Laid-Open No. 2000-224410 (pages 3 to 10, FIG. 3)
[Patent Document 2]
Japanese Patent Laid-Open No. 10-210340 (pages 2 to 3, FIG. 1)

To replace the background in a taken image with a desired background, it is necessary to appropriately discriminate between a subject in the taken image obtained in an image-taking process and its background. However, when a subject in a taken image includes a portion of the same color as a background panel in the technique described in the patent document 1 or used in the general chroma key process, the portion is erroneously recognized as a background, and there is the possibility that an unnatural background-replaced image can be generated by replacing a part of the subject replaced with the desired background.

In the technique described in the Patent Document 2, since a subject is discriminated from its background based on the brightness in the taken image, there is no possibility that a portion of the same color as its background can be erroneously recognized as a background. However, in a small desired image-taking system in which a user can enjoy taking a picture in a photo studio, etc., it is inevitable that image taking equipment such as a background panel, etc. is placed at the back of a subject. If the technique of the patent document 2 is applied to such a desired small image-taking system, the illuminating light emitted to the subject is reflected by the image taking equipment. As a result, in the two taken images obtained by the technique of the patent document 2, there is the possibility that other portions than a subject can have different brightness values, causing part of the background to be erroneously recognized as part of the subject, thereby generating an unnatural background-replaced image in which the part of the background is not replaced.

For example, in a taken image including the image of a person, there is the probability that the background appears through the hair of the person around the boundary between the head portion of the person and the background. When the clothes of the person is made of, for example, translucent fabric, there can be the possibility that the background appears through the translucent fabric around the boundary between the person and the background. Thus, there are cases in which a boundary between a subject and its background in a taken image includes an intermediate portion that cannot be clearly discriminated as the subject or the background. For example, when an intermediate portion is automatically discriminated as a background and replaced with a desired background, an unnatural background-replaced image in which a part of the subject is missing can be generated. If such an intermediate portion is automatically discriminated as a subject, an unnatural background-replaced image in which the intermediate portion contains the old background can be generated.

The present invention has been developed to solve the problems above, and it is an object of the present invention to provide an image-taking system capable of taking an image of a subject, acquiring a taken image, and generating a background-replaced image in which the background in the taken image is naturally replaced with a desired background.

DISCLOSURE OF THE INVENTION

The first image-taking system according to the present invention, which attains the above object includes:
an image-taking device which takes an image of a subject;
a flashing device which emits a flash to the subject;

an illumination device which has a surface positioned opposite the image-taking device and which illuminates the subject interposed between the image-taking device and the surface with light emitted from the surface; and a background replacement device which acquires a plurality of images of the subject taken by the image-taking device under a respective plurality of image-taking-light conditions created by the flashing device and the illumination device, discriminates between the subject and a background in a taken image based on the acquired images, and replaces the background with another background.

To generate the background-replaced image, a taken image containing a subject based on which the background-replaced image is generated is required. However, since such an image is taken under an image-taking-light condition defined for a clearly taken subject, it is often difficult to discriminate between the subject and its background in the taken image based on the taken image itself without erroneous recognition. Therefore, to generate a background-replaced image naturally appearing to a viewer, it is desired that there are plural images respectively taken under the different plural image-taking-light conditions including the taken image in which an image of a subject is clearly taken. Additionally, it is desired that the plural image-taking-light conditions are extreme conditions such as a normal illumination state, a counter-illumination state, etc.

According to the first image-taking system of the present invention, various extreme image-taking-light conditions such as a normal illumination state in which a subject is illuminated from the image-taking device side, a counter-illumination state in which a subject is illuminated from the opposite side of the image-taking device, etc. can be easily created using two light sources of the flashing device and the illumination device. That is, in the first image-taking system, plural taken images significant in generating a background-replaced image appearing natural to a viewer can be easily obtained, and a background-replaced image in which the background is naturally replaced with a desired another background can be generated using the taken images.

In the first image-taking system of the present invention, preferably, "the image-taking device takes the plurality of images of the subject by performing an image-taking process a plurality of times in a predetermined time."

In the plural taken images in the first image-taking system according to the present invention, it is difficult to discriminate between a subject and its background in a taken image if the position and the pose of the subject are different. In the first image-taking system in this preferable configuration, an image of a subject movable during shooting such as a person, an animal, etc. except a stationary subject is taken plural times in a predetermined time. That is, when the subject is continuously taken, plural taken images of the same positions and poses of the subject can be obtained.

Furthermore, in the first image-taking system according to the present invention, it is also preferable that "the illumination device illuminates the subject using a flexible light-emitting sheet."

Since the light-emitting sheet can be easily set as a background of a subject, the first image-taking system according to the present invention can be easily configured using the light-emitting sheet.

Also in the first image-taking system according to the present invention, it is preferable that "the illumination device illuminates the subject positioned between the illumination device and the image-taking device using a light-emitting sheet extending from a side opposite the image-taking device to a bottom of the subject."

In the first image-taking system in this preferable configuration, a subject can be illuminated in a wide range from the back to the bottom of the subject. Therefore, the subject can be discriminated from its background in a taken image in which the entire subject is captured, and the background can be replaced.

In addition, the first image-taking system according to the present invention, it is also preferable that "the illumination device illuminates the subject using a dispersed electroluminescence element."

The dispersed electroluminescence element is flexible and sheet-shaped light emitter, and is very appropriate as a source of the illumination device.

In the first image-taking system according to the present invention, it is also preferable that "the illumination device comprises a marker indicating a range of the surface."

In the first image-taking system in this preferable configuration, a distortion of the shape of a taken image caused due to the positional relationship between the image-taking device and the subject can be corrected based on the marker in the taken image. Furthermore, by performing image processing such as retrieving only an image in the range indicated by the marker in the taken image as a significant image, an unnecessary portion at the edge etc. of a taken image can be removed.

In the first image-taking system according to the present invention, it is also preferable that "the illumination device illuminates the subject with light of a blue color through a green color."

In the first image-taking system in this preferable configuration, the light of blue to green color, that is, the light of the wavelength of 400 to 530 nm illuminates the subject, and a taken image having the background of blue to green color is obtained. Since the color from blue to green is a complementary color of the flesh color of a person, the subject can be discriminated from the background in the taken image at a high probability when the image of the person is taken as a subject in the first image-taking system in this preferable configuration. Furthermore, using a complementary color, the process of estimating the color of a subject and the color of a background can be performed with high precision on pixels near the boundary between the subject and the background.

In the first image-taking system according to the present invention, it is also preferable that "the illumination device illuminates the subject with light of brightness equal to or lower than brightness of a flash emitted by the flashing device."

In the first image-taking system in this preferable configuration, when the flashing device emits a flash, an image of the subject is taken using the flash in the normal illumination state regardless of the presence/absence of the illumination device, and a taken image of desired quality can be obtained.

Furthermore, in the first image-taking system according to the present invention, it is also preferable that "the flashing device requires a predetermined preparation time to emit a next flash after emitting one flash, and the image-taking device obtains the plurality of images of the subject by performing an image-taking process a plurality of times in the preparation time."

In the image-taking device according to this preferable configuration, the flashing device can emit light only once when the image-taking device performs an image-taking process two ore more times. Thus, plural images taken under quite different plural conditions such as the normal illumination state, the counter-illumination state, etc. significant in generating a natural background-replaced image can be easily obtained.

In the first image-taking system according to the present invention, it is also preferable that "the illumination device comprises a color filter transmitting light from the surface," and that "the illumination device comprises a color filter transmitting light from the surface and having a same color as a color of the light."

In the first image-taking system in these preferable configurations, the main color of the background in the taken image becomes the color of the color filter regardless of the presence/absence of illumination by a flash of the flashing device. Therefore, by use of a color filter having a color clearly different from the color of the flash, even when, for example, the color of the flash is mixed in the subject in the taken image, it is possible to discriminate between the subject and the background in the taken image with further reliability. Further, according to the latter configuration, it is possible to suppress attenuation of the amount of light emitted from the surface caused by use of the color filter.

In the first image-taking system according to the present invention, it is also preferable that "the illumination device comprises a reflection-preventing film that prevents reflection of light coming from the subject side to the surface."

In the first image-taking system in this preferable configuration, the reflection-preventing film prevents reflection of the flash on the surface. Accordingly, it is possible to prevent with reliability both the subject and the surface from becoming the same color as the color of the flash in the taken image due to the flash being reflected on the subject and the surface.

In the first image-taking system according to the present invention, it is also preferable that "the background replacement device recognizes a range of the surface in the taken image based on presence/absence of light from the surface and discriminates between the subject and the background in the taken image by use of image portions within the range."

In the first image-taking system in this preferable configuration, it is possible to remove unnecessary portions appearing at the edges of the taken image by performing image processing for extracting only the image portions in the taken image as a significant image.

The second image-taking system according to the present invention, which achieves the above object includes:

an image-taking device which takes an image of a subject;
an image-taking-condition creating section which creates a plurality of image-taking conditions relating to light; and
a background replacement device which acquires a plurality of images of the subject taken by the image-taking device under a respective plurality of image-taking conditions created by the image-taking-condition creating section, discriminates among a subject area, a background area and a boundary area in a taken image based on the acquired images, and replaces a background in the taken image with another background based on the three discriminated areas.

In the second image-taking system according to the present invention, the image-taking-condition creating section creates plural image-taking conditions about light such as a normal illumination state in which a subject is illuminated from the image-taking device side and a counter-illumination state in which a subject is illuminated from the opposite side of the image-taking device. Based on the plural taken images respectively taken under the plural image-taking conditions, the subject area, the background area and the boundary area in the taken image can be discriminated. Thus, a portion that cannot be easily discriminated as part of a subject or as part of a background such as a portion of the background seen through the hair of a person can be discriminated as a boundary area that belongs to neither the subject area nor the background area. On the boundary area, an appropriate replacing process for boundary area is performed and as a result, a background-replaced image that appears natural to the viewer can be generated. That is, according to the second image-taking system of the present invention, the image of a subject is obtained by shooting and a background-replaced image in which the background in the taken image is naturally replaced with a desired background can be generated.

In the second image-taking system according to the present invention, it is preferable that "the image-taking-condition creating section creates the plurality of image-taking conditions by changing a level of a difference between brightness of a background positioned opposite the image-taking device and brightness of the subject interposed between the background and the image-taking device, and the background replacement device discriminates among the subject area, the background area and the boundary area based on an amount of brightness variance among the plurality of taken images."

The "level of a difference between brightness of a background positioned opposite the image-taking device and brightness of the subject interposed between the background and the image-taking device" may be the difference between the brightness of the subject and the brightness of the background, or may be the ratio of the brightness of the subject to the brightness of the background.

In the second image-taking system in this preferable configuration, the image-taking-condition creating section, for example, changes the brightness of light illuminating the subject and changes the brightness of light emitted from the background. In this method, the level of the difference in brightness, ratio, etc. between the subject and the background is changed in the image-taking system, and the plural image-taking conditions are created. Further, according to this preferable configuration, in the plural taken images respectively taken under plural image-taking conditions having mutually different levels of difference between the brightness of subject and the brightness of background, the subject area, the background area and the boundary area can be appropriately discriminated by discriminating the portion in which the brightness levels are equal, the portion in which the brightness levels are quite different, and the portion in which the brightness levels are moderately different.

In the second image-taking system according to the present invention, it is also preferable that "the image-taking-condition creating section creates the plurality of image-taking conditions by changing a level of a difference between brightness of a background positioned opposite the image-taking device and brightness of the subject interposed between the background and the image-taking device, and the background replacement device discriminates among the subject area, the background area and the boundary area based on a difference between brightness of the subject and brightness of the background."

In the second image-taking system in this preferable configuration, for example, an image-taking condition in which the level of the difference in brightness between subject and background is extremely large is created, an image is taken under such a condition, and the subject area, the background area, and the boundary area in the taken image can be appropriately discriminated by discriminating among a relatively bright area, a relatively dark area and a moderately bright area.

There are described above the two preferable configurations in which the image-taking-condition creating section changes the level of the difference in brightness between the background positioned opposite the image-taking device and the subject interposed between the image-taking device and the background, and creates the plural image-taking conditions. In the description below, an image-taking system in these two configurations will be generally referred to as a "brightness-changing image-taking system".

In the second image-taking system according to the present invention, it is also preferable that "the image-taking-condition creating section comprises an illumination device which has a surface positioned opposite the image-taking device and illuminates the subject interposed between the image-taking device and the surface with light from the surface, and the image-taking-condition creating section creates the plurality of image-taking conditions by changing brightness of the light from the illumination device illuminating the subject, and the background replacement device discriminates among the subject area, the background area and the boundary area based on at least one of an amount of brightness variance among the plurality of taken images and a difference in brightness between the subject and the background." This is an example of the "brightness-changing image-taking system."

In the second image-taking system in this preferable configuration, the illumination device has the function of changing the brightness of the background, and by changing the brightness of the background by the illumination device, it is possible to readily create in a small space plural image-taking conditions in which the respective levels of difference between subject and background are mutually different.

Furthermore, in the second image-taking system according to the present invention, it is also preferable that "the image-taking-condition creating section comprises: a flashing device which illuminates the subject with a flash from the image-taking device side; and an illumination device which has a surface positioned opposite the image-taking device and illuminates the subject interposed between the image-taking device and the surface with light from the surface, and the image-taking-condition creating section creates the plurality of image-taking conditions by allowing the flashing device and the illumination device to sequentially illuminate the subject, and the background replacement device discriminates among the subject area, the background area and the boundary area based on at least one of an amount of brightness variance among the plurality of taken images and a difference in brightness between the subject and the background."

Further, in the second image-taking system according to the present invention, it is also preferable that "the image-taking-condition creating section comprises: a flashing device which illuminates the subject with a flash from the image-taking device side; and an illumination device which has a surface positioned opposite the image-taking device and illuminates the subject interposed between the image-taking device and the surface with light from the surface, and the image-taking-condition creating section creates the plurality of image-taking conditions based on constant existence of illumination by the illumination device and presence/absence of illumination by a flash of the flashing device, and the background replacement device discriminates among the subject area, the background area and the boundary area based on at least one of an amount of brightness variance among the plurality of taken images and a difference in brightness between the subject and the background." The systems in these preferable configurations are also examples of the "brightness-changing image-taking system."

In the second image-taking system in these preferable configurations, the flashing device and the background panel have the functions of changing the brightness of the subject and the brightness of the background, respectively. According to the image-taking system in the former configuration, it is possible to create plural image-taking conditions having mutually different levels of difference between the brightness of subject and the brightness of background, by changing the brightness of both the subject and the background by allowing the flashing device and the illumination device to sequentially illuminate the subject with light. Meanwhile, according to the image-taking system in the latter configuration, it is possible to create plural image-taking conditions having mutually different levels of difference between the brightness of subject and the brightness of background, by changing the brightness of the subject based on constant existence of illumination by the illumination device and presence/absence of illumination by a flash of the flashing device.

Still furthermore, in the second image-taking system according to the present invention, it is also preferable that "the image-taking-condition creating section comprises: a flashing device which illuminates the subject with a flash from the image-taking device side and is capable of changing a polarization state of the flash; and a background panel which is positioned opposite the image-taking device with the subject interposed between the image-taking device and the background panel and varies brightness of reflected light depending on a polarization state, and the image-taking-condition creating section creates the plurality of image-taking conditions by using a plurality of flashes having mutually different polarization states emitted from the flashing device, and the background replacement device discriminates among the subject area, the background area and the boundary area based on at least one of an amount of brightness variance among the plurality of taken images and a difference in brightness between the subject and the background." This is also an example of the "brightness-changing image-taking system."

In the second image-taking system in this preferable configuration, the flashing device and the background panel both have the function of changing the brightness of the background. According to the image-taking system in this preferable configuration, the flashing device emits a flash plural times in different polarization states, and the brightness of the reflected light on the background panel changes depending on the polarization state of each flash, thereby changing the brightness of the background. Thus, it is possible to create plural image-taking conditions having mutually different levels of difference between the brightness of subject and the brightness of background.

In the second image-taking system according to the present invention, it is also preferable that "the image-taking-condition creating section creates the plurality of image-taking conditions by changing a color of a background positioned opposite the image-taking device with the subject interposed between the image-taking device and the background, and the background replacement device discriminates among the subject area, the background area and the boundary area based on an amount of color variance among the plurality of taken images."

In the second image-taking system in this preferable configuration, the subject area, the background area and the boundary area in the taken image can be appropriately discriminated by discriminating among the portion in which colors are the same, the portion in which colors are quite different, and the portion in which colors are moderately different in plural taken images respectively taken under plural image-taking conditions in which the respective colors of the background are mutually different.

In the second image-taking system according to the present invention, it is also preferable that "the image-taking-condition creating section creates the plurality of image-taking conditions by changing a color of a background positioned opposite the image-taking device with the subject interposed between the image-taking device and the background, and the background replacement device discriminates among the subject area, the background area and the boundary area based on an amount of color variance among the plurality of taken images." The system in this configuration is a typical example of the image-taking system that takes plural images under plural image-taking conditions in which the respective colors of the background are mutually different.

In the second image-taking system in this preferable configuration, plural desired image-taking conditions can be easily created in a small space by use of the background panel.

In the second image-taking system according to the present invention, it is also preferable that "the image-taking-condition creating section comprises: a flashing device which illuminates the subject with a flash from the image-taking device side; and an illumination device which has a surface positioned opposite the image-taking device and illuminates the subject interposed between the image-taking device and the surface with light from the surface having light intensity equal to or lower than brightness of the flash, and the image-taking-condition creating section creates the plurality of image-taking conditions based on constant existence of illumination by the illumination device and presence/absence of illumination by a flash of the flashing device, the image-taking device takes an image under such an image-taking condition that a flash from the flashing device is present by increasing sensitivity to light to a level higher than when taking an image under such an image-taking condition that a flash from the flashing device is absent, and the background replacement device discriminates among the subject area, the background area and the boundary area based on at least one of an amount of brightness variance among the plurality of taken images and a difference in brightness between the subject and the background."

At shooting in a state in which light is normally illuminated by the flash, for example, it is possible to illuminate the subject with a flash whose light amount is extremely larger than that of fixed illumination by the illumination device and therefore, it is possible to prevent light of the fixed illumination from coming out on the subject part in an image. In such image taking, sensitivity to light in the image-taking device needs to be a lower level according to the light amount of the flash. However, use of such a lower sensitivity level will cause a shortage of sensitivity when an image is taken in a counter-illumination state using only the fixed illumination. According to the image-taking system in this preferable configuration, it is possible to take an image with a sensitivity level suitable for each of the normally-illumination state and the counter-illumination state because the sensitivity to light in the image-taking device is appropriately changed according to the presence/absence of the flash.

In the second image-taking system according to the present invention, it is also preferable that "the background replacement device replaces the background in the taken image with another background to which optical information representing a condition for light to illuminate the subject is attached, and the image-taking-condition creating section comprises an illumination device which illuminates the subject, from the image-taking device side, with light to be used under an emission condition that corresponds to the condition represented by the optical information attached to the another background among a plurality of mutually different emission conditions, and the image-taking-condition creating section uses illumination by the illumination device under at least one of the plurality of image-taking conditions."

For example, in an image with a background where light is coming from the right side of the image, it will be unnatural if light shines on the subject from the front or left side in a background-replaced image after the original background is replaced with another one. Also, for example, in an image with a cloudy or sunset background, it will be unnatural if bright light shines on the subject in a background-replaced image after the original background is replaced with another one. According to the image-taking system in this preferable configuration, it is possible to obtain a natural background-replaced image because the subject can be illuminated with light under an appropriate emission condition in which the direction or brightness is set suitable for a replacing background.

As described above, according to the present invention, it is possible to provide an image-taking system in which an image of a subject is taken and a background-replaced image in which the original background in the taken image is naturally replaced with another desired background.

BRIEF DESCRIPTION OF THE DRAWINGS

FIG. 38 is a diagram showing a searching method used when a subject color of a certain pixel in a boundary area in a corrected normally-illuminated taken image is searched for.

BEST MODE FOR CARRYING OUT THE INVENTION

Figure 1:
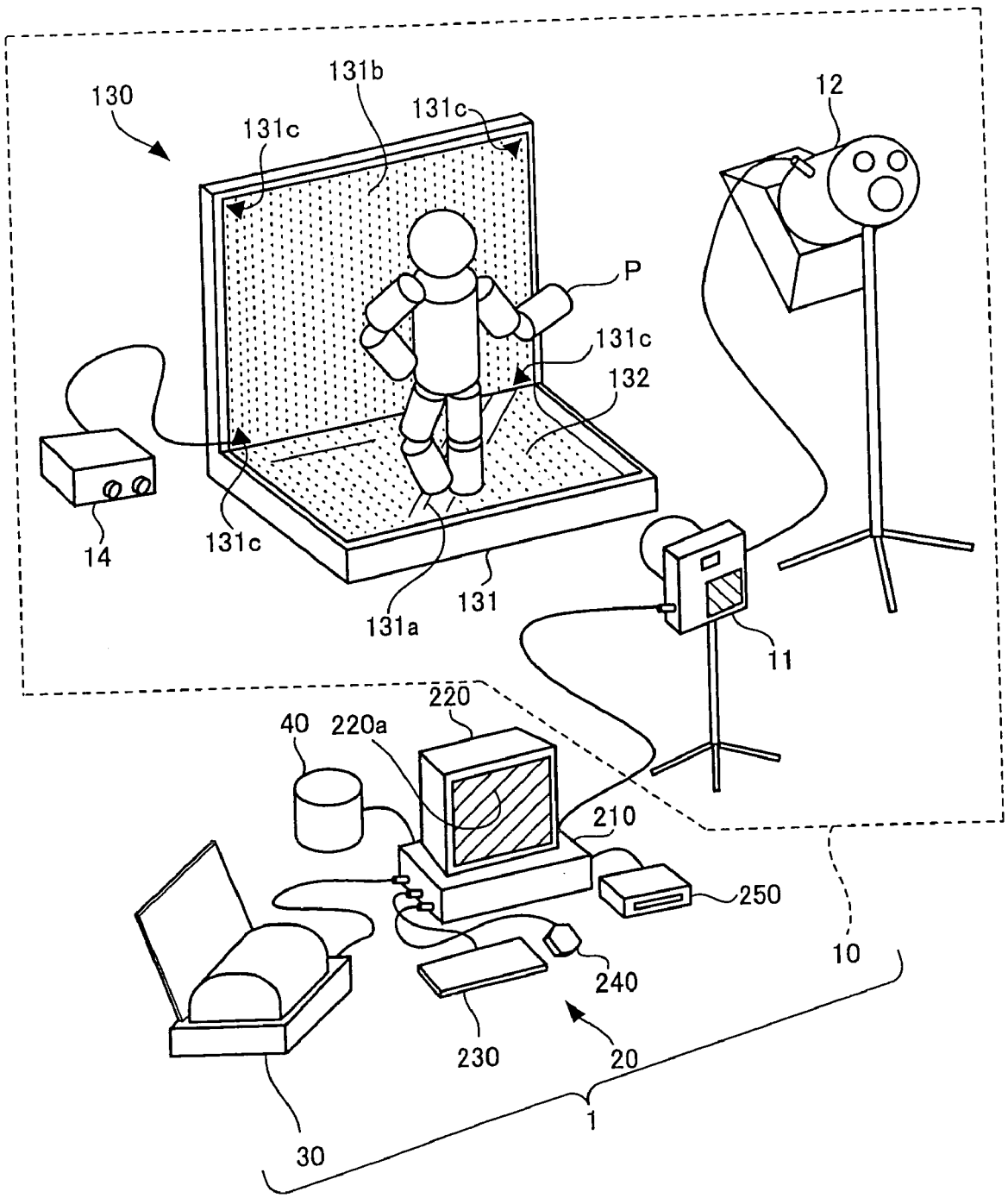
FIG. 1 is a diagram showing a first embodiment of the image-taking system according to the present invention.

Embodiments of the present invention will be described below by referring to the drawings.

The first embodiment of the present invention will be described below first.

FIG. 1 shows the first embodiment of the image-taking system according to the present invention.

An image-taking system 1 shown in FIG. 1 includes: an image taking studio 10 which acquires a taken image by taking an image of a subject; a personal computer 20 which generates a background-replaced image by discriminating between a subject and a background in the taken image, and replacing the background in the taken image with a desired background, and functions as an example of the background replacement device; a printer 30; and a sever 40. The image taking studio 10 also includes a digital camera 11, a flashing device 12, an EL (electroluminescence) panel 130, and a power supply 14 for the EL panel. The digital camera 11, the flashing device 12, and the EL panel 130 respectively correspond to the image-taking device, the flashing device, and the illumination device according to the present invention.

The digital camera 11 has the function of continuously taking an image, and when a camera user once presses a shutter button, the image of a subject P is automatically taken twice in a short time. A taken image obtained by each image taking operation is temporarily stored in the memory of the digital camera 11. In the image-taking system 1, the digital camera 11 is connected to the personal computer 20, and when the image taking operation is completed twice, the taken images obtained in the two image-taking operations are immediately transmitted to the personal computer 20. The digital camera 11 is also connected to the flashing device 12, and the digital camera 11 issues to the flashing device 12 a flash instruction signal for instructing the flashing device 12 to provide a flash each time an image is taken.

In the present embodiment, to save space in the image-taking studio 10, the digital camera 11 takes an image of a subject somewhat downward from a short distance. As a result, there is a strong possibility that the width of an image taken by the digital camera 11 is reduced toward the bottom, that is, there is a strong possibility that a so-called trapezoidal distortion is generated. In the present embodiment, the trapezoidal distortion is corrected by the personal computer 20.

The flashing device 12 emits a flash toward the subject P in response to the flash instruction signal from the digital camera 11. The flashing device 12 needs charging each time a flash is emitted. Once a flash is emitted, it takes some time to subsequently emit a flash. Although the digital camera 11 issues the flash instruction signal each time an image taking operation is performed when the image taking operation is performed twice, the flashing device 12 emits a flash only when the first image taking operation is performed. When the second image taking operation is performed, the charging operation is not completed. Therefore, the flashing device 12 remains in the OFF state. A flash emitted by the flashing device 12 is light of high brightness about 2000 cd/m².

The EL panel 130 includes a housing 131 having a transparent setting surface 131a under the subject P and a transparent back surface 131b behind the subject P, and a dispersed EL element 132 stored in the housing 131. The power supply 14 applies a driving voltage to the dispersed EL element 132. The dispersed EL element 132 corresponds to an example of the dispersed electroluminescence element according to the present invention. The four corners of the back surface 131b of the subject P are provided with four markers 131c indicating the range of the back surface 131b. These four markers 131c are taken together with the subject P in the taken image when an image taking operation is performed, and is used in correcting the trapezoidal distortion of the taken image or the like, and correspond to an example of the markers according to the present invention.

The dispersed EL element 132 is a sheet-shaped light-emitting surface as a light source constituted by dispersing fluorescent powder in the binder of a high dielectric constant and placing the fluorescent powder dispersed in the binder between two sheets of electrodes having flexible plastic substrates. The dispersed EL element 132 emits light by applying an alternating voltage between the two electrodes from the power supply 14.

The dispersed EL element 132 is a very thin and lightweight light source having a thickness of several hundred μm to 1 mm, and can be easily mounted in a limited place having a small thickness such as the inside of the housing 131, etc. Additionally, the dispersed EL element 132 has various advantages in property such as low heat of 2° C. at the light emission, a fast response from the start of light emission to the maximum brightness, a fixed service life allowing periodical replacement, possible local emission, high resistance to impact and vibration, low power consumption of 50 W/m² (when alternating current power of 50 Hz is applied), etc. Furthermore, the dispersed EL element 132 has an economic advantage of low production cost because it can be manufactured in a simple production process.

A general dispersed EL element can adjust the color of emitted light into various colors including white by mixing plural types of fluorescent powder having a different color of emitted light during production. In the dispersed EL element 132 according to the present embodiment, the fluorescent powder for the color adjustment is not mixed in advance. As a result, the dispersed EL element 132 has two or more light emission peaks between the wavelengths of emitted light of 400 nm and 530 nm. The light has the color from blue to green, and the dispersed EL element 132 according to the present embodiment emits blue-green light having two or more light emission peaks. Since the blue-green color is a complementary color of the color of the skin of a person, the image-taking system 1 according to the present embodiment can obtain a taken image having a blue-green background which allows a subject and its background in the taken image to be discriminated at a high probability when the image of the person as a subject is taken, etc. Furthermore, the complementary color allows the process of estimating the subject color and the background color as described later to be performed with high precision on a pixel near the boundary between the subject and the background. Although there is the tendency that the fluorescent powder for the color adjustment reduces the brightness of the color of emitted light, the dispersed EL element 132 according to the present embodiment uses non-mixed fluorescent powder and therefore, light is emitted with the brightness of the original dispersed EL element.

As an example of the illumination device using a dispersed electroluminescence element according to the present invention, the present embodiment employs the EL panel 130 provided with the housing 131 simply containing the dispersed EL element 132. However, the present invention is not limited thereto. Another example of this type illumination device of will be described below. The following description will focus on the feature different from the EL panel 130 shown in FIG. 1.

Figure 2:
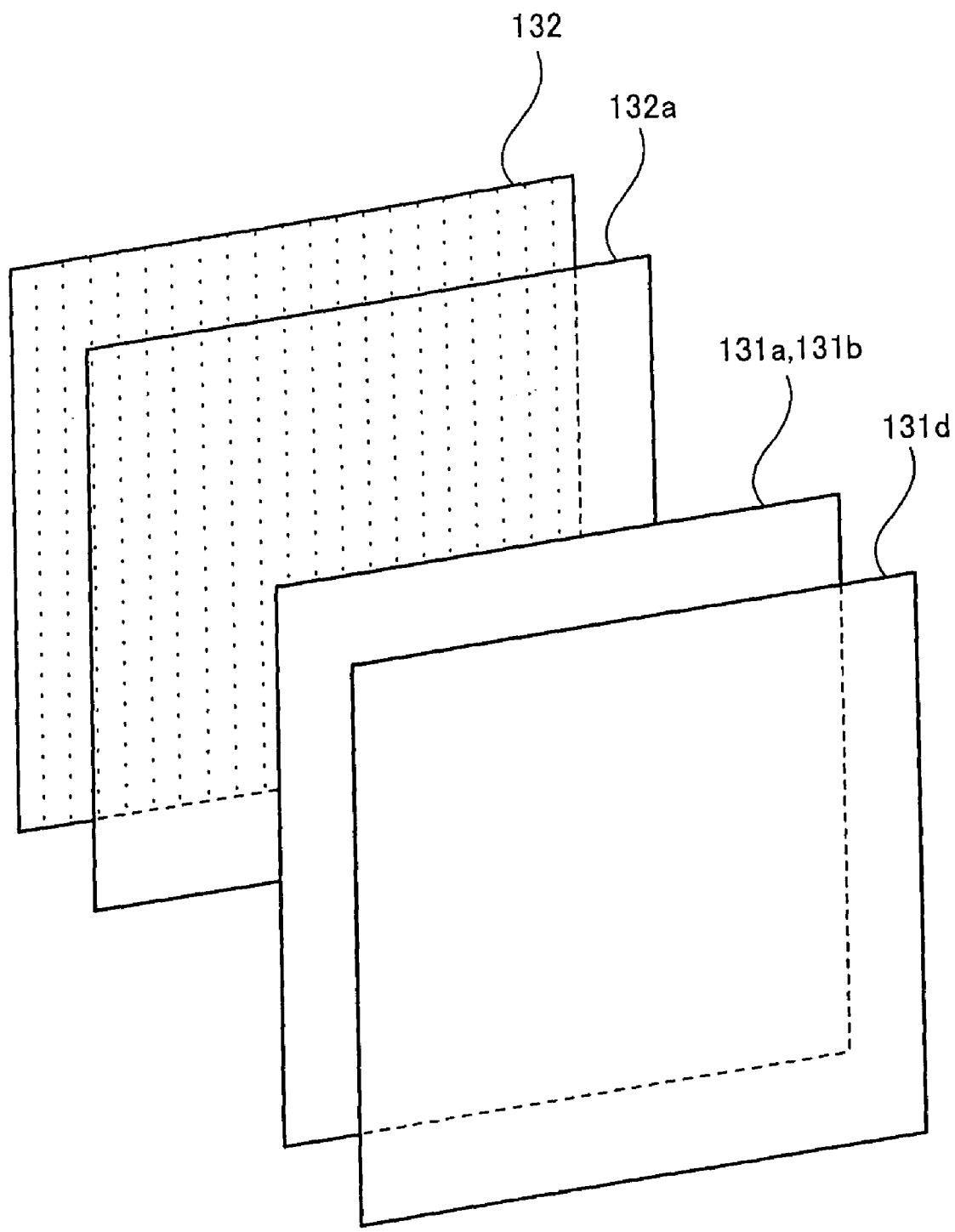
FIG. 2 is a diagram showing another example of the illumination device using a dispersed electroluminescence element.

FIG. 2 is a diagram showing another example of the illumination device using a dispersed electroluminescence element.

The example shown in FIG. 2 has such a configuration that two elements are added to the EL panel 130 shown in FIG. 1. Specifically, this example is configured such that a color filter 132*a* of blue-green that is the same color as the light emitted from the dispersed EL element 132 is attached to the front surface of the dispersed EL element 132, meanwhile a reflection-preventing film 131*d* for preventing light reflection is attached to each of the setting surface 131*a* under the subject P and the back surface 131*b* behind the subject P of the housing 131 (see FIG. 1). The color filter 132*a* and the reflection-preventing film 131*d* are examples of the color filter and the reflection-preventing film according to the present invention, respectively.

By use of the color filter 132*a*, even when image-taking process is performed under a flash whose light amount is extremely larger than the amount of light emitted from the dispersed EL element 132, the color of the background of the subject becomes blue-green definitely different from white color that is the color of the flash. Accordingly, even if, for example, the color of a flash comes out on the subject in a shot image, it is possible to reliably prevent the subject and the background in the shot image from becoming the same color, which is the color of the flash. Also, when the reflection-preventing film 131*d* is used, a flash emitted from the flashing device 12 is reflected by the subject, the setting surface 131*a* and the back surface 131*b* and thereby, it is possible to reliably prevent the subject and the background in the shot image from becoming the same color, which is the color of the flash. With the structure shown in FIG. 2, a clear discrimination that will be described later is made between the subject and the background in a shot image with further reliability.

Returning to FIG. 1, the description will be continued.

The power supply 14 can adjust the AC voltage between 40 V to 300 V to be applied to the dispersed EL element 132 for the frequency of 50 Hz to 10 kHz. The brightness of the emitted light of the dispersed EL element 132 is substantially proportional to the value of the applied AC voltage. In the image-taking studio 10 according to the present embodiment, the AC voltage is adjusted to the frequency range of 1.2 kHz to 1.5 kHz, and the voltage level of 130 V to 200 V in the power supply 14. As a result, the brightness of the emitted light of the dispersed EL element 132 is adjusted to the range of 500 cd/m$^2$ to 600 cd/m$^2$.

In the image-taking studio 10 of this embodiment, the digital camera 11 takes an image with the EL panel 130 constantly turned on. As described above, the first image-taking process is performed with a flash emitted by the flashing device 12, and the second image-taking process is performed with the flashing device 12 turned off. As described above, the brightness of the flash from the flashing device 12 is considerably higher than the brightness of the EL panel 130 that is lighted. As a result, in the first image-taking process, a taken image is acquired in a normal illumination state in which a subject P is clearly taken in the image-taking process in the normal illumination state in which the flash of the brightness higher than the brightness of the EL panel 130 illuminates the subject P from the direction of the digital camera 11. In the second image-taking process performed immediately after the first image-taking process, a taken image is acquired in the counter-illumination state in which the image of the subject P is biased toward the shadow side and the image of the EL panel 130 is biased toward the highlighted side in the image-taking process in the counter-illumination state in which only the light from the EL panel 130 illuminates the subject P from the back.

A combination of the flashing device 12 and the EL panel 130 in the image-taking studio 10 corresponds to an example of the image-taking-condition creating section according to the present invention. In this example, plural (two in the present embodiment) image-taking conditions are created based on the constant existence of the illumination by the EL panel 130 and the presence/absence of the illumination by the flash of the flashing device 12.

The personal computer 20 operates as an example of the background replacement device according to the present invention as described above. The personal computer 20 performs an image correcting process including the correction of the trapezoidal distortion on the two taken images received from the digital camera 11, and then performs a background replacing process of generating a background-replaced image based on the corrected taken image. The image correcting process and the background replacing process will be described later.

The personal computer 20 has inlets of a flexible disk (hereinafter referred to as an FD) and CD-ROM, and includes a body device 210 having the function of access to the FD and the CD-ROM inserted into the inlets, an image display device 220 for displaying an image on a display screen 220*a* at an instruction from the body device 210, a keyboard 230 for inputting various types of information depending on the key operation to the body device 210, a mouse 240 for inputting an instruction depending on, for example, an icon, etc. displayed at an optional position by specifying the position on the display screen 220*a*, and a medium drive 250 for accessing a small storage medium inserted for storage of a taken image in the digital camera, etc.

The printer 30 prints an image transmitted from the personal computer 20, and the image-taking system 1 prints a background-replaced image generated by the personal computer 20 in the background replacing process.

The server 40 stores plural types of backgrounds for use in the background replacing process performed by the personal computer 20. The background in the sever 40 is presented to a client by displaying it on the display screen 220*a*. Furthermore, the image-taking system 1 presents the client on the display screen 220*a* with the background provided through any input storage medium such as the CD-ROM, a small storage medium, etc. in addition to the background stored in the sever 40. The client selects a desired background from among the backgrounds displayed on the display screen 220*a*.

Described below is the flow of the operation performed by the image-taking system 1 shown in FIG. 1. In the description below, the components shown in FIG. 1 can be described with the reference characters shown in FIG. 1 without specifying a figure number.

Figure 3:
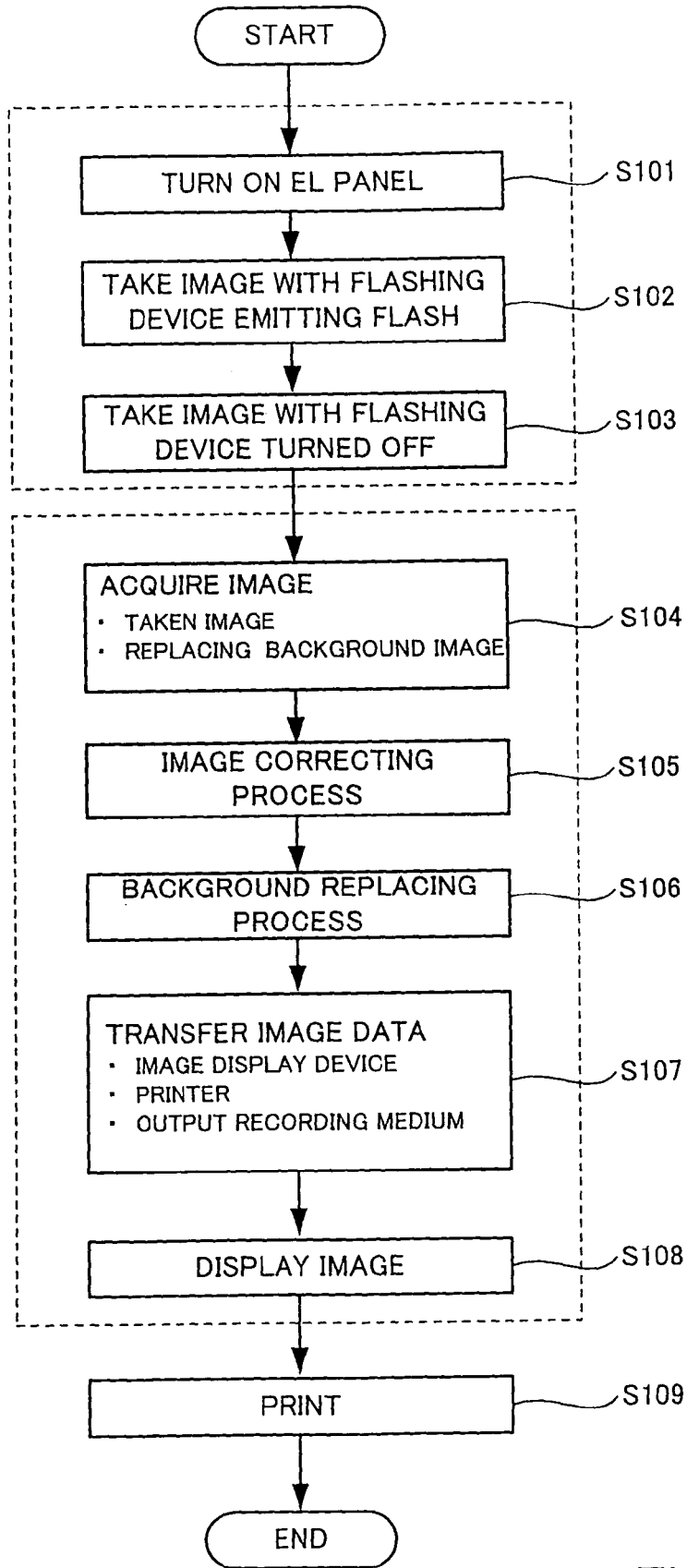
FIG. 3 is a flowchart showing the flow of the process performed by the image-taking system shown in FIG. 1.

FIG. 3 is a flowchart showing the flow of the operation performed by the image-taking system shown in FIG. 1.

The operation shown in the flowchart in FIG. 3 is performed based on that the subject P, the digital camera 11 and the flashing device 12 are arranged at the respective appropriate positions in the image taking studio 10.

First, a voltage is applied from the power supply 14 to the dispersed EL element 132, and the EL panel 130 is turned on (step S101). Next, when a camera user presses the shutter button of the digital camera 11 after adjusting the focus, exposure, etc., the image-taking process on the subject P is continuously performed twice. In the first image-taking process, the flashing device 12 emits a flash with the brightness higher than the brightness of the illumination of the EL panel 130 according to the flash instruction signal issued by the digital camera 11, and the image of the subject P is taken in the normal illumination state (step S102). Then, the second image-taking process is performed in the state in which the flashing device 12 is turned off, that is, in the counter-illumination state by the illumination of the EL panel 130 only (step S103). The two taken images of a normally-illuminated taken image and a counter-illuminated taken image obtained in the processes in steps S102 and S103 are temporarily stored in the memory in the digital camera 11.

In the present embodiment, the processes in steps S101 to S103 described above are the image-taking processes performed by a staff of a photo studio, etc. in the image taking studio 10, but the present invention is not limited to these processes. In the image-taking system according to the present invention, for example, the operations of an EL panel and a digital camera are controlled by a personal computer, etc., and the lighting of the EL panel and the image-taking process by the digital camera can be automatically performed without an operation of a person. This also holds true with other embodiments described later.

In the present embodiment, there is described an example in which image-taking process with normal illumination and image-taking process with counter illumination are simply executed. However, the present invention is not limited thereto. In the image-taking system of the present invention, image-taking process with normal illumination and image-taking process with counter illumination may be performed as described below for example.

Figure 4:
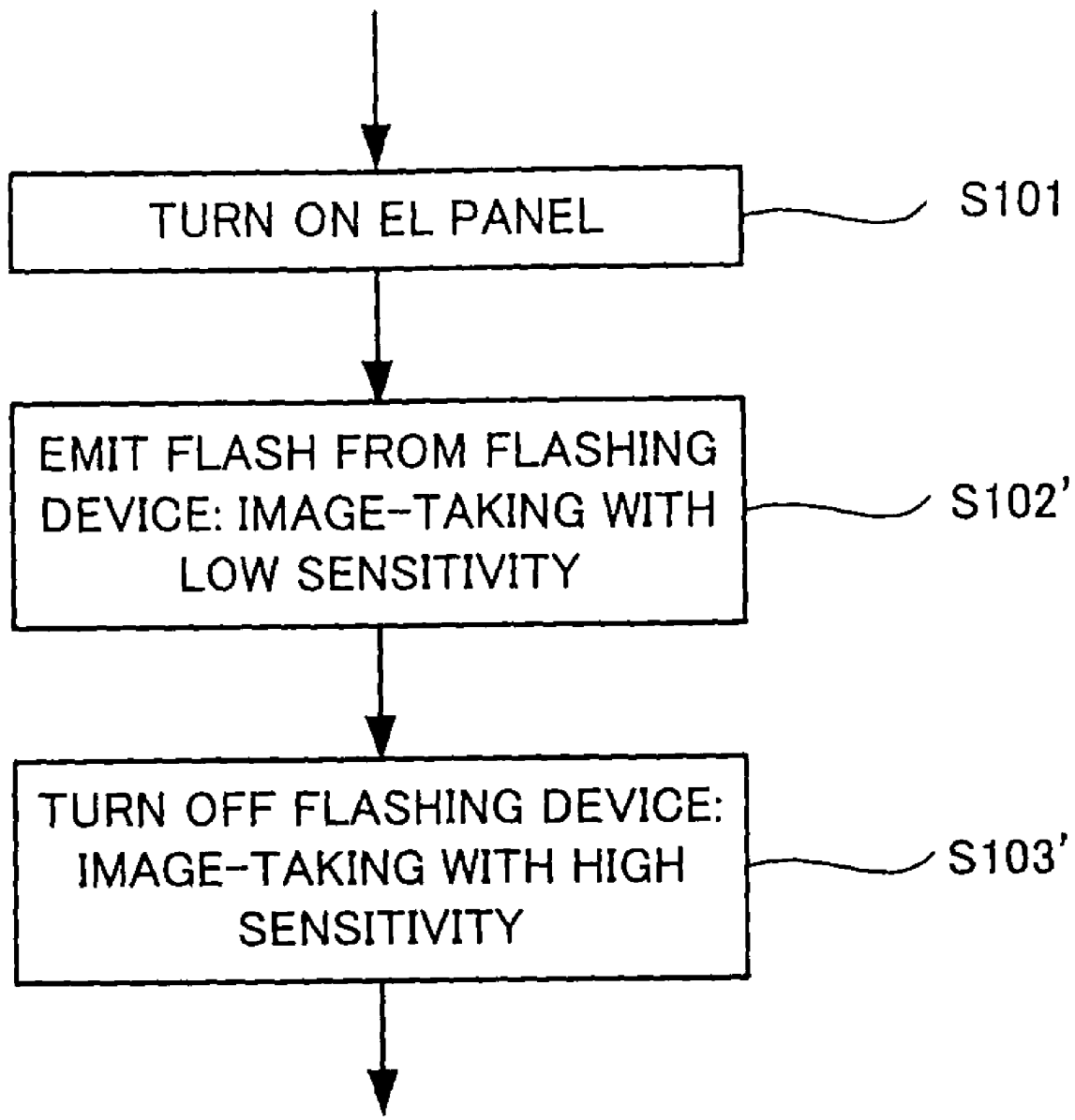
FIG. 4 is a diagram showing another example of image-taking process with normal illumination and image-taking process with counter illumination.

FIG. 4 is a diagram showing another example of image-taking process with normal illumination and image-taking process with counter illumination.

In image-taking process shown in FIG. 4, when the EL panel for illuminating the subject from the back is turned on (step S101), image-taking process with normal illumination (step S102') and image-taking process with counter illumination (step S103') are sequentially performed. However, in the example shown in FIG. 4, image-taking process with normal illumination (step S102') is executed with a flash whose light amount is extremely larger than the amount of the light emitted from the EL panel in order to reliably prevent the light emitted from the EL panel from coming out on the subject image. Further, such image-taking process is performed with a low sensitivity level suitable for the light amount of the flash so that the image-taking process is appropriately performed under such a flash. On the other hand, image-taking process with counter illumination (step S103') will result in underexposure if such a low sensitivity level is adopted and thereby, the light from the EL panel cannot be captured. For this reason, image-taking process with counter illumination is executed with a high sensitivity level suitable for the amount of light from the EL panel. In this way, according to image-taking process shown in FIG. 4, it is possible to prevent the light from the EL panel from coming out in the subject image and image-taking process can be performed with a sensitivity level suitable for each state.

Returning to FIG. 3, the description will be continued.

If the second image-taking process is performed in the process in step S103, and the taken image obtained in the image-taking process is completely stored in the memory of the digital camera 11, then the two taken images temporarily stored in the memory after obtained in the second image-taking process are immediately passed to the personal computer 20. After the operation on the personal computer 20, a client-desired background is read from the sever 40 or any input storage medium (step S104). Then, the image correcting process described later including the correction of the trapezoidal distortion is performed on the two taken images (step S105). Furthermore, the background replacing process described later of generating a background-replaced image based on the corrected taken image is performed (step S106). Then, the image data indicating the background-replaced image generated in the background replacing process is first transferred to the image display device 220, and then to at least one of the printer 30 and the client-desired output storage medium (step S107). Then, in the image display device 220, a background-replaced image is displayed on the display screen 220a based on the transferred image data (step S108). When the image data is transferred to the printer 30, the printer 30 prints the background-replaced image based on the image data (step S109).

The processes in steps S104 to S108 are the processes performed by the personal computer 20. The personal computer 20 which performs these processes and the processes performed by the personal computer 20 will be described below in detail.

First, the internal configuration of the personal computer 20 will be described.

Figure 5:
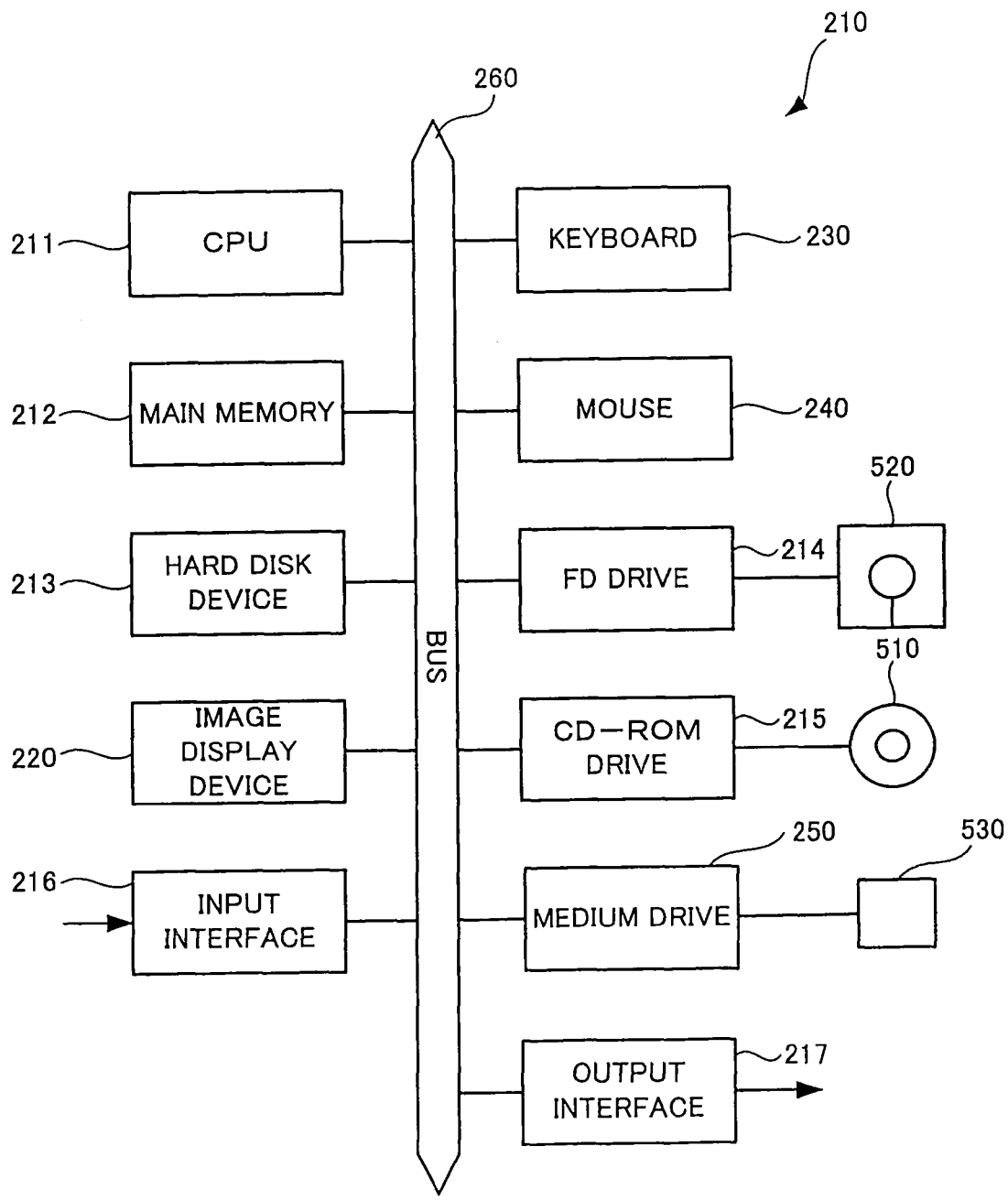
FIG. 5 is a diagram showing the configuration of the hardware of the personal computer shown in FIG. 1.

FIG. 5 shows the configuration of the hardware of the personal computer shown in FIG. 1.

As shown in FIG. 5, the body device 210 includes a CPU 211 which executes various programs, main memory 212 from which a program stored in a hard disk device 213 is read, and which is expanded for execution by the CPU 211, the hard disk device 213 storing various programs, data, etc., an FD drive 214 into which an FD 520 is inserted, and which is accessed for the inserted FD 520, a CD-ROM drive 215 for access to CD-ROM 510, an input interface 216 which is connected to the sever 40 and the digital camera 11 shown in FIG. 1, and receives are placing background, a taken image, etc. from the equipment, and an output interface 217 which is connected to the printer 30 shown in FIG. 1, and outputs a background-replaced image, etc. These components are connected to the medium drive 250 for access to the image display device 220, the keyboard 230, the mouse 240, and a small storage medium 530 shown in FIG. 1 via a bus 260.

The CD-ROM 510 stores a background replacing program for operation of the personal computer 20 as an example of the background replacement device according to the present invention. When the CD-ROM 510 storing the background replacing program is inserted into the CD-ROM drive 215, the background replacing program stored in the CD-ROM 510 is uploaded to the personal computer 20, and is written to the hard disk device 213. Thus, the personal computer 20 operates as a background replacement device.

Described next is the background replacing program.

Figure 6:
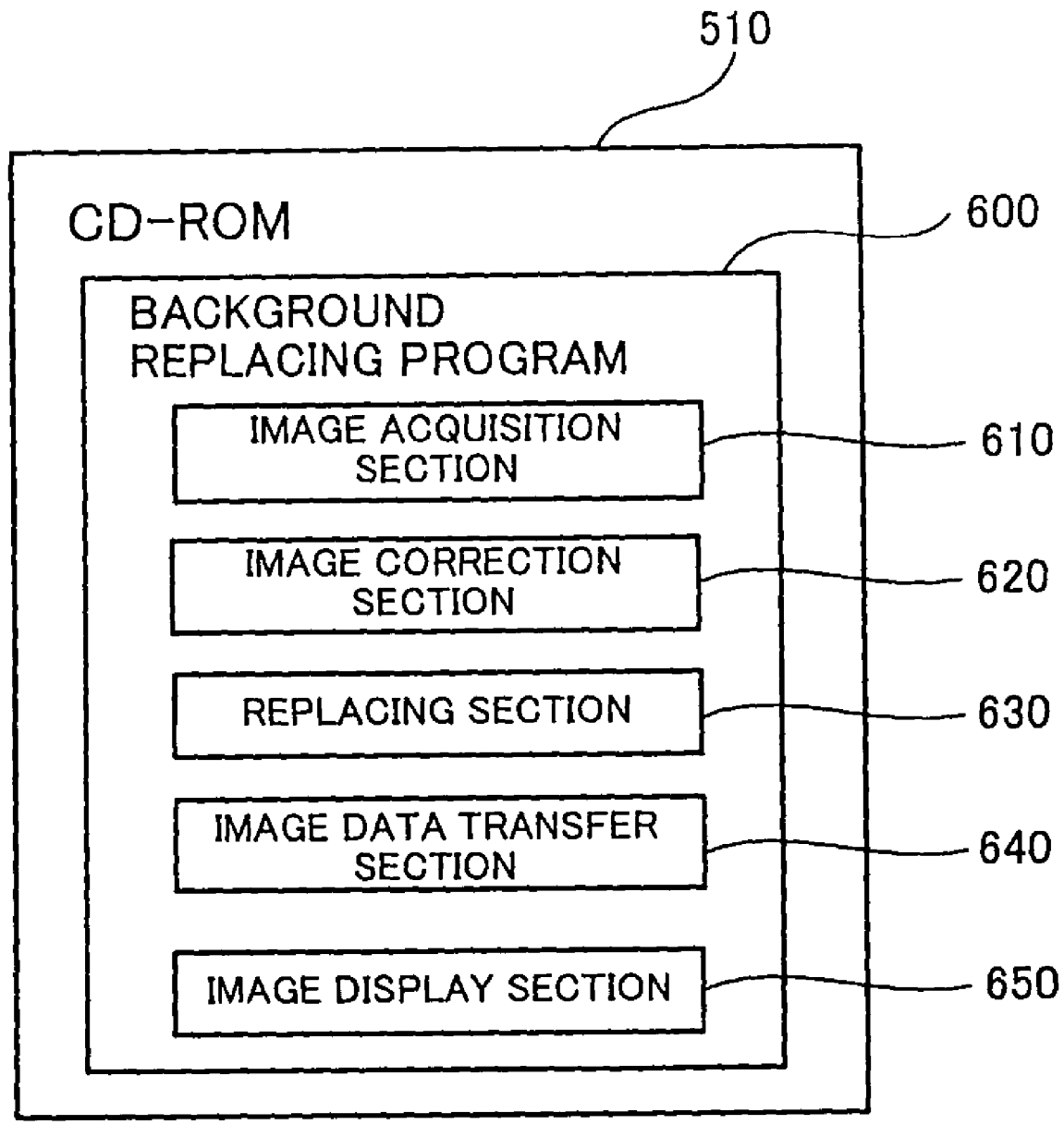
FIG. 6 is a diagram showing the concept of a CD-ROM storing a background replacing program for operating the personal computer shown in FIGS. 1 and 5 as an example of the background replacement device according to the present invention.

FIG. 6 shows the concept of the CD-ROM storing a background replacing program for operating the personal computer shown in FIGS. 1 and 5 as an example of the background replacement device according to the present invention.

The CD-ROM 510 shown in FIG. 6 stores a background replacing program 600.

The background replacing program 600 is configured by an image acquisition section 610, an image correction section 620, a replacing section 630, an image data transfer section 640, and an image display section 650.

The details of each section of the background replacing program 600 will be described below with the operation of each section as an example of the background replacement device according to the present invention. In the description below, the components shown in FIGS. 1, 5 and 6 can be described with the reference characters shown in FIGS. 1, 5 and 6 without specifying a figure number.

Figure 7:
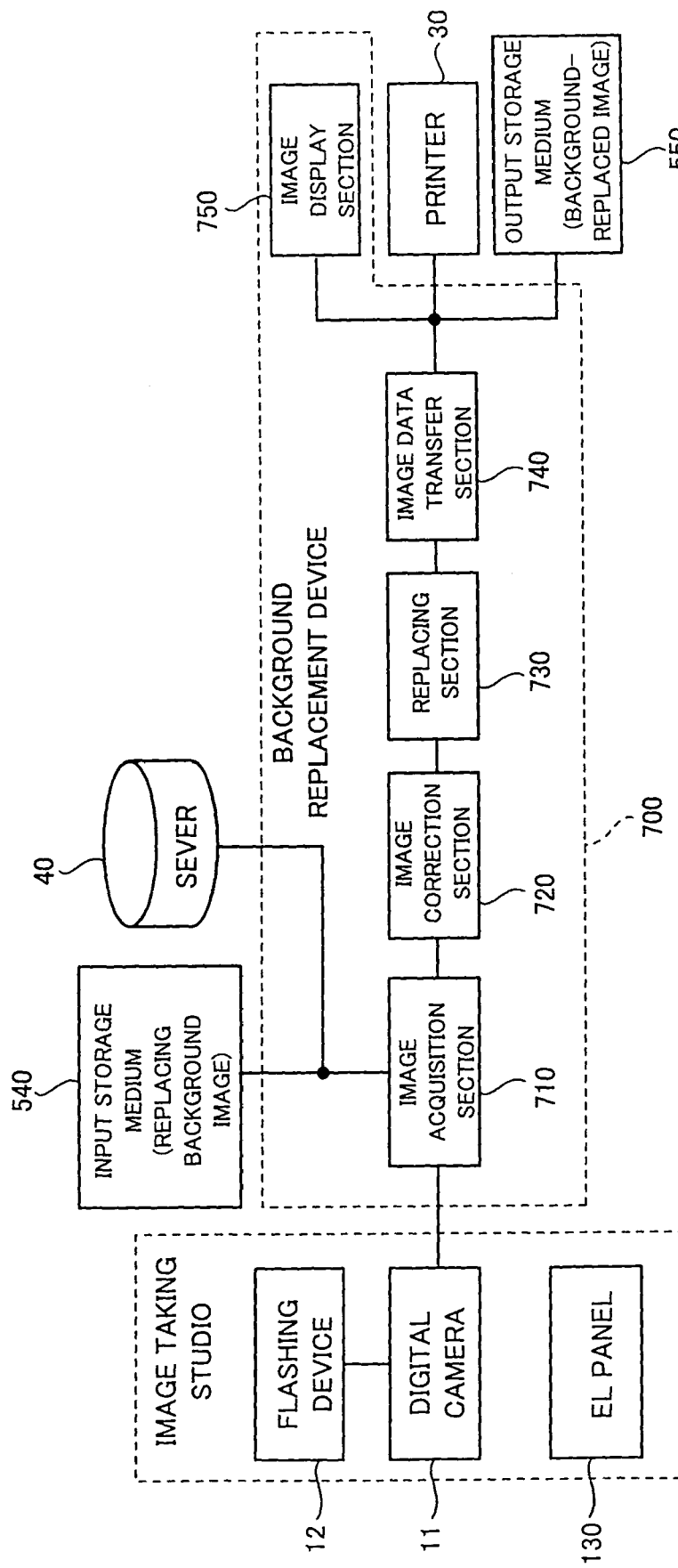
FIG. 7 is a block diagram showing the function to be performed when the background replacing program shown in FIG. 6 is installed on the personal computer shown in FIGS. 1 and 3, and the personal computer operates as an example of the background replacement device according to the present invention.

FIG. 7 is a block diagram showing the function performed when the background replacing program shown in FIG. 6 is installed on the personal computer shown in FIGS. 1 and 5, and the personal computer operates as an example of the background replacement device according to the present invention. FIG. 7 also shows the image taking studio 10 including the digital camera 11, the flashing device 12, and the EL panel 130, and the printer 30 and the sever 40 also shown in FIG. 1.

A background replacement device 700 shown in FIG. 7 acquires a normally-illuminated taken image and a counter-illuminated taken image taken respectively under normal illumination and counter illumination by the digital camera 11 of the image taking studio 10 as described above, discriminates between a subject and a background in the normally-illuminated taken image based on the counter-illuminated taken image in the two taken images, performs the background replacing process of replacing the background with a desired background, and includes an image acquisition section 710, an image correction section 720, a replacing section 730, an image data transfer section 740, and an image display section 750.

The image acquisition section 710 receives two taken images first taken by the digital camera 11 and passed by the digital camera 11. The image acquisition section 710 reads a client-desired background from the sever 40 or an input storage medium 540 such as CD-ROM, a small storage medium, etc. The image acquisition section 710 is actually constituted by the CPU 211 of the personal computer 20 controlling the input interface 216, the FD drive 214, the CD-ROM drive 215, and the medium drive 250 according to the image acquisition section 610 of the background replacing program 600.

The image correction section 720 performs an image correcting process described later including the correction of the trapezoidal distortion on the two taken images received by the image acquisition section 710, and is actually constituted by the CPU 211 of the personal computer 20 operating according to the image correction section 620 of the background replacing program 600. The details of the image correction section 720 will be described later with the details of the image correcting process by referring to other figures.

The replacing section 730 performs a background replacing process described later of generating a background-replaced image based on the two taken images obtained through the image correcting process by the image correction section 720, and is actually constituted by the CPU 211 of the personal computer 20 operating according to the replacing section 630 of the background replacing program 600. The details of the image correction section 720 will be described later with the details of the background replacing process by referring to other figures.

The image data transfer section 740 transfers the image data indicating the background-replaced image generated by the replacing section 730 to at least one of the printer 30 and a client-desired output storage medium 550, and the image display section 750 of the background replacement device 700. The image data transfer section 740 is actually constituted by the CPU 211 of the personal computer 20 controlling the output interface 217, the FD drive 214, the CD-ROM drive 215, and the medium drive 250 according to the image data transfer section 640 of the background replacing program 600.

The image display section 750 displays the background-replaced image based on the image data transferred from the image data transfer section 740 on the display screen 220a, and is actually constituted by the CPU 211 of the personal computer 20 controlling the image display device 220 according to the image display section 650 of the background replacing program 600.

When the image data indicating the background-replaced image is output from the image data transfer section 740 to the printer 30, the printer 30 prints the background-replaced image based on the image data. When the image data indicating the background-replaced image is output from the image data transfer section 740 to any output storage medium 550, the image data is written to the output storage medium 550. Then, both or one of the print paper on which the background-replaced image is printed and the output storage medium 550 to which the image data indicating the background-replaced image is written is provided at a request of the client.

Next, the details of the image correction section 720 and the replacing section 730 shown in each block shown in FIG. 7 will be described below.

First, the image correction section 720 will be described.

Figure 8:
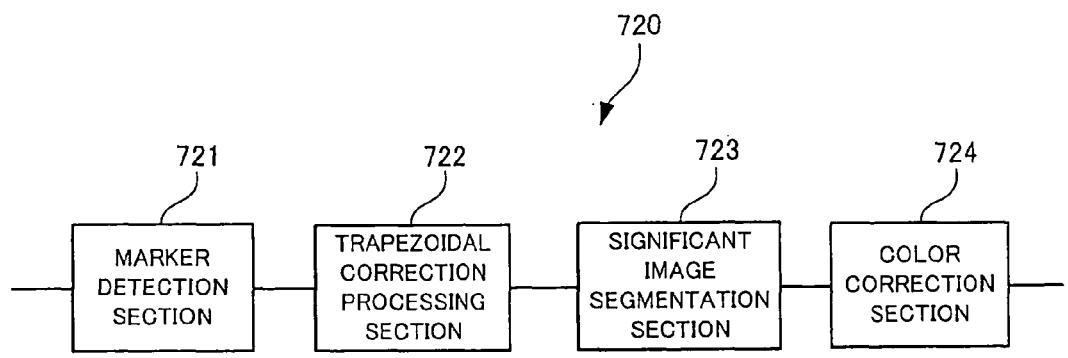
FIG. 8 is a diagram showing the details of an image correcting section indicated in one block shown in FIG. 7.

FIG. 8 shows the details of the image correcting section indicated in one block shown in FIG. 7. In the description below, the components shown in FIG. 7 can be described with the reference characters shown in FIG. 7 without specifying a figure number.

The image correction section 720 shown in FIG. 8 performs an image correcting process including the correction of the trapezoidal distortion on the normally-illuminated taken image and the counter-illuminated taken image received by the image acquisition section 710 as described above, and includes a marker detection section 721, a trapezoidal correction processing section 722, a significant image segmentation section 723, and a color correction section 724.

The operation of each component of the image correction section 720 will be described below by referring to the normally-illuminated taken image containing the trapezoidal distortion.

Figure 9:
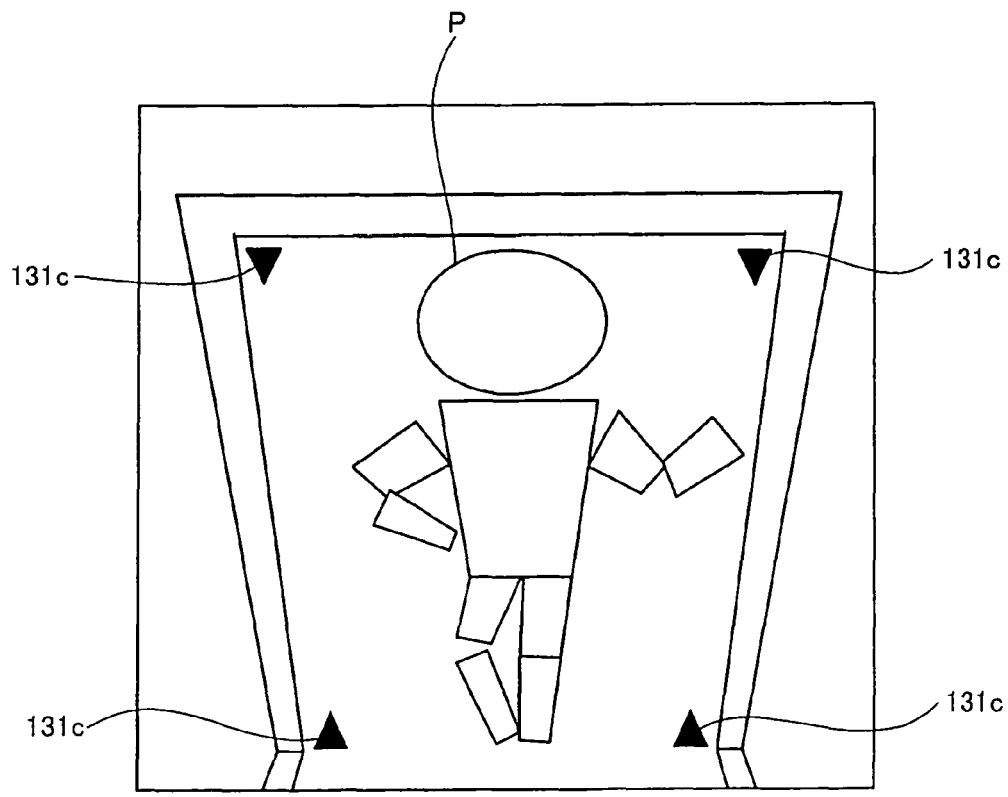
FIG. 9 is a schematic diagram showing an example of the normally-illuminated taken image including a trapezoidal distortion.

FIG. 9 is a schematic diagram showing an example of the normally-illuminated taken image including a trapezoidal distortion.

FIG. 9 shows in a schematic diagram of a taken image indicating a trapezoidal distortion with the width reduced downward.

First, the marker detection section 721 detects the four markers 131c taken in the taken image. Originally, a rectangle is formed by connecting the four markers 131c. However, in the example shown in FIG. 9, a trapezoid is formed by connecting the four markers 131c due to the trapezoidal distortion.

The trapezoidal correction processing section 722 corrects the trapezoidal distortion by performing an appropriate transform on the entire taken image such that the figure generated by connecting the four markers 131c detected by the marker detection section 721 can be the original rectangle.

Figure 10:
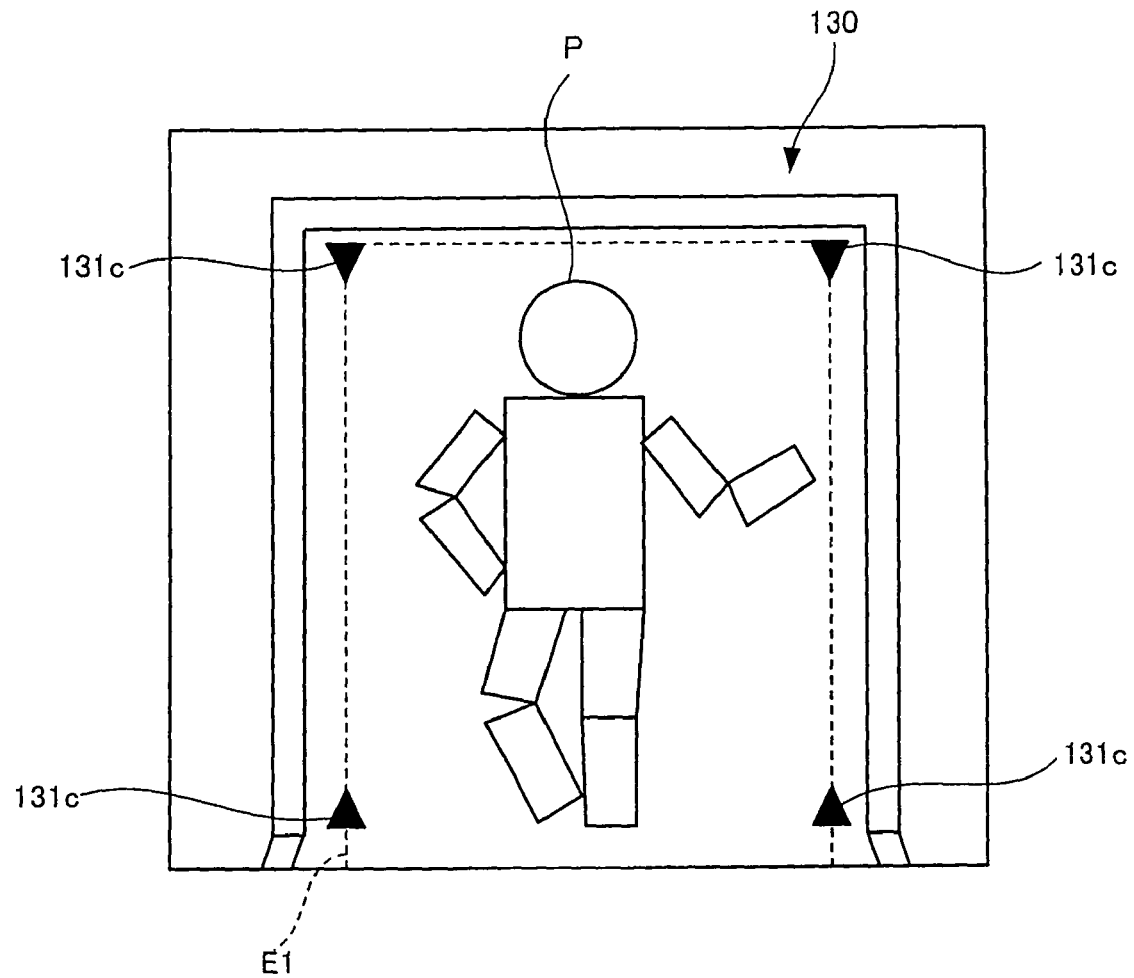
FIG. 10 is a schematic diagram showing the state in which the trapezoidal distortion is corrected in the normally-illuminated taken image shown in FIG. 9.

FIG. 10 is a schematic diagram showing the state in which the trapezoidal distortion is corrected in the normally-illuminated taken image shown in FIG. 9.

As a taken image provided for the background replacing process, it is desired that the background is only the light-emitting surface in the EL panel 130 in light of easy discrimination between a subject and a background. However, in the present embodiment, since a space saving device is developed for the image taking studio 10, the size of the EL panel 130 is limited, and the taken image includes an unnecessary portion other than the light-emitting surface of the EL panel 130 taken as a background as shown in FIGS. 9 and 10.

The significant image segmentation section 723 generates a significant image obtained by removing the image outside the significant range E1 determined by the four markers 131c from the taken image obtained through the correcting process by the trapezoidal correction processing section 722.

Figure 11:
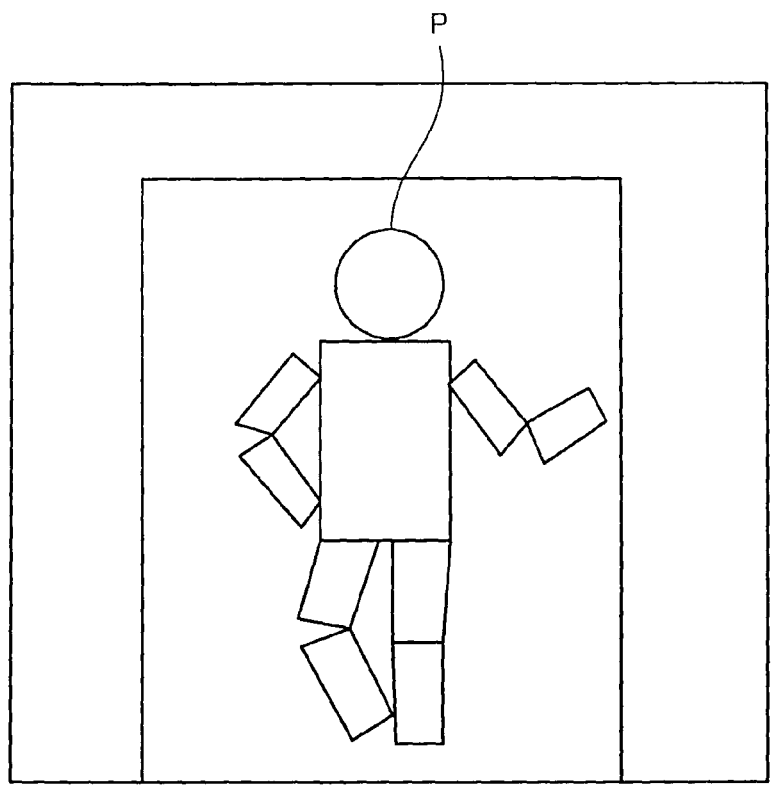
FIG. 11 is a schematic diagram showing the significant image generated based on the normally-illuminated taken image obtained by correcting the trapezoidal distortion as shown in FIG. 10.

FIG. 11 is a schematic diagram showing the significant image generated based on the normally-illuminated taken image obtained by correcting the trapezoidal distortion as shown in FIG. 10.

When the significant image segmentation section 723 generates a significant image in which the background of the subject P is only the light-emitting surface of the EL panel 130 as shown in FIG. 11, the color correction section 724 next performs on the significant image the color correcting process of correcting red eyes on the eyes of a person, correcting the color tones of the entire image to a desired color tones, etc.

As described above, the image correcting process performed by the image correction section 720 will be described by referring to the normally-illuminated taken image shown in FIGS. 9 to 11. According to the present embodiment, the same image correcting process performed on the normally-illuminated taken image is also performed on the counter-illuminated taken image taken together with the normally-illuminated taken image. Since the subject is taken as painted black in this counter-illuminated taken image, the process by the color correction section 724 is excluded for the counter-illuminated taken image.

Figure 12:
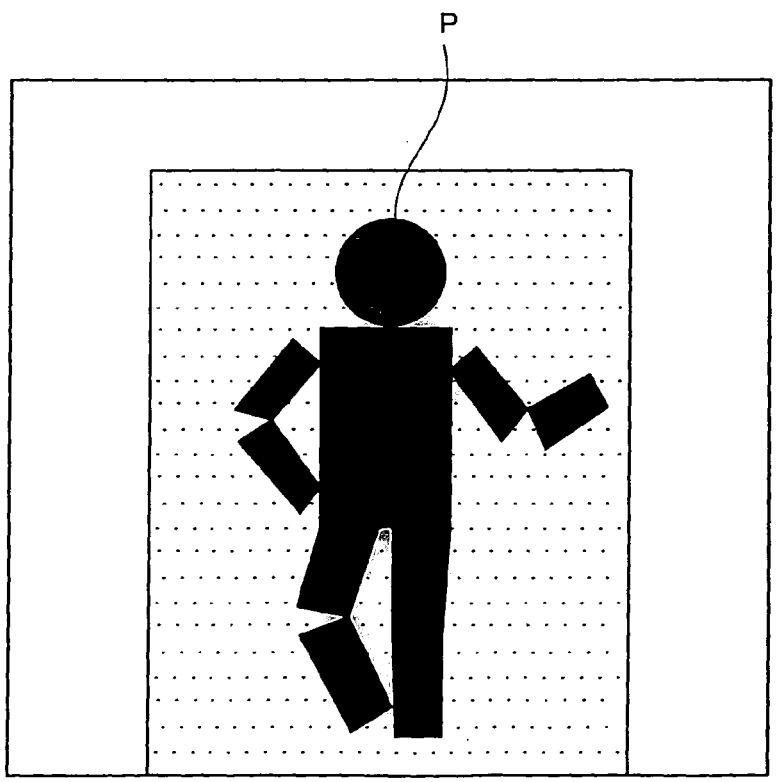
FIG. 12 is a schematic diagram showing the counter-illuminated taken image after the correcting process handled in the image correcting process by the image correcting section shown in FIG. 8.

FIG. 12 is a schematic diagram showing the counter-illuminated taken image after the correcting process handled in the image correcting process by the image correcting section shown in FIG. 8.

As shown in FIG. 12, in the corrected counter-illuminated taken image, the area of the subject P is biased toward the shadow side, and the area taken with the EL panel 130 as a background is biased toward the highlighted side. In the normally-illuminated taken image shown in FIGS. 9 to 11, the brightness of the emitted light of the EL panel 130 is lower than the brightness of the flash from the flashing device 12. Therefore, the light-emitting surface of the EL panel 130 is taken paler than the actual color of the emitted light. In the counter-illuminated taken image shown in FIG. 12, it is taken as blue-green color as the actual color of the emitted light from the EL panel 130.

Thus, in the corrected counter-illuminated taken image shown in FIG. 12, the area of the subject P can be easily discriminated from the background area because the brightness is considerably different from each other. In the corrected counter-illuminated taken image, the position and the contour of the subject P in the image are substantially the same as those of the subject in the corrected normally-illuminated taken image. Therefore, in the present embodiment, the replacing section 730 shown in FIG. 7 first discriminates between the subject P and the background in the corrected counter-illuminated taken image, and the discrimination is applied as is to the corrected normally-illuminated taken image, thereby successfully discriminating between the subject P and the background in the normally-illuminated taken image. The replacing section 730 generates a background-replaced image by replacing the background in the normally-illuminated taken image with a client-desired background.

Before describing the details of the replacing section 730, another example of the image correction section 720 will be described. This example does not require the markers 131c in the taken image for the purpose of removing unnecessary portions except for the light-emitting surface of the EL panel 130 from the taken image, which is different from the image correction section 720. For the sake of simplification, the description will be made assuming that no trapezoidal distortion occurs in the target taken image.

Figure 13:
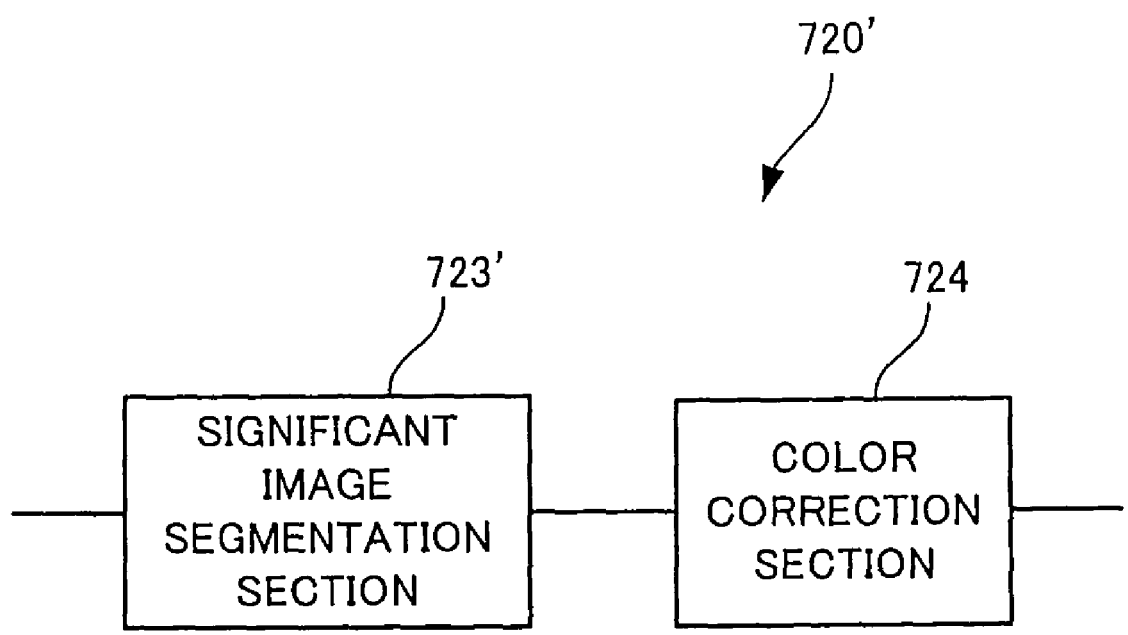
FIG. 13 is a diagram showing another example of the image correction section.

FIG. 13 is a diagram showing another example of the image correction section.

The image correction section 720' shown in FIG. 13 has a significant image segmentation section 723' that generates a significant image with unnecessary portions removed from a taken image without using the markers, and a color correction section 724 that is the same as the color correction section 724 shown in FIG. 8. The following description will focus on the significant image segmentation section 723' shown in FIG. 13.

Figure 14:
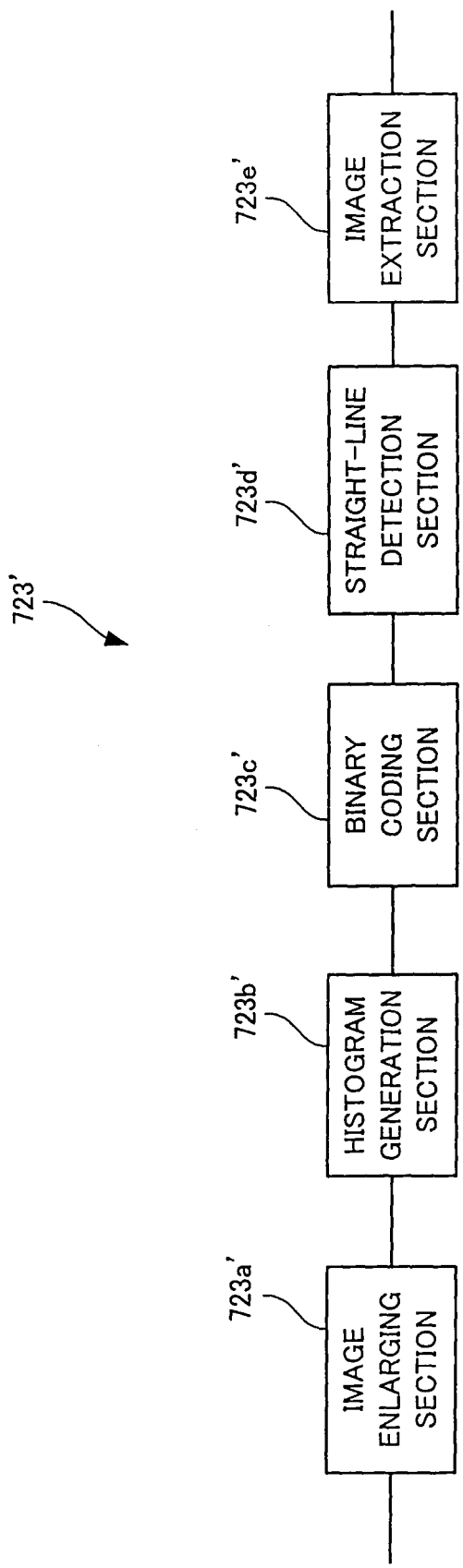
FIG. 14 is a diagram showing the details of a significant image segmentation section 723' shown as one block in FIG. 13.

FIG. 14 is a diagram showing the details of the significant image segmentation section 723' shown as one block in FIG. 13.

The significant image segmentation section 723' is provided with an image enlarging section 723a', a histogram generation section 723b', a binary coding section 723c', a straight-line detection section 723d' and an image extraction section 723e'.

The significant image segmentation section 723' uses a counter-illuminated taken image to determine a range of a significant image that is common to both normally-illuminated taken image and counter-illuminated taken image.

The image enlarging section 723a' enlarges the counter-illuminated taken image.

Figure 15:
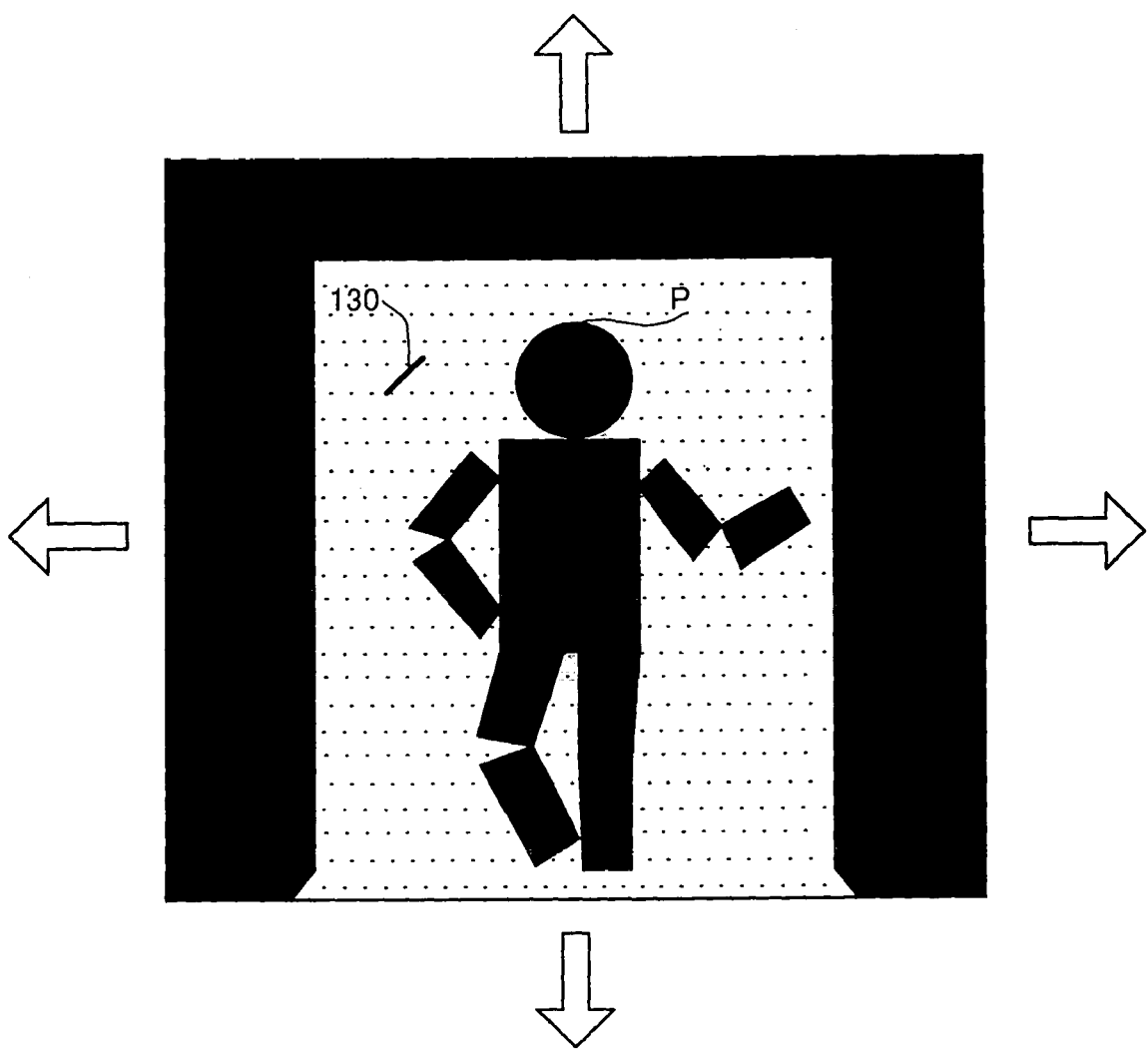
FIG. 15 is a diagram showing an example of a counter-illuminated taken image used to generate a significant image.
Figure 16:
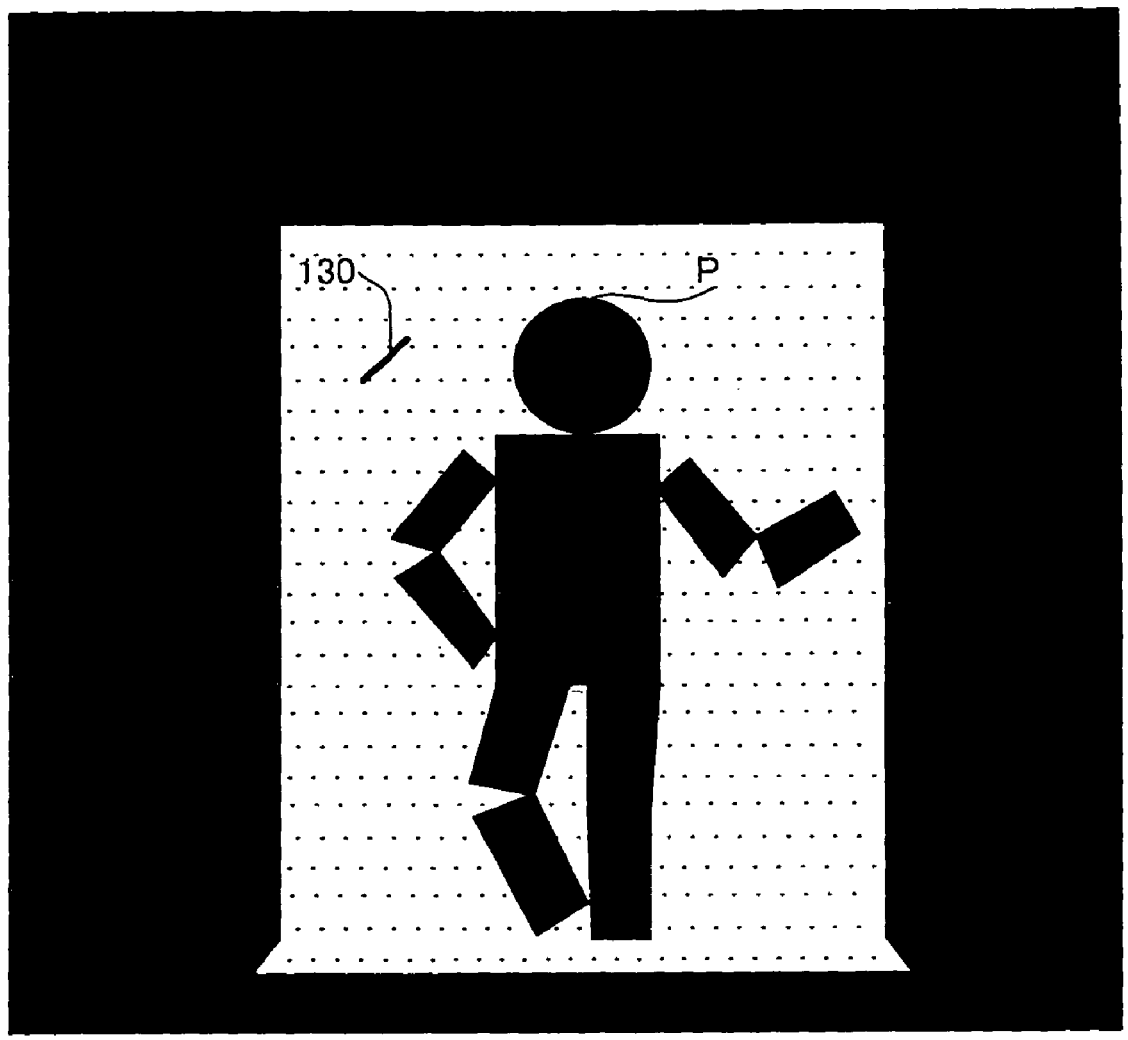
FIG. 16 is a diagram showing the counter-illuminated taken image shown in FIG. 15 when enlarged.

FIG. 15 is a diagram showing an example of the counter-illuminated taken image used to generate a significant image. FIG. 16 is a diagram showing the counter-illuminated taken image shown in FIG. 15 when enlarged.

FIG. 15 shows the counter-illuminated taken image in which unnecessary portions of the image except for the light-emitting surface of the EL panel 130 as well as the subject P are biased toward the shadow side. The image enlarging section 723a' enlarges the counter-illuminated taken image by adding plural black pixels to upper, lower, left and right portions of the counter-illuminated taken image, thereby generating an image in which the light-emitting surface of the EL panel 130 is surrounded by pixels in the shadow side, as shown in FIG. 16.

Subsequently, the histogram generation section 723b' generates a histogram with respect to brightness of each pixel in the enlarged image, as described below.

Figure 17:
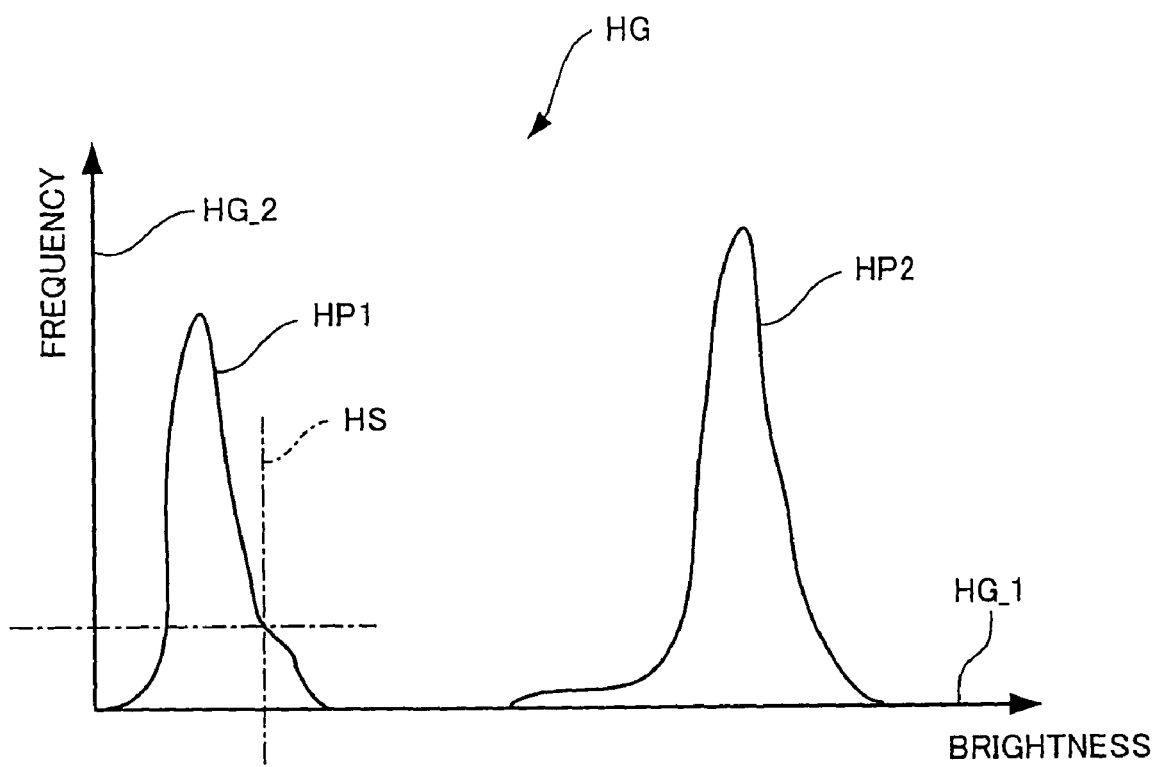
FIG. 17 is a diagram showing an example of a histogram about brightness of each pixel forming the enlarged counter-illuminated taken image.

FIG. 17 is a diagram showing an example of the histogram about brightness of each pixel forming the enlarged counter-illuminated taken image.

FIG. 17 shows a histogram HG indicating, as frequency, how many pixels are allocated to each of a number of brightness ranges after brightness of pixels are allocated to the brightness ranges. In the brightness histogram HG, a horizontal axis HG_1 indicates the brightness, and a vertical axis HG_2 indicates the frequency. In this histogram HG generated for the counter-illuminated taken image, as shown in FIG. 17, two peaks HP1 and HP2 appear in the shadow side and the highlighted side, respectively. The peak HP1 in the shadow side appears due to allocation of pixels forming the subject area and unnecessary portions in the counter-illuminated taken image. Meanwhile, the peak HP2 in the highlighted side appears due to allocation of pixels forming the light-emitting surface of the EL panel 130 in the counter-illuminated taken image.

When this histogram HG is generated, the binary coding section 723c' first calculates a threshold HS serving as the upper limit of the brightness, at which the frequency becomes equal to or above a predetermined level, in the peak HP1 in the shadow side of the histogram HG. Subsequently, the binary coding section 723c' performs binary coded processing by allocating, for each of pixels forming the enlarged counter-illuminated taken image, a pixel value "0" to each pixel corresponding to brightness equal to or above the threshold HG, while allocating a pixel value "1" to each pixel corresponding to brightness below the threshold HG.

Figure 18:
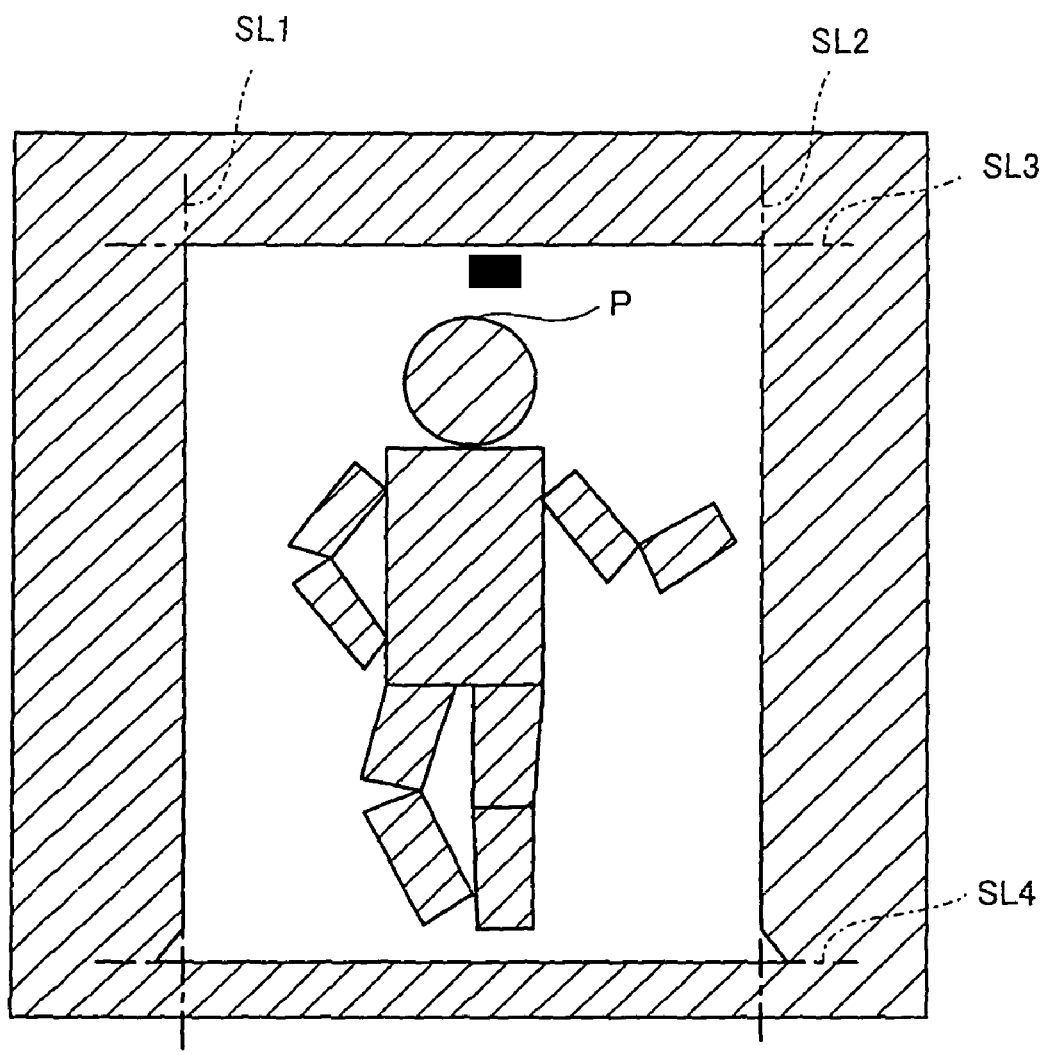
FIG. 18 is a diagram showing a counter-illuminated taken image after being subjected to a binary coded processing by a binary coding section 723c' shown in FIG. 14.

FIG. 18 is a diagram showing the counter-illuminated taken image after being subjected to the binary coded processing by the binary coding section 723c' shown in FIG. 14. In FIG. 18, diagonally shaded areas indicate areas including the subject P and excluding the light-emitting surface of the EL panel 130. Pixel value "0" is allocated to each of pixels forming these areas.

Upon completion of the binary coded processing, the straight-line detection section 723d' detects straight line portions in the boundary between the pixels with pixel values "1" and the pixels with pixel values "0" in the counter-illuminated taken image that has been subjected to the binary coded processing. FIG. 18 illustrates a state where four straight lines SL1, SL2, SL3 and SL4 surrounding the area of the light-emitting surface of the EL panel 130 are detected.

Upon detection of such straight lines, the image extraction section 723e' extracts an image corresponding to an area surrounded by the four straight lines SL1, SL2, SL3 and SL4 as a significant image from the counter-illuminated taken image before being enlarged as shown in FIG. 15. The image extraction section 723e' also extracts an image corresponding to an area surrounded by the four straight lines SL1, SL2, SL3 and SL4 as a significant image from the normally-illuminated taken image.

With the above-described series of processing, it is also possible to obtain approximately the same significant image as the significant image generated by use of the markers shown in FIGS. 11 and 12.

Now, returning to the first embodiment, the description will be continued.

The image correction section 720 shown in FIG. 7 obtains the significant image (corrected normally-illuminated taken image and corrected counter-illuminated taken image) for each of the normal illumination and the counter illumination as shown in FIGS. 11 and 12. Subsequently, the replacing section 730 discriminates between the subject P and the background in the corrected counter-illuminated taken image as described above and the result of the discrimination is directly applied to the corrected normally-illuminated taken image so that the subject P is discriminated from the background in the normally-illuminated taken image. The replacing section 730 then generates a background-replaced image by replacing the background in the normally-illuminated taken image with a background desired by a customer.

Next, the details of the replacing section 730 will be described by focusing on the background replacing process from the discrimination between the subject and the background in the corrected counter-illuminated taken image to the generation of a background-replaced image.

In the description below, the following image is referred to as an example of each of the corrected normally-illuminated taken image and the corrected counter-illuminated taken image.

Figure 19:
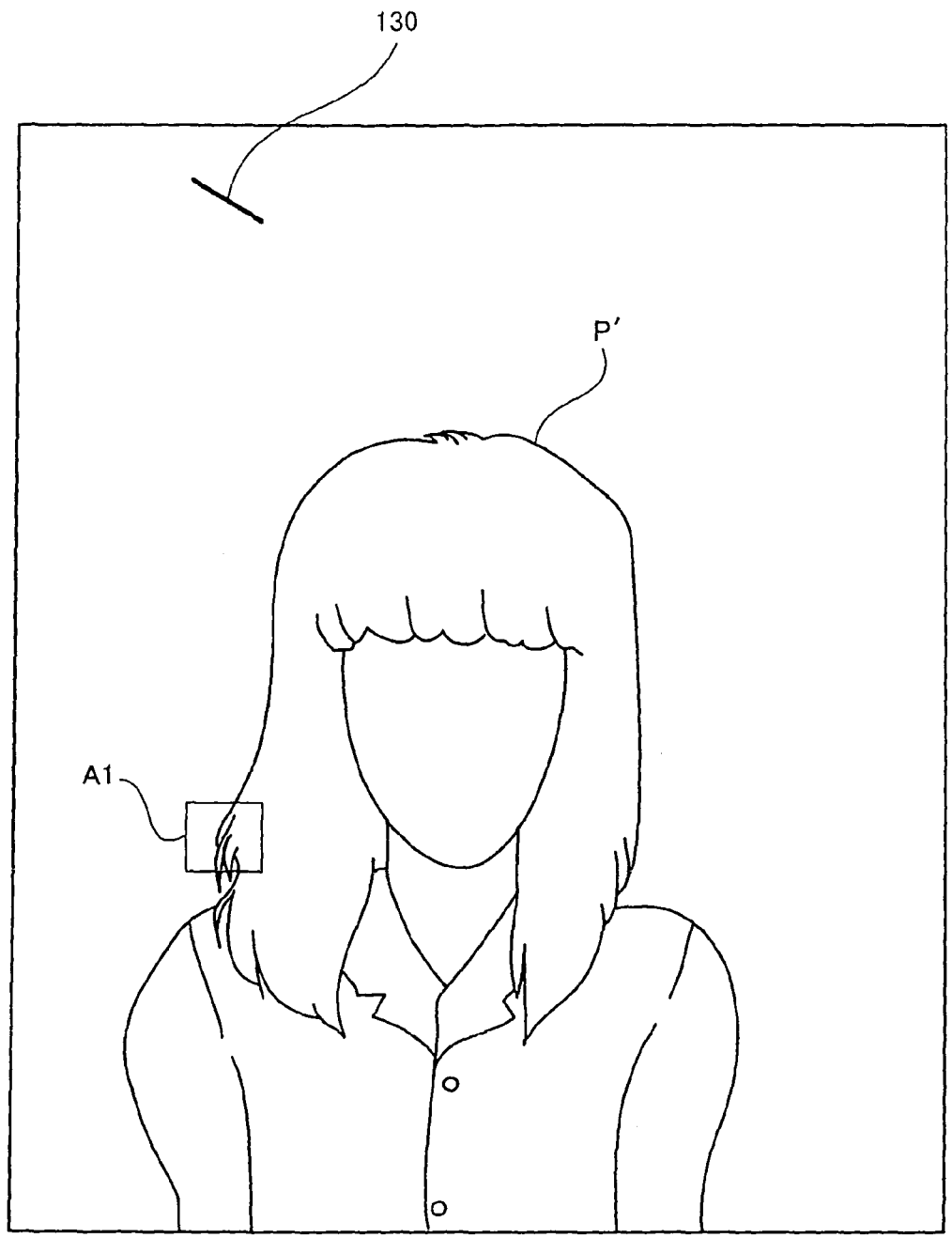
FIG. 19 is a diagram showing an example of a corrected normally-illuminated taken image.
Figure 20:
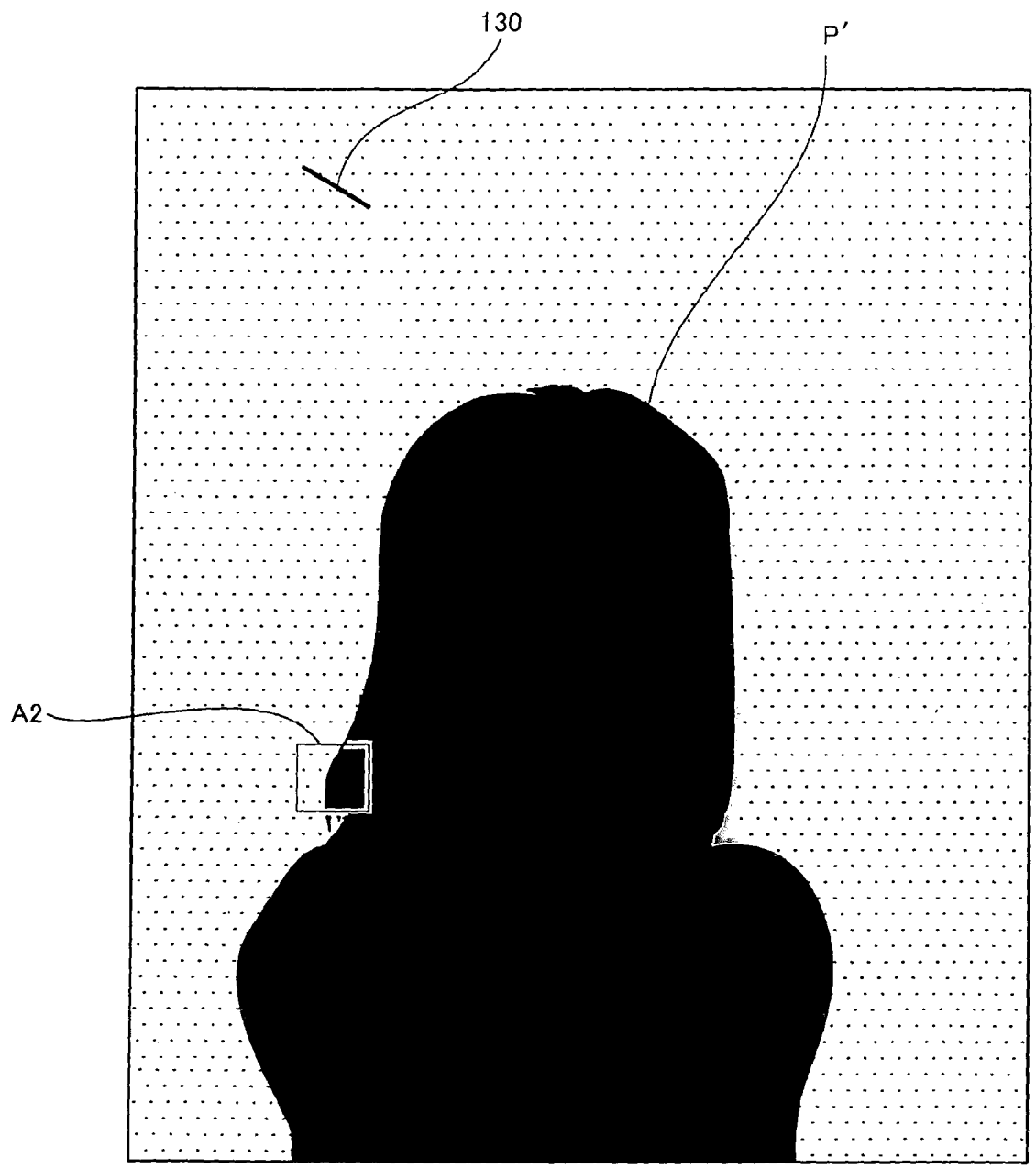
FIG. 20 is a diagram showing an example of a corrected counter-illuminated taken image.

FIG. 19 shows an example of a corrected normally-illuminated taken image, and FIG. 20 shows an example of a corrected counter-illuminated taken image.

FIGS. 19 and 20 show the image of the subject P' of a person. Since the taken image shown in FIG. 20 is taken with counter illumination, the area of the subject P' is biased toward the shadow side, and the area in which the EL panel 130 is taken as the background is biased toward the highlighted side. The state around the boundary between the subject P' and the background is shown in another figure relating to the area A1 shown in FIG. 19 and the area A2 shown in FIG. 20 corresponding to the area A shown in FIG. 19.

Figure 21:
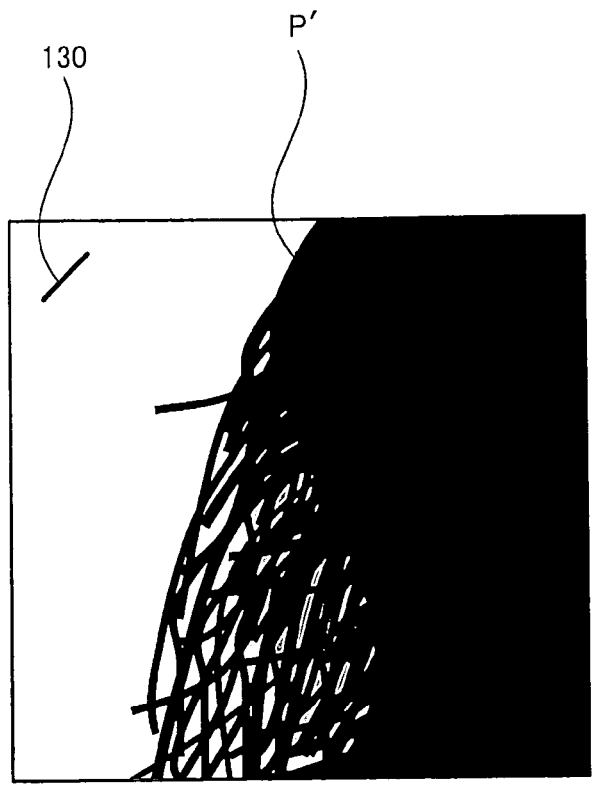
FIG. 21 is an enlarged view of an area A shown in FIG. 19.
Figure 22:
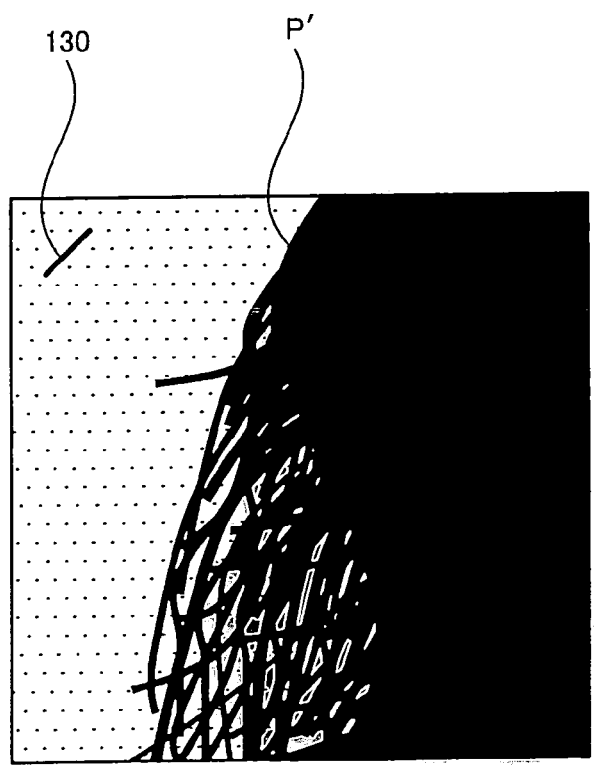
FIG. 22 is an enlarged view of an area A2 shown in FIG. 20.

FIG. 21 is an enlarged view of the area A1 shown in FIG. 19. FIG. 22 is an enlarged view of the area A2 shown in FIG. 20.

FIGS. 21 and 22 show the state of the EL panel 130 which can be seen through the hair of the subject P'. Generally, a background is often seen through a part of a subject in a taken image. The part exists around the boundary between the subject and its background in a taken image as shown in FIGS. 19 to 22.

FIGS. 21 and 22 show ideal states in which a piece of hair of a person can be correctly seen for convenience in explanation. However, with the restrictions on the resolution in a practical taken image, a pixel forming part of the image is larger than a minute component of the subject such as a piece of hair, etc. Therefore, for example, the portion of the image in which the EL panel 130 as the background is seen through the hair, etc. shown in FIGS. 21 and 22 is constituted by pixels having composite colors including the color of the hair as a minute subject and the color of the background seen at the back of the hair. Therefore, it is impossible to easily discriminate between the subject and the background in this portion.

When the background in the corrected normally-illuminated taken image as shown in FIG. 19 is replaced with a client-desired background, the replacing section 730 shown in FIG. 7 first discriminates among the subject area, the background area, and the boundary area between these two areas in the corrected normally-illuminated taken image. The replacing section 730 leaves the subject area in the corrected normally-illuminated taken image as is, and replaces the background area with a client-desired background.

At this time, the portion in which the background is seen through a part of a subject as shown in FIG. 21, that is, the portion constituted by pixels of composite colors including the color of a minute subject and the color of the background, cannot be simply discriminated between the subject and the background as described above. Therefore, the boundary area is discriminated by the replacing section 730.

The replacing section 730 estimates the color of a subject and the color of a background as the sources of the composite color of each pixel assuming that all pixels in the boundary area in the corrected normally-illuminated taken image indicate the composite color, and estimates the composition ratio of the sources. However, the practical boundary area includes a pixel having only the color of the background and a pixel having only the color of the subject in addition to the pixel having the composite color. The replacing section 730 estimates the composition ratio of "0" as the ratio of the color of the subject to the color of the pixel when the pixel to be processed is the pixel having only the color of the background, and estimates the composition ratio of "1" as the ratio of the color of the subject to the color of the pixel when the pixel to be processed is the pixel having only the color of the subject.

Then, the replacing section 730 replaces the color of each pixel in the boundary area with the composite color including the estimated color of the subject and another color of the background desired by the client at the estimated composition ratio. In this process, in the boundary area, the color of the pixel having only the color of the background is replaced with another color of the background, the color of the pixel having only the color of the subject is maintained as is, and the color of the pixel of the portion in which the background is seen through a part of the subject is replaced with the composite color. As a result of the process, although the portion in which the background is seen through a part of the subject is included in the boundary area, a natural background-replaced image in which the client-desired background is seen through a part of the subject can be generated.

The replacing section 730 will be described below more in detail.

Figure 23:
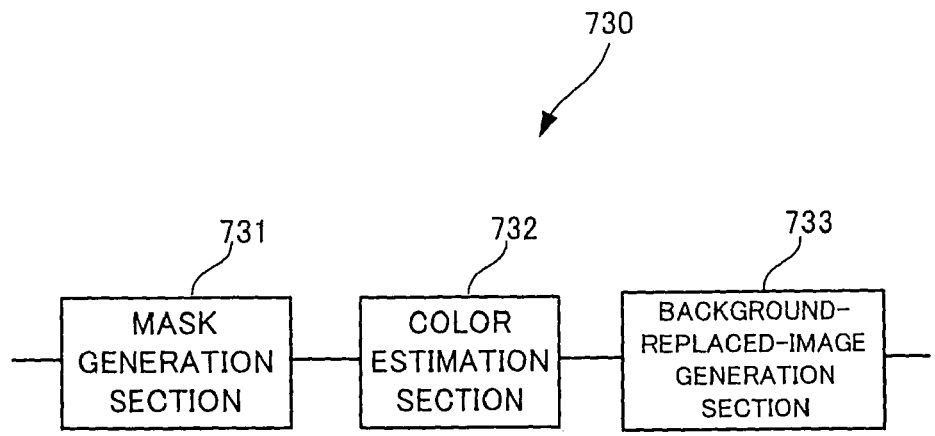
FIG. 23 is a diagram showing the details of the replacing section shown in one block in FIG. 7.

FIG. 23 shows in detail the replacing section shown in one block in FIG. 7. In the description below, the components shown in FIG. 7 can be described with the reference characters shown in FIG. 7 without specifying a figure number.

The replacing section 730 performs the background replacing process, and includes a mask generation section 731, a color estimation section 732, and a background-replaced-image generation section 733.

First, the outline of each of these components will be described below.

The mask generation section 731 generates a subject mask for defining the range including only the pixels of a subject color, and a background mask for defining the range including only the pixels of a background color in the corrected counter-illuminated taken image. In this example, these two masks are generated in the respective ranges defined by the respective masks with a clearance to exclude the pixel of the portion in which the background is seen through the subject as shown in FIG. 22.

The color estimation section 732 applies the subject mask and the background mask generated by the mask generation section 731 to the corrected normally-illuminated taken image, and first recognizes the clearance between the two masks in the normally-illuminated taken image, that is, a boundary area. Then, assuming that all pixels in the boundary area has a composite color, the subject color and the background color as the sources of the composition of the colors of the pixels are estimated, and the composition ratio between them is also estimated.

The background-replaced-image generation section 733 first leaves the area defined by the subject mask as is, and replaces the area defined by the background mask with another background desired by the client in the corrected normally-illuminated taken image. Next, the color of the client-desired background and the subject color estimated by the color estimation section 732 are combined at the composition ratio estimated by the color estimation section 732 for each pixel in the boundary area, and the color of each pixel is replaced with the composite color. Thus, a background-replaced image in which the background of the corrected normally-illuminated taken image is naturally replaced with another background desired by the client is generated.

The image data indicating the thus generated background-replaced image is transferred from the image data transfer section 740 shown in FIG. 7 to each output device and the output storage medium 550 (refer to FIG. 7).

Next, each component of the replacing section 730 will be described below in detail.

First, the mask generation section 731 will be described in detail.

Figure 24:
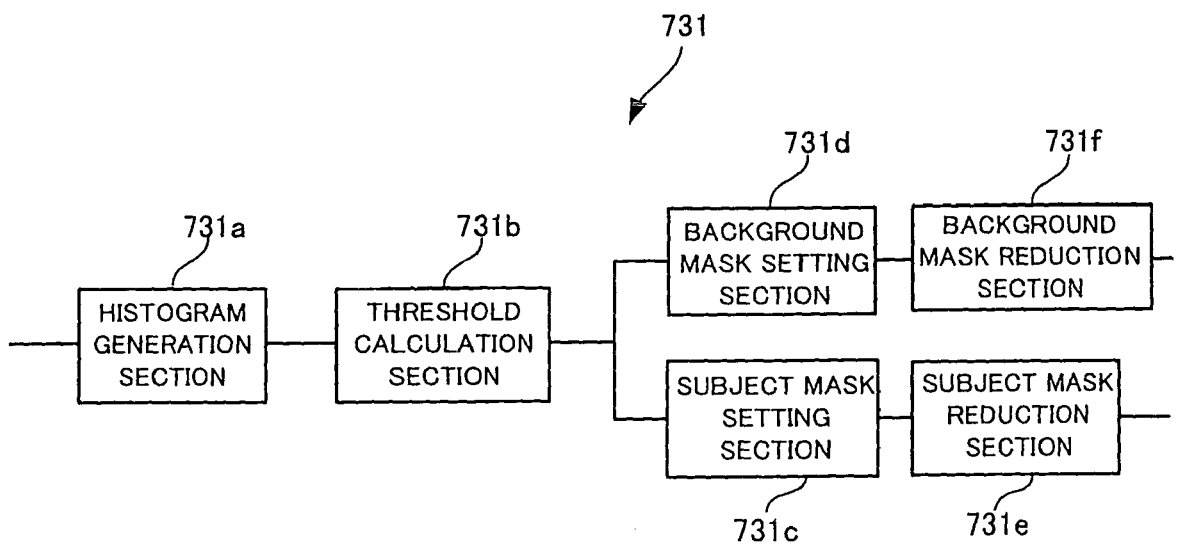
FIG. 24 is a diagram showing the details of a mask generation section shown in one block in FIG. 23.

FIG. 24 shows the details of the mask generation section shown in one block in FIG. 23.

The mask generation section 731 includes a histogram generation section 731a, a threshold calculation section 731b, a background mask setting section 731d, a subject mask setting section 731c, a background mask reduction section 731f, and a subject mask reduction section 731e.

The histogram generation section 731a generates a histogram about the brightness of each pixel forming part of the corrected counter-illuminated taken image.

Figure 25:
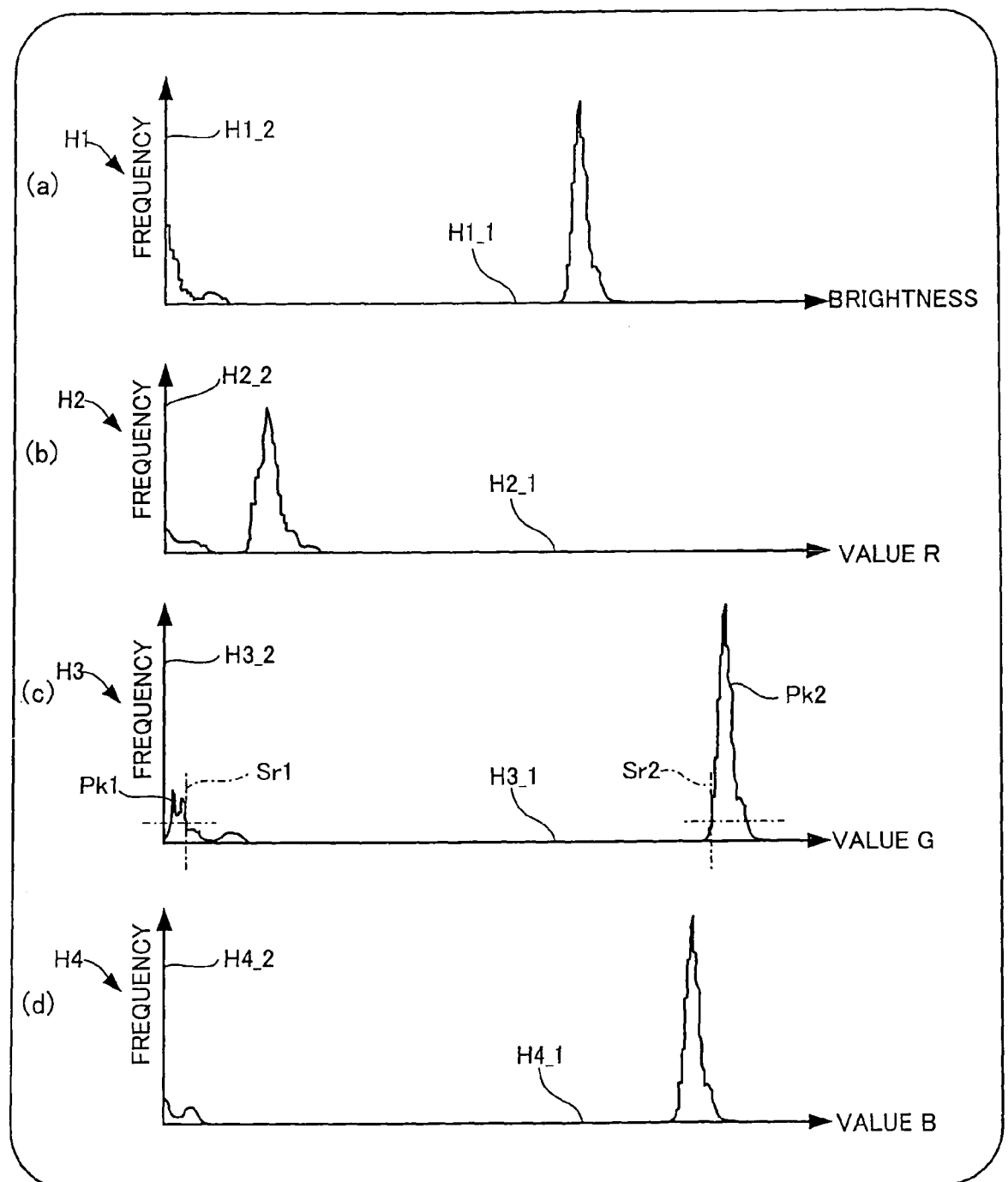
FIG. 25 is a diagram showing various examples of the histograms relating to the brightness of each pixel forming part of the corrected counter-illuminated taken image.

FIG. 25 shows various examples of the histogram relating to the brightness of each pixel forming part of the corrected counter-illuminated taken image.

Part (a) of FIG. 25 shows a brightness histogram H1 indicating the frequency of allocating the pixels in each brightness range after allocating the brightness of each pixel forming part of the counter-illuminated taken image to a number of brightness ranges. In the brightness histogram H1, a horizontal axis H1_1 indicates the brightness, and a vertical axis H1_2 indicates the frequency.

In the present embodiment, the normally-illuminated taken image and the counter-illuminated taken image show the color of each pixel by the coordinates in the RGB color space in which colors are defined by three colors R (red), G (green), and B (blue), that is, the value R, the value G, and the value B in the RGB color space. The brightness of a pixel is reflected by each of the value R, the value G, and the value B indicating the color of a pixel. Therefore, the histogram about the brightness of each pixel forming part of the counter-illuminated taken image can be generated using any of the value R, the value G, and the value B.

Part (b) of FIG. 25 shows a value R histogram H2 indicating the frequency of allocating the pixels in each range after allocating the value R of each pixel forming part of the counter-illuminated taken image to a number of ranges of value R. Part (c) of FIG. 25 shows a value G histogram H3 indicating the frequency of allocating the pixels in each range after allocating the value G of each pixel forming part of the counter-illuminated taken image to a number of ranges of value G. Part (d) of FIG. 25 shows a value B histogram H4 indicating the frequency of allocating the pixels in each range after allocating the value B of each pixel forming part of the counter-illuminated taken image to a number of ranges of value B. In the value R histogram H2 shown in part (b) of FIG. 25, a horizontal axis H2_1 indicates the value R. In the value G histogram H3 shown in part (c) of FIG. 25, a horizontal axis H3_1 indicates the value G. In the value B histogram H4 shown in part (d) of FIG. 25, a horizontal axis H4_1 indicates the value B. The vertical axes H2_2, H3_2, and H4_2 of the three histograms indicate the frequency.

In the present embodiment, since the background of a subject is taken in blue-green as the color of the emitted light of the EL panel 130 in the counter-illuminated taken image, the brightness of each pixel of the counter-illuminated taken image is most reflected by the value G in the value R, the value G, and the value B. Therefore, the histogram generation section 731a shown in FIG. 24 is configured to generate the value G histogram H3 shown by part (c) of FIG. 25 in the four histograms shown in FIG. 25.

The value G histogram H3 indicates two peaks Pk1 and Pk2 at the shadow side and the highlighted side as in the other three histograms. The peak Pk1 at the shadow side appears after allocating the pixels of the subject area in the corrected counter-illuminated taken image, and the peak Pk2 at the highlighted side appears after allocating the pixels of the background area in the counter-illuminated taken image.

The threshold calculation section 731b shown in FIG. 24 calculates the following two thresholds based on the two peaks Pk1 and Pk2 in the value G histogram generated by the histogram generation section 731a. As shown by part (c) of FIG. 25, from the peak Pk1 at the shadow side, a first threshold Sr1 as the upper limit of the value G which is equal to or higher than a predetermined frequency is calculated at the peak Pk1. From the peak Pk2 at the highlighted side, a second threshold Sr2 as the lower limit of the value G which is equal to or higher than a predetermined frequency is calculated at the peak Pk2.

The subject mask setting section 731c shown in FIG. 24 sets the area formed by the pixels having the value G equal to or lower than the first threshold Sr1 as an initial subject mask in the plural pixels constituting the corrected counter-illuminated taken image, and the background mask setting section 731d sets the area formed by the pixels having the value G equal to or higher than the second threshold Sr2 as an initial background mask.

Figure 26:
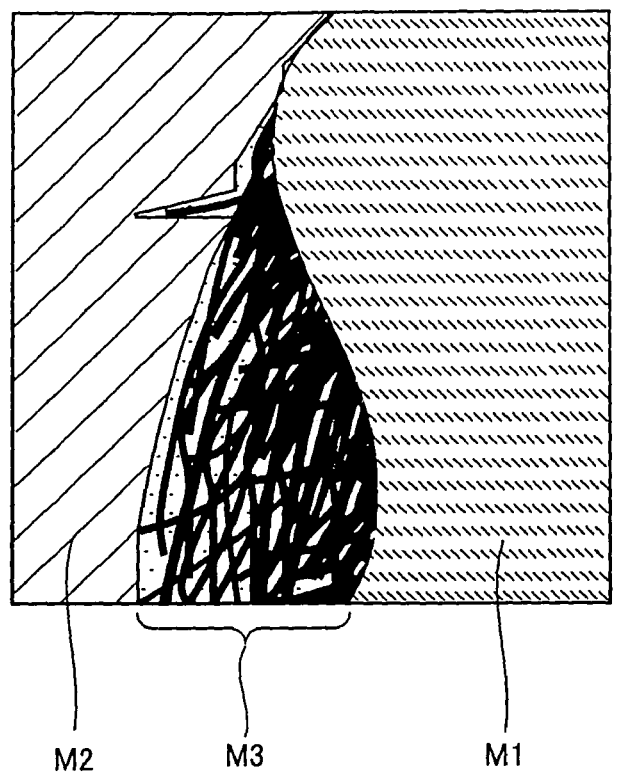
FIG. 26 is a diagram showing an area set by the initial subject mask and an area set by the initial background mask in an enlarged view of the counter-illuminated taken image shown in FIG. 22.

FIG. 26 shows the area set by the initial subject mask and the area set by the initial background mask in an enlarged view of the counter-illuminated taken image shown in FIG. 22.

The hatching portion on the right of FIG. 26 is a portion in which there is such a large amount of hair of the subject P' that the background cannot be seen in the enlarged view shown in FIG. 22, and is a portion largely biased toward the shadow side by the counter illumination. Therefore, the value G of the pixels of the portion is lower than the first threshold Sr1. As a result, the hatching portion on the right of FIG. 26 is set as the initial subject mask M1 by the background mask setting section 731c.

The hatching portion on the left of FIG. 26 is a portion which includes only the EL panel 130 of the background in the enlarged view shown in FIG. 22, and is largely biased toward the highlighted side. Therefore, the value G of the pixels of the portion exceeds the second threshold Sr2. As a result, the hatching portion on the left of FIG. 26 is set as the initial background mask M2 by the background mask setting section 731d.

The portion not belonging to any of the left and right hatching portions in FIG. 26 is a portion in which the background is seen through the hair, and the value G of the portion exceeds the first threshold Sr1 but falls below the second threshold Sr2. As a result, the portion not belonging to any of the left and right hatching portions in FIG. 26 is positioned between the initial subject mask M1 and the initial background mask M2, and remains as a boundary area M3 outside both masks.

Figure 27:
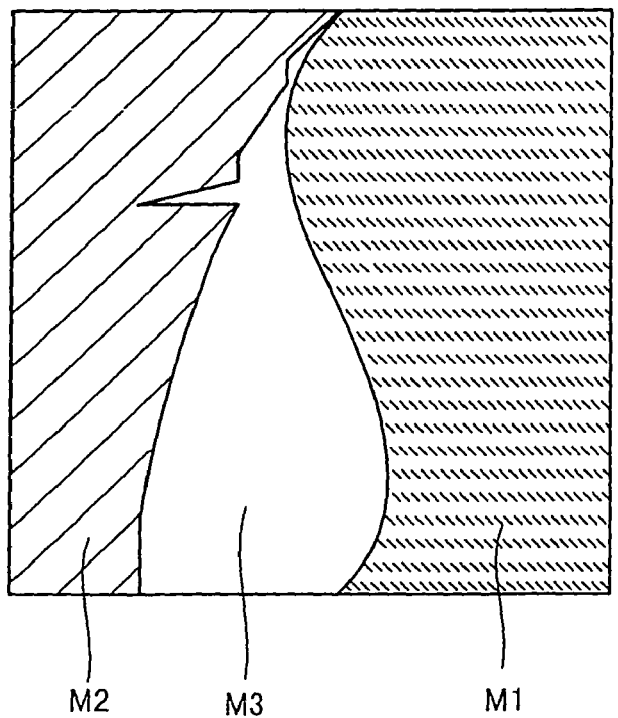
FIG. 27 is a diagram showing the initial subject mask and the initial background mask shown in FIG. 26.
Figure 28:
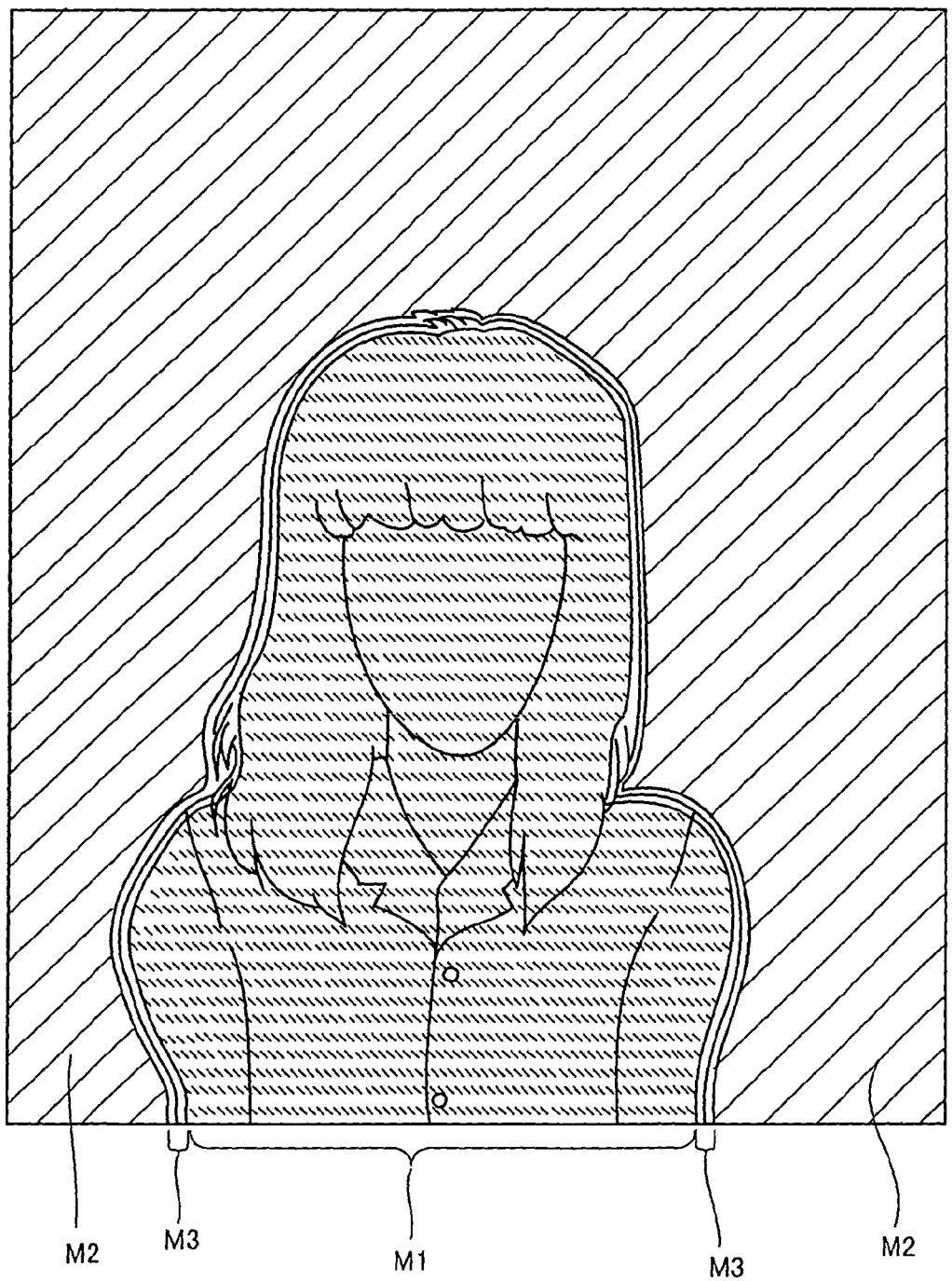
FIG. 28 is a diagram showing the initial subject mask and the initial background mask superposed on the corrected normally-illuminated taken image shown in FIG. 19.

FIG. 27 shows the initial subject mask and the initial background mask shown in FIG. 26. FIG. 28 shows the initial subject mask and the initial background mask superposed on the corrected normally-illuminated taken image shown in FIG. 19.

As shown in FIGS. 27 and 28, the initial subject mask M1 is very close to the initial background mask M2, and the boundary area M3 is very small. As described above, in the corrected counter-illuminated taken image, the position and the contour of the subject in the image are nearly the same as those of the subject in the corrected normally-illuminated taken image. However, since the image taking timing is somewhat shifted, there can be some displacement of the position and the contour of the subject between the two taken images. In this case, if the boundary area M3 is very small, then the portion in which the background is seen through a part of the subject as shown in FIG. 21 is not completely included in the boundary area M3 in the corrected normally-illuminated taken image, and can be included in any of the two masks. When the background is replaced based on the above-mentioned initial subject mask M1 and initial background mask M2, there can be the problems that the old background remains in the portion in which the background is seen through a part of the subject, that the portion is completely replaced with a new background and a part of the subject is missing, etc.

To avoid the problems, in the present embodiment, the subject mask reduction section 731e shown in FIG. 24 reduces the initial subject mask M1 in the direction opposite the boundary area M3, and the background mask reduction section 731f reduces the initial background mask M2 in the direction opposite the boundary area M3. Thus, the boundary area M3 is enlarged, and the portion in which the background is seen through a part of the subject can be completely included in the boundary area M3.

Figure 29:
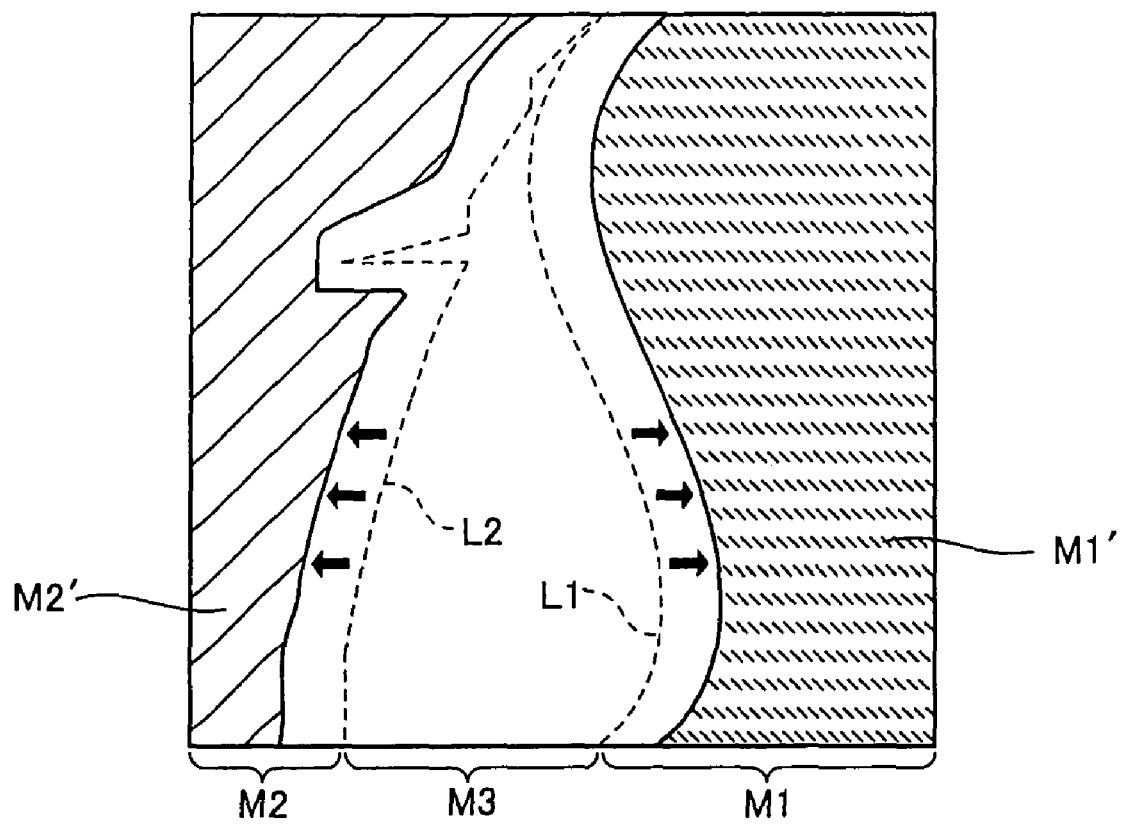
FIG. 29 is a view showing the process of reducing the initial subject mask and the initial background mask shown in FIG. 27 in the direction opposite the respective boundary areas.

FIG. 29 is a view showing the process of reducing the initial subject mask and the initial background mask shown in FIG. 27 in the direction opposite the respective boundary areas.

As shown in FIG. 29, the initial subject mask M1 is reduced by moving the contour L1 of the initial subject mask M1 by a predetermined number of pixels in the direction opposite the boundary area M3. Similarly, the initial background mask M2 is reduced by moving the contour L2 of the initial background mask M2 by a predetermined number of pixels in the direction opposite the boundary area M3. In the present embodiment, five pixels are adopted as the amounts of travel of the contours of the two masks. By the reduction of the masks, the final subject mask M1' and background mask M2' are completed.

Figure 30:
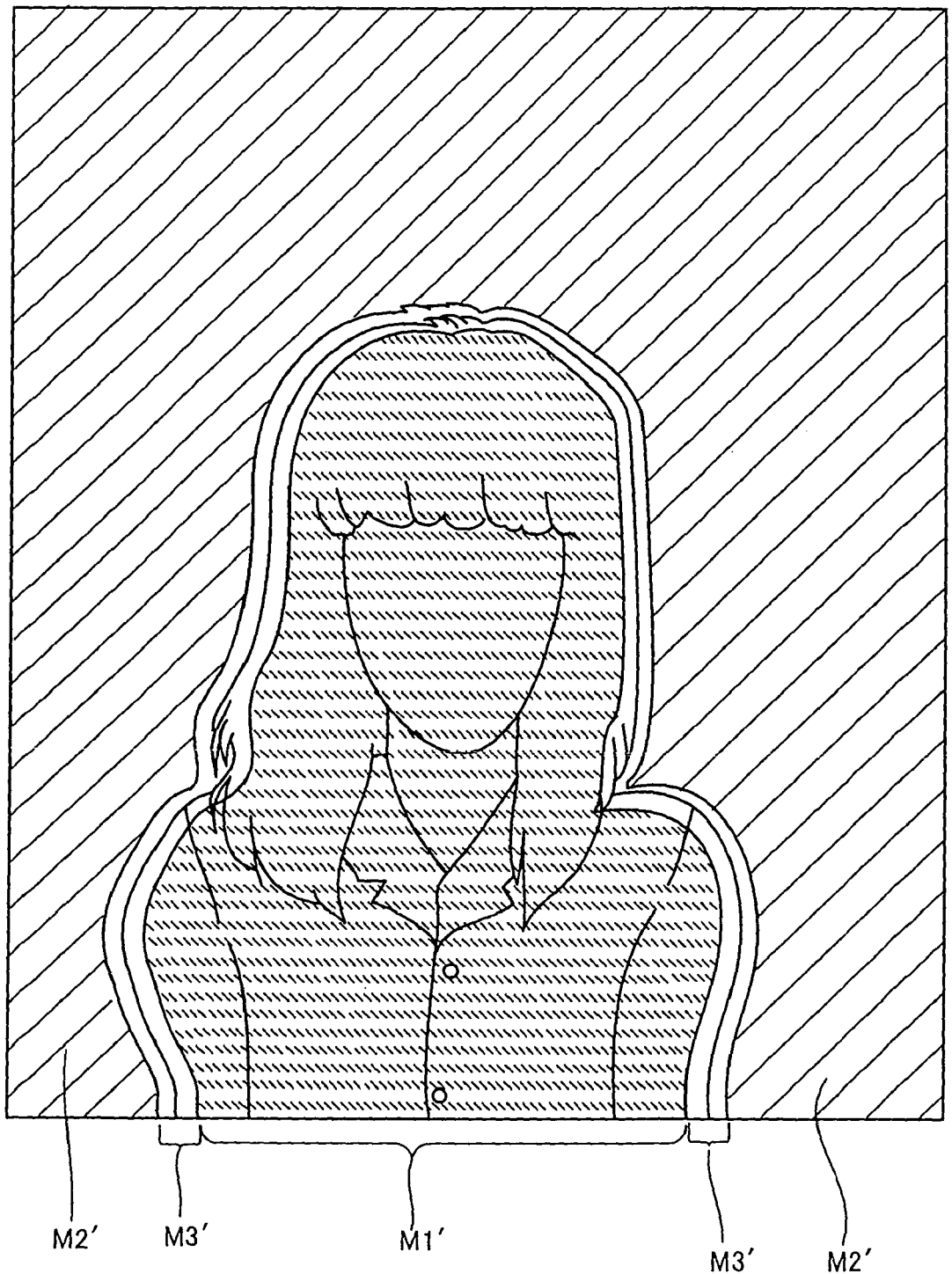
FIG. 30 is a diagram showing the finally completed subject mask and background mask on the entire area of a corrected normally-illuminated taken image shown in FIG. 19.

FIG. 30 shows the finally completed subject mask and background mask on the entire image as a corrected normally-illuminated taken image shown in FIG. 19.

The area between the finally completed subject mask M1' and background mask M2', that is, the final boundary area M3' is ten pixels wider than the boundary area M3 shown in FIG. 28, and the final boundary area M3' sufficiently includes the portion in which the background is seen through a part of the subject as shown in FIG. 30.

Described above is the mask generation section 731 of the replacing section 730 shown in FIG. 23. Next, the color estimation section 732 of the replacing section 730 will be described below in detail.

Figure 31:
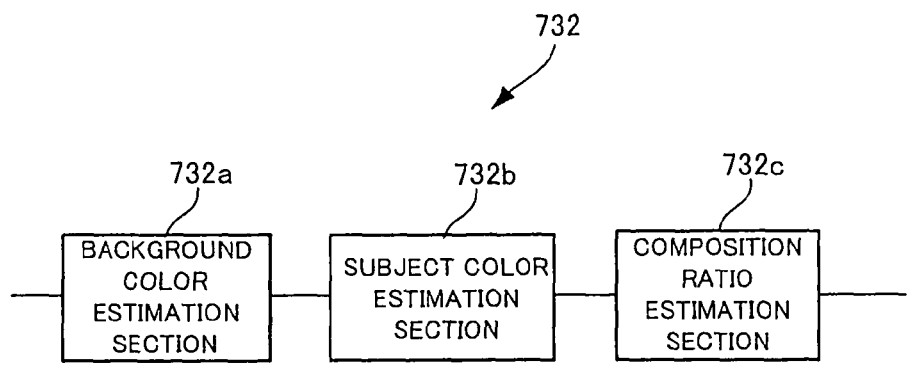
FIG. 31 is a diagram showing the details of a color estimation section indicated in one block shown in FIG. 23.

FIG. 31 shows the details of the color estimation section indicated in one block shown in FIG. 23.

The color estimation section 732 includes a background color estimation section 732a, a subject color estimation section 732b, and a composition ratio estimation section 732c.

First described below is the background color estimation section 732a.

Figure 32:
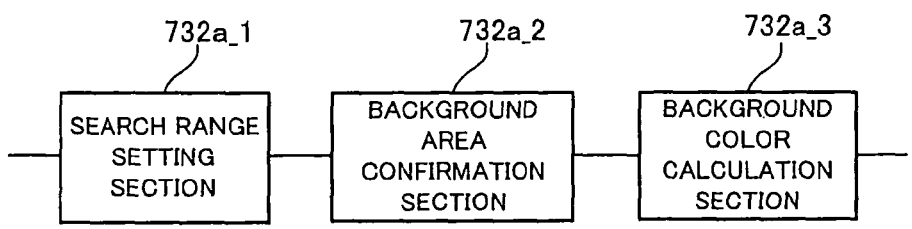
FIG. 32 is a diagram showing the details of a background color estimation section indicated in one block shown in FIG. 31.

FIG. 32 shows the details of the background color estimation section indicated in one block shown in FIG. 31.

The background color estimation section 732a estimates for each pixel of the final boundary area in the corrected normally-illuminated taken image, the background color composed of the color of the pixel, and includes a search range setting section 732a_1, a background area confirmation section 732a_2, and a background color calculation section 732a_3.

When the background color estimation section 732a estimates the background color for a certain pixel in the boundary area, the pixels in the area defined by the background mask are searched for plural pixels near the certain pixel for a certain degree, and an average color of the colors of the plural retrieved pixels is obtained as the background color of the pixel.

The search range setting section 732a_1 sets a square search range centering the pixel for which the background color is estimated as follows.

Figure 33:
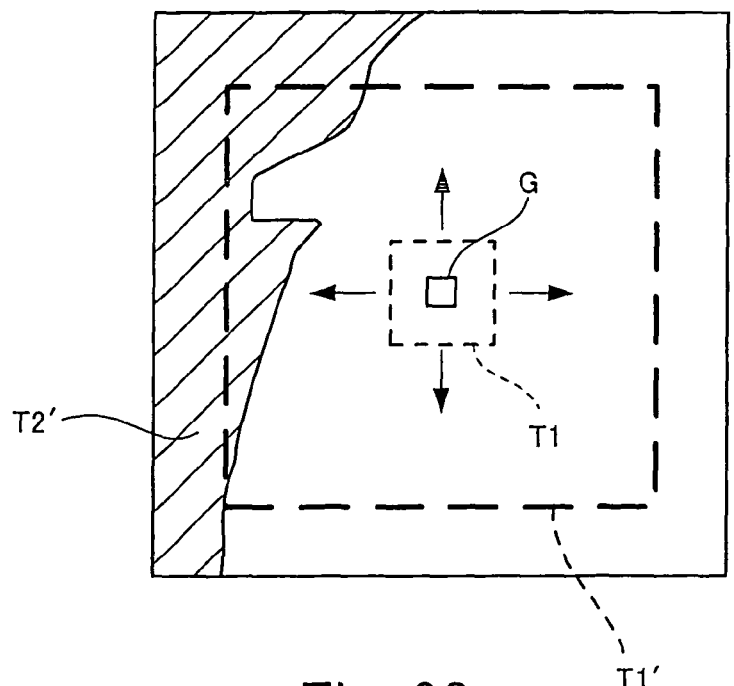
FIG. 33 is a diagram showing the process of setting a search range centering a certain pixel when the background color is estimated for the pixel.

FIG. 33 shows the process of setting the search range centering a certain pixel when the background color is estimated for the pixel.

When the search range is set for a pixel G in a boundary area, the search range setting section 732a_1 first expands the search range gradually from a predetermined square initial range T1 centering the pixel G. The search range setting section 732a_1 stops enlarging the range when the pixels of the area defined by the background mask M2' exceeding a predetermined number are contained in the search range, and the search range T1' is set as a search range in estimating a background color.

When the search range is set, the background area confirmation section 732a_2 shown in FIG. 32 confirms the next area in the corrected normally-illuminated taken image as an area for use in estimating the background color for the pixel G.

Figure 34:
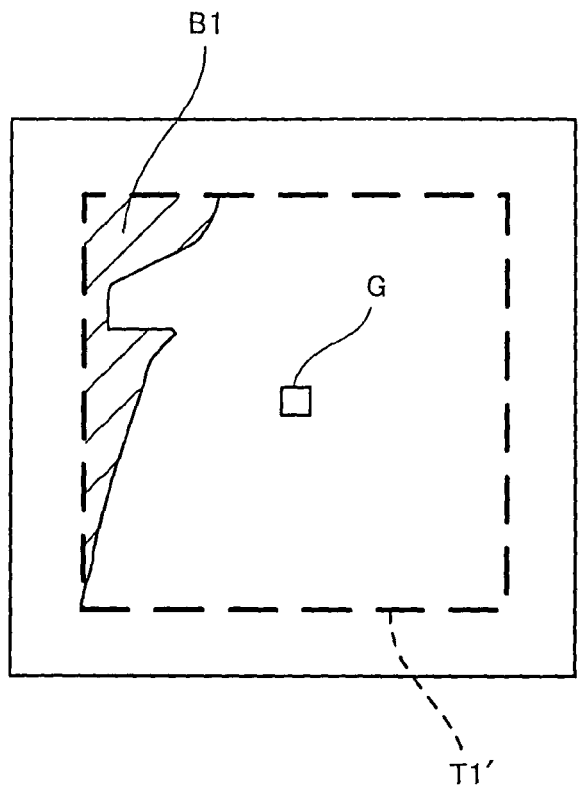
FIG. 34 is a diagram showing an example of the area for use in estimating the background color of a pixel.

FIG. 34 shows an example of the area for use in estimating the background color of a pixel.

As shown in FIG. 34, an area defined by the background mask in the corrected normally-illuminated taken image which is also an area B1 in the search range T1' set by the search range setting section 732a_1 is confirmed as an area for use in estimating the background color of the pixel G.

When the area B1 for use in estimating the background color of the pixel G is confirmed, the background color calculation section 732a_3 shown in FIG. 24 calculates the average value of plural pixels in the area B1, that is, calculates the respective average values of the value R, value G, and value B of the plural pixels. The color indicated by the calculation results is adopted as the background color of the pixel G.

The background color estimation section 732a described above performs a process from setting the search range to calculating the average value on all pixels in the boundary area of the corrected normally-illuminated taken image.

Described next is the subject color estimation section 732b shown in FIG. 31.

Figure 35:
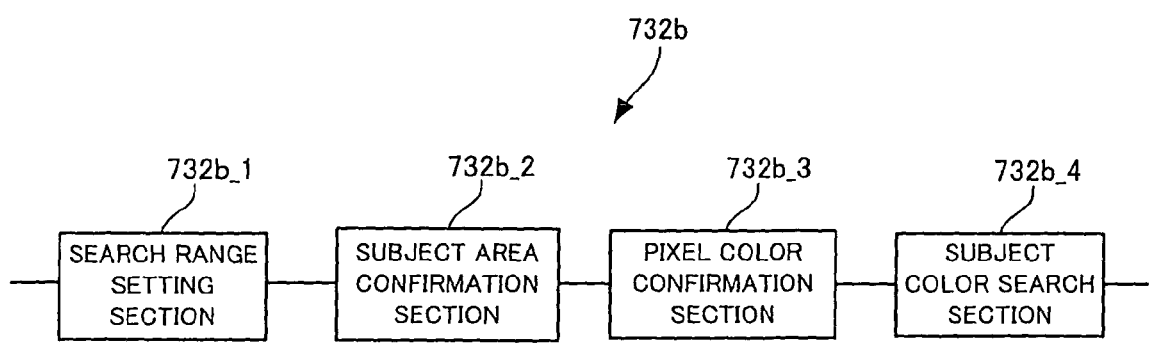
FIG. 35 is a diagram showing the details of a subject color estimation section indicated in one block shown in FIG. 31.

FIG. 35 shows the details of the subject color estimation section indicated in one block shown in FIG. 31.

The subject color estimation section 732b estimates the subject color configuring the color of each pixel in the final boundary area in the corrected normally-illuminated taken image, and includes a search range setting section 732b_1, a subject area confirmation section 732b_2, a pixel color confirmation section 732b_3, and a subject color search section 732b_4.

When a subject color is estimated for a certain pixel in a boundary area, the subject color estimation section 732b searches the pixels in the area defined by the subject mask for plural pixels positioned somewhat-near the certain pixel, and searches the colors of the plural retrieved pixels for the subject color of the pixel in the searching method described later.

The search range setting section 732b_1 sets a square search range centering the pixel for which the subject color is estimated as follows.

Figure 36:
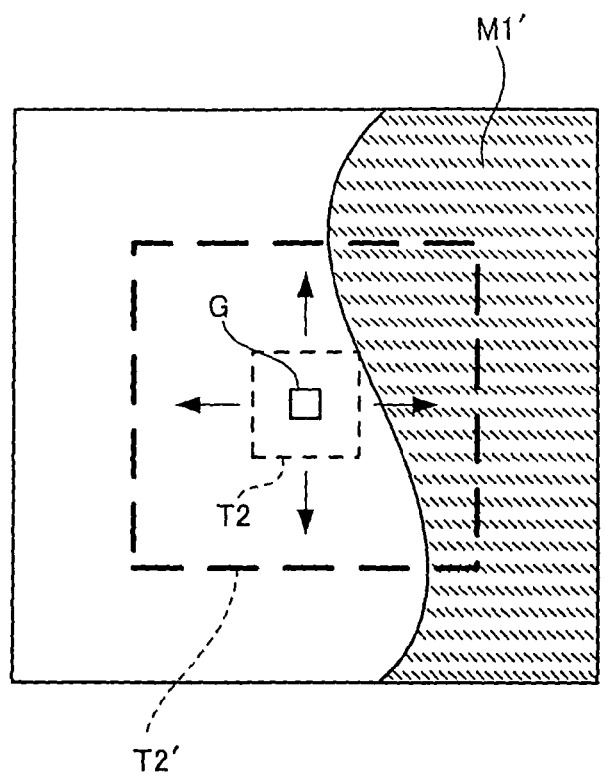
FIG. 36 is a diagram showing the process of setting a search range centering a pixel when a subject color is estimated for the pixel.

FIG. 36 shows the process of setting a search range centering a pixel when a subject color is estimated for the pixel.

When a search range is set for a certain pixel G in a boundary area, the search range setting section 732b_1 first expands the search range gradually from a predetermined square initial range T2 centering the pixel G. Then, the search range setting section 732b_1 stops expanding the range when the pixels in the area defined by the subject mask M1' exceeding a predetermined number are included in the search range, and sets the current search range T2' as a search range for estimation of the subject color.

When the search range is set, the subject area confirmation section 732b_2 shown in FIG. 35 confirms the following area in the corrected normally-illuminated taken image as an area for use in estimating the subject color for the pixel G.

Figure 37:
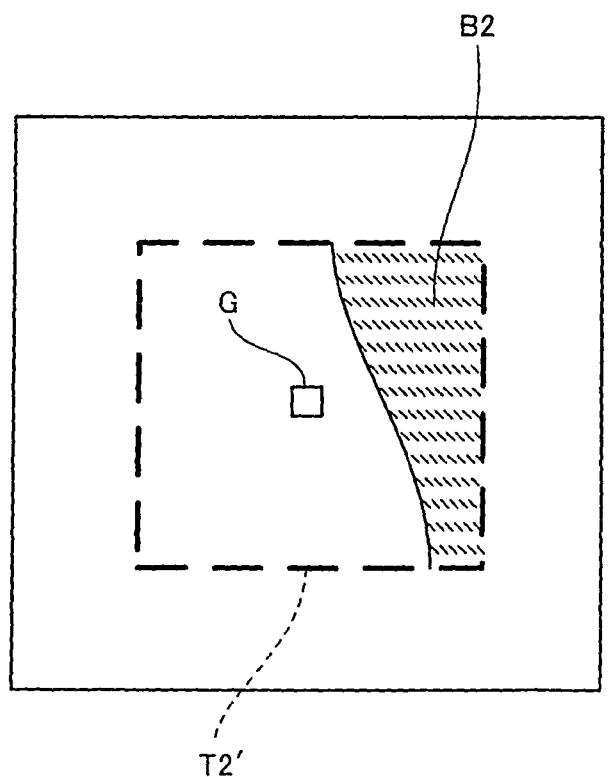
FIG. 37 is a diagram showing an example of an area for use in estimating the subject color for a certain pixel.

FIG. 37 shows an example of an area for use in estimating the subject color for a certain pixel.

As shown in FIG. 37, an area defined by the subject mask in the corrected normally-illuminated taken image which is also an area B2 in the search range T2' set by the search range setting section 732b_1 is confirmed as an area for use in estimating the subject color of the pixel G.

When the area B2 for use in estimating the subject color of the pixel G is confirmed, the pixel color confirmation section 732b_3 shown in FIG. 35 first confirms the color of the pixel G, and then the subject color search section 732b_4 shown in FIG. 35 searches the colors of plural pixels in the area B2 for the subject color for the pixel G in the following searching method.

Figure 38:
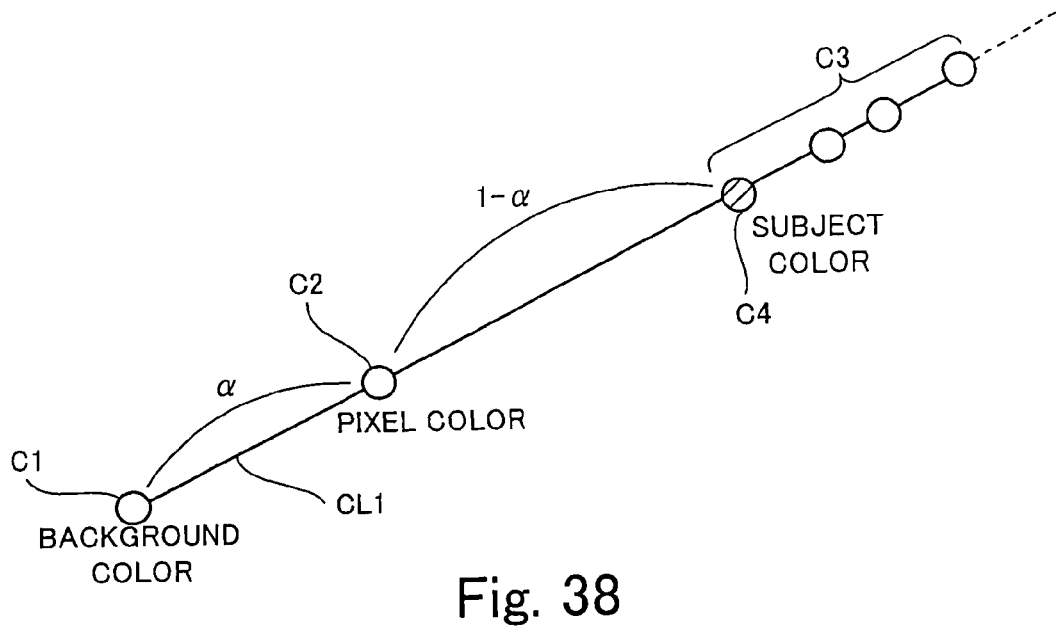

FIG. 38 shows a searching method used when a subject color of a certain pixel in a boundary area in a corrected normally-illuminated taken image is searched for.

FIG. 38 shows a straight line CL1 which connects in the RGB color space a background color C1 estimated by the background color estimation section 732a shown in FIG. 31 to a pixel color C2 confirmed by the pixel color confirmation section 732b_3 shown in FIG. 35 for a pixel in a boundary area in the corrected normally-illuminated taken image.

As described above, there is the possibility that the color of the pixel in the boundary area in the corrected normally-illuminated taken image is a composite color of the background color and the subject color with the background seen through a part of the subject during the image-taking process. If the color of the pixel for which the subject color is searched for is the composite color, the pixel color C2 as the composite color, the background color C1 as a source of the pixel color C2, and the subject color are arranged in line in the RGB color space.

The subject color search section 732b_4 shown in FIG. 35 searches the colors of plural pixels in the area B2 for the color C3 arranged in line on the extended line of the straight line CL1.

When there are plural colors C3, there is the strong possibility that the color closest to the pixel color C2 on the extended line of the straight line CL1 is the source of the pixel color C2 together with the background color C1. Then, when there are plural colors C3 arranged in line on the extended line of the straight line CL1, the subject color search section 732b_4 adopts the color closest to the pixel color C2 as the subject color C4 for the pixel.

The subject color estimation section 732b performs the process from setting the search range to searching the subject color on all pixels in the boundary area in the corrected normally-illuminated taken image.

Described above is the subject color estimation section 732b shown in FIG. 31. Next, the composition ratio estimation section 732c shown in FIG. 31 will be described below. The composition ratio estimation section 732c will be described by referring to FIG. 38.

As shown in FIG. 38, the composition ratio estimation section 732c performs calculation using the ratio of the length of the line connecting the background color C1 to the pixel color C2 to the length of the line connecting the background color C1 estimated by the background color estimation section 732a to the subject color C4 estimated by the subject color estimation section 732b in the RGB color space as the composition ratio α when the pixel color C2 is obtained by combining the background color C1 and the subject color C4. The composition ratio estimation section 732c performs the calculation of the composition ratio α on all pixels in the boundary area in the corrected normally-illuminated taken image.

Described above are the details of the color estimation section 732 of the replacing section 730 shown in FIG. 23.

Described below are the details of the background-replaced-image generation section 733 of the replacing section 730.

The background-replaced-image generation section 733 leaves the area defined by the subject mask as is, and replaces the area defined by the background mask with another background desired by a client in the corrected normally-illuminated taken image as described above.

Then, the background-replaced-image generation section 733 obtains a composite color for each pixel in the boundary area by combining the background color desired by a client with the subject color estimated by the color estimation section 732 at the composition ratio estimated by the color estimation section 732.

Figure 39:
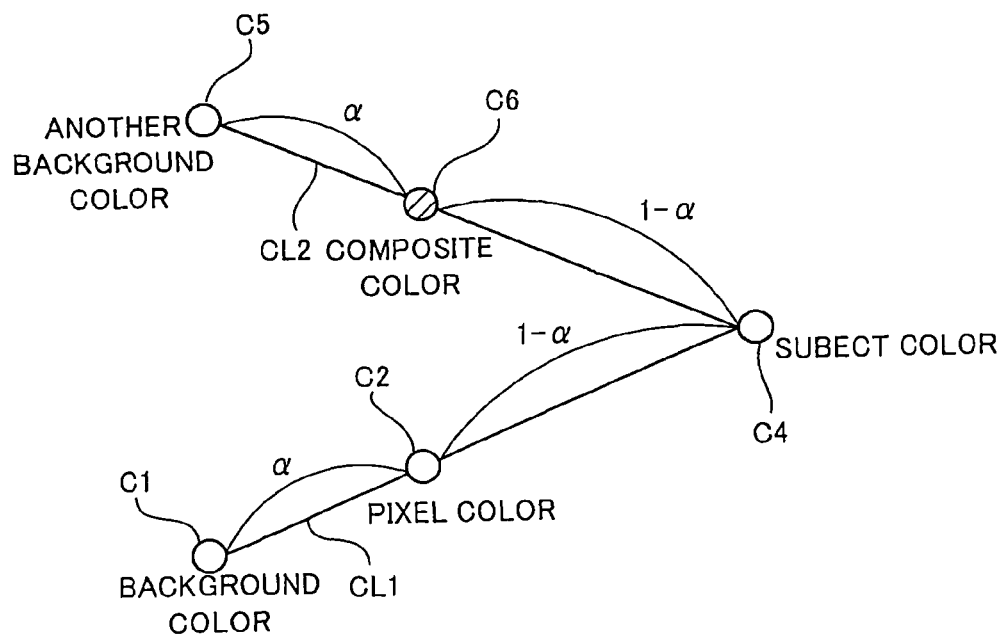
FIG. 39 is a diagram showing the process of obtaining a composite color for a pixel in a boundary area in the corrected normally-illuminated taken image.

FIG. 39 shows the process of obtaining a composite color for a pixel in a boundary area in the corrected normally-illuminated taken image.

FIG. 39 shows the straight line CL1 also shown in FIG. 38 as connecting the estimated background color C1, the pixel color C2, and the estimated subject color C4 in the RGB color space. The pixel color C2 can be a point which divides the line connecting the background color C1 to the subject color C4 at the composition ratio $\alpha$: (1−composition ratio $\alpha$). The background-replaced-image generation section 733 adopts the point which divides the straight line CL2 connecting another background color C5 to the estimated subject color C4 at the composition ratio $\alpha$: (1−composition ratio $\alpha$) as the composite color C6 as shown in FIG. 39.

In the method described by referring to FIG. 39, when the composite color is obtained for all pixels in the boundary area, the background-replaced-image generation section 733 completes the background-replaced image in which the background of the corrected normally-illuminated taken image is replaced with another background desired by a client by replacing the colors of all pixels with the composite color obtained for each pixel.

The boundary area in the corrected normally-illuminated taken image includes the portion occupied completely by the subject and the portion occupied completely by the background in addition to the portion in which the background is seen through a part of the subject as shown in FIG. 30, etc. The color of the pixel of the portion occupied completely by the subject is the color of the subject itself. Therefore, it is necessary to maintain the color of the pixel although the background is replaced with another background. The color of the pixel occupied completely by the background is the color of the background itself. Therefore, when the background is replaced with another background, it is necessary to replace the colors of the pixels completely with the color of the other background.

In the present embodiment, when the pixel for which the background color, the subject color, or the composition ratio is to be estimated is occupied completely by the subject, the colors of most of the pixels in the area used in estimating the subject color for the pixel as in the area B2 shown in FIG. 37 are the color of the subject itself which is the same as the color of the pixel to be estimated. As a result, relating to the pixel, the composition ratio $\alpha$ is substantially equal to "1". When the background is replaced, the composite color is obtained based on the composition ratio $\alpha$. Therefore, the color of the subject itself which is the color of the pixel can be maintained.

When the pixel for which the background color, the subject color, or the composition ratio is to be estimated is occupied completely by the background, the color of the pixel is the color of the background which is the same as the background color estimated for the pixel. As a result, relating to the pixel, the composition ratio $\alpha$ is substantially equal to "0". When the background is replaced, the color of the pixel is completely replaced with another background color based on the composition ratio $\alpha$.

Eventually, according to the present embodiment, when the pixel for which the background color, the subject color, or the composition ratio is to be estimated is a pixel of the portion in which the background is seen through a part of the subject, the composition ratio $\alpha$ has a value between "0" and "1". Therefore, when the background is replaced, the subject color is combined with another background color, and a natural background-replaced image can be generated.

Figure 40:
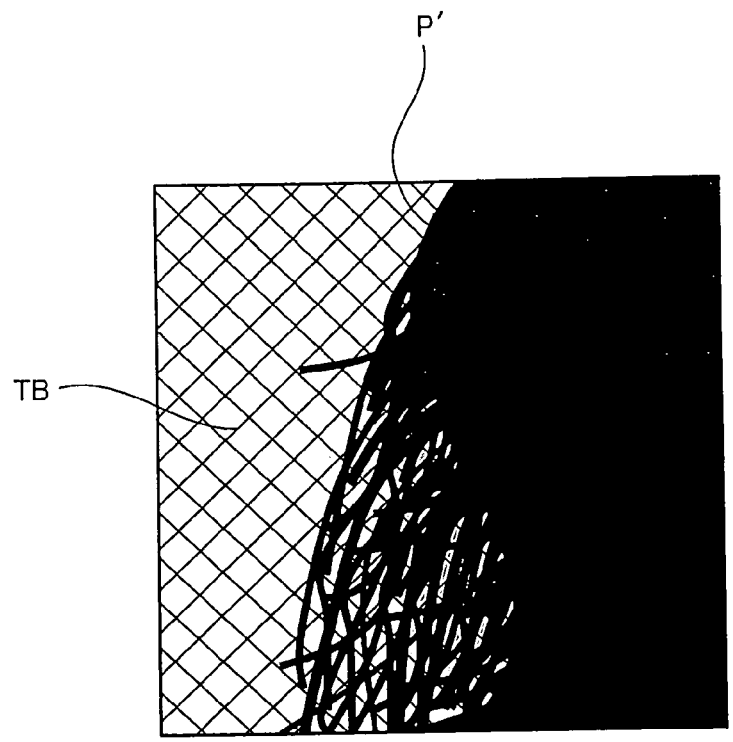
FIG. 40 is a diagram showing an example of a background-replaced image.

FIG. 40 shows an example of a background-replaced image.

FIG. 40 is an enlarged view from the portion of the area A1 shown in FIG. 19 in the background-replaced image generated by replacing the background of the corrected normally-illuminated taken image shown in FIG. 19.

The background-replaced image generated by the background-replaced-image generation section 733 is an image obtained by replacing the color of the pixel in the boundary area with the composite color. From the background-replaced image, a viewer recognizes the states in which another replacing background TB is seen through the hair of the subject P' as shown in FIG. 40. That is, the background-replaced image generated by the background-replaced-image generation section 733 is an image in which the background is naturally replaced with another background.

As described above by referring to FIGS. 1 to 40, according to the image-taking system 1 of the present embodiment, the background is quite different from the subject in brightness in an image, and the background is discriminated from the subject in the corrected normally-illuminated taken image based on the corrected counter-illuminated taken image in which the background can be discriminated from the subject without erroneous recognition. Therefore, when the background in the corrected normally-illuminated taken image is replaced with another background, the disadvantage that a part of the subject is erroneously replaced with the background, the old background remains in the background-replaced image, etc. can be suppressed. As a result, a background-replaced image in which the background is naturally replaced with a desired background can be generated.

Furthermore, according to the image-taking system 1 of the present embodiment, the boundary area between the subject area and the background area is recognized in the corrected normally-illuminated taken image. Therefore, when the background is replaced, the color of the pixel in the boundary area is replaced with the composite color obtained by appropriately combining another replacing background color with the subject color. Thus, for example, although there is a portion in which the background is seen through a part of the subject, a natural background-replaced image in which another background is seen through a part of the subject can be generated by replacing the background.

In the description above, as an example of the background replacement device according to the present invention, the background replacement device 700 generates two masks of a subject mask for definition of the range occupied by the subject in the corrected counter-illuminated taken image and a background mask for definition of the range occupied by the background, and replaces using the two masks the background in the corrected normally-illuminated taken image. However, the present invention is not limited to this application. For example, the background replacement device according to the present invention may generate the background mask only as described below, and using the background mask only, the background in the corrected normally-illuminated taken image etc. can be replaced.

Described below is an example of the method of replacing a background only using a background mask. It is assumed that the background mask in this example is generated in the same method as in the process of generating a background mask performed by the mask generation section 731 shown in FIG. 23. The method of generating a background mask is described above, and is omitted here.

In the replacement of the background using the background mask only, a non-background mask for definition of an area except the area defined by the background mask is generated in the corrected normally-illuminated taken image based on the background mask. The area defined by the non-background mask is an area obtained by adding the area defined by the subject mask to the boundary area. On all pixels in the area defined by the non-background mask, the background color, the subject color, and the composition ratio between them are estimated. Assuming that the background color is estimated in the same method as the estimating method by the background color estimation section 732a shown in FIG. 31, the explanation of the estimation of the background color is omitted here. In the description below, the method of estimating the subject color is mainly described.

Figure 41:
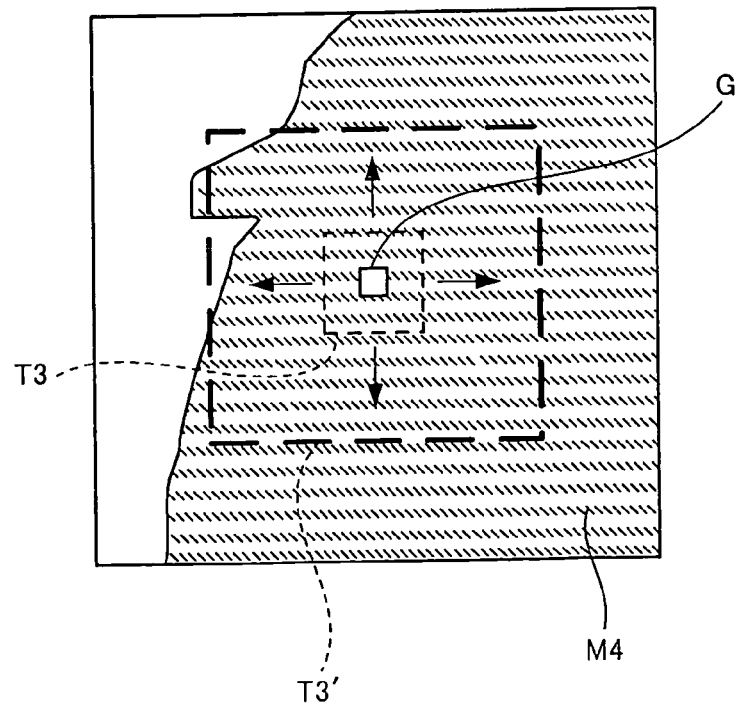
FIG. 41 is a diagram showing the process of setting the search range centering the pixel when the subject color is estimated for the pixel in the area defined by the non-background mask in the corrected normally-illuminated taken image.

FIG. 41 shows the process of setting the search range centering the pixel when the subject color is estimated for the pixel in the area defined by the non-background mask in the corrected normally-illuminated taken image. In FIG. 41, the area defined by the subject mask M1' shown in FIG. 29 added to the boundary area M3 is shown as an example of the area defined by the non-background mask M4.

When the search range for the pixel G in the area defined by the non-background mask M4 is set, the search range is enlarged gradually from a predetermined square initial range T3 centering the pixel G. Then, when the pixels in the area defined by the non-background mask M4 in the corrected normally-illuminated taken image exceeding a predetermined number are included in the search range, the expanding operation is stopped, and the current search range T3' is set as the search range for estimation of the subject color.

When the search range is set, the next area in the corrected normally-illuminated taken image is confirmed as an area for use in estimating the subject color for the pixel G.

Figure 42:
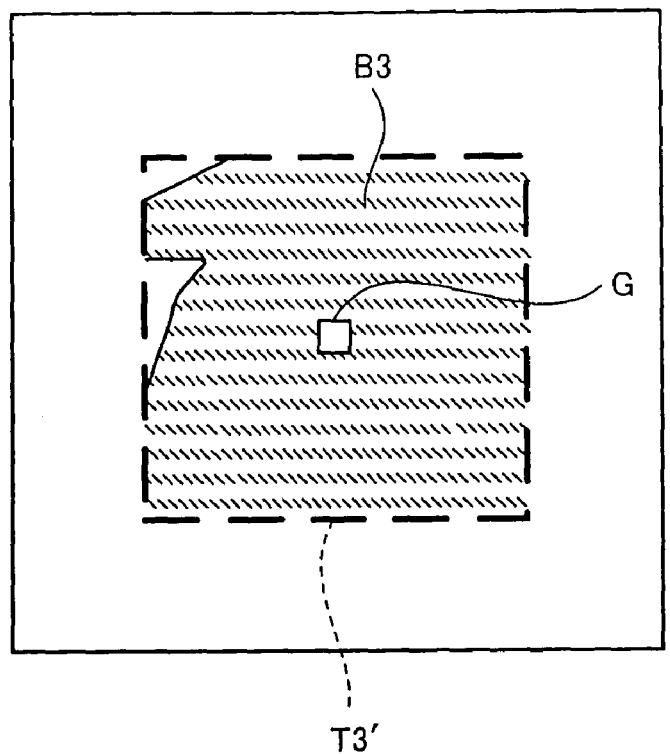
FIG. 42 is a diagram showing an example of an area for use in estimating the subject color for a pixel.

FIG. 42 shows an example of an area for use in estimating the subject color for a pixel.

As shown in FIG. 42, an area defined by the non-background mask in the corrected normally-illuminated taken image which is also an area B3 in the search range T3' set as described above is confirmed as an area for use in estimating the subject color of the pixel G.

When the area B3 for use in estimating the subject color of the pixel G is confirmed, the color of the pixel G is first confirmed. Next, the colors of plural pixels in the area B3 are searched for the subject color of the pixel G in the following searching method.

Figure 43:
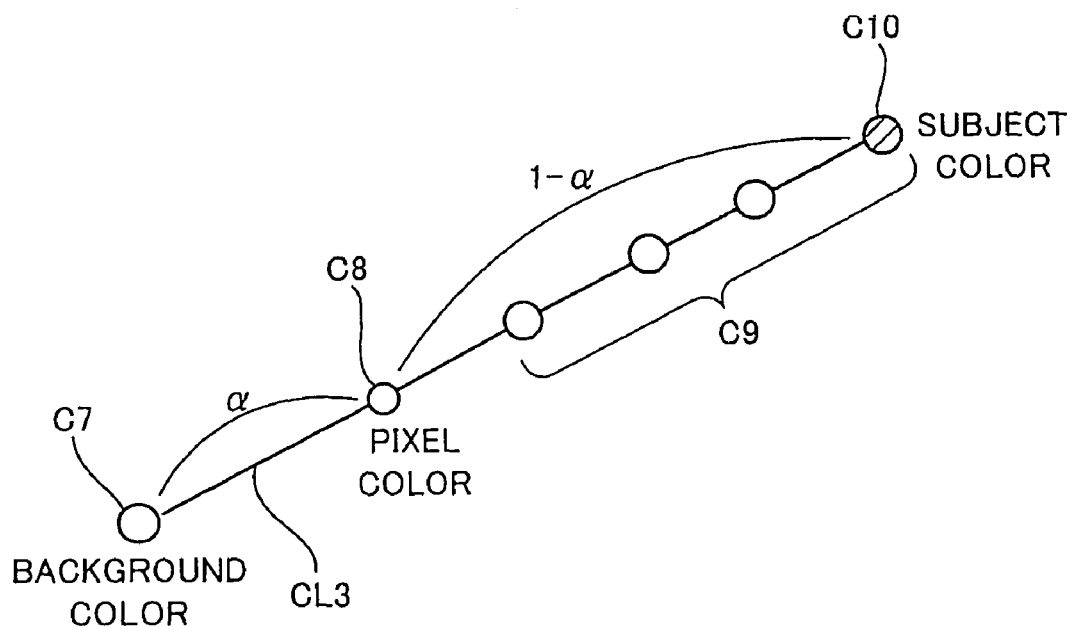
FIG. 43 is a diagram showing a searching method used when the subject color of a pixel in the area defined by the non-background mask is searched for in the corrected normally-illuminated taken image.

FIG. 43 shows the searching method used when the subject color of a pixel in the area defined by the non-background mask is searched for in the corrected normally-illuminated taken image.

FIG. 43 shows the straight line CL3 connecting in the RGB color space the estimated background color C7 to the color C8 of the pixel in the boundary area in the corrected normally-illuminated taken image.

The area defined by the non-background mask in the corrected normally-illuminated taken image includes the boundary area as described above. There is the possibility that the boundary area includes the portion in which the background is seen through a part of the subject, and the color of the pixel in the portion is a composite color obtained by combining the background color with the subject color. If the color of the pixel for which the subject color is searched for is the composite color, the color C8 of the pixel as the composite color, the background color C7 as a source of the color C8, and the subject color are arranged in line in the RGB color space.

First, the colors of plural pixels in the area B3 is searched for the color C9 arranged on the extended line from the straight line CL3. If there are plural colors C9, one of the plural colors C9 is adopted as a subject color.

The area defined by the non-background mask includes pixels of colors except the subject color such as a pixel having the composite color, a pixel having the background color only, etc. Therefore, in the plural colors C9, there is the strong possibility that the farthest color from the color C8 of the pixel is the subject color as the source of the color C8 of the pixel together with the background color C7.

In the method of searching for the subject color in the colors of the pixels in the area defined by the non-background mask, when plural colors C9 are arranged in line on the extended line of the straight line CL3, one of the colors C9 that is the farthest color from the color C7 of the pixel is adopted as the subject color C10 of the pixel.

Thus, when the subject color is estimated, as shown in FIG. 43, the ratio of the length of the line connecting the background color C7 to the color C8 of the pixel to the length of the line connecting the background color C7 estimated by the background color estimation section 732a to the subject color C10 estimated by the subject color estimation section 732b in the RGB color space is calculated as a composition ratio α for use when the color C8 of the pixel is composed by the background color C7 and the subject color C10.

When the background is replaced using the background mask only, the process from setting the search range to calculating the composition ratio is performed on all pixels in the area defined by the non-background mask in the corrected normally-illuminated taken image.

When the estimation of the composition ratio between the background color and the subject color is completed, the area defined by the background mask in the corrected normally-illuminated taken image is replaced with another background desired by a client. Next, the composite color is obtained in the method described above by referring to FIG. 39 on all pixels in the area defined by the non-background mask in the corrected normally-illuminated taken image, and the colors of all pixels in the area defined by the non-background mask are replaced with the composite color, thereby completing the background-replaced image.

Relating to the pixel in the portion occupied by the subject only in the area defined by the non-background mask, the composition ratio α is substantially "1", and when the background is replaced, the color of the subject itself is maintained. Relating to the pixel in the portion occupied by the background only in the area defined by the non-background mask, the composition ratio α is substantially "0", and when the background is replaced, the color of the pixel is completely replaced with another background color.

In the replacement of the background using the background mask only as described above by referring to FIGS. 41 to 43, as in the image-taking system 1 described by referring to FIGS. 1 to 40, a background-replaced image in which the background in the taken image is naturally replaced with a desired background can be generated.

Described below is the second embodiment of the present invention.

The second embodiment is different from the first embodiment in the configuration of the image-taking studio in the image-taking system, and the image-taking process performed in the image-taking studio. In the description below, the difference between the first and second embodiments is considered and explained, and the explanation of the identical points between them is omitted here.

Figure 44:
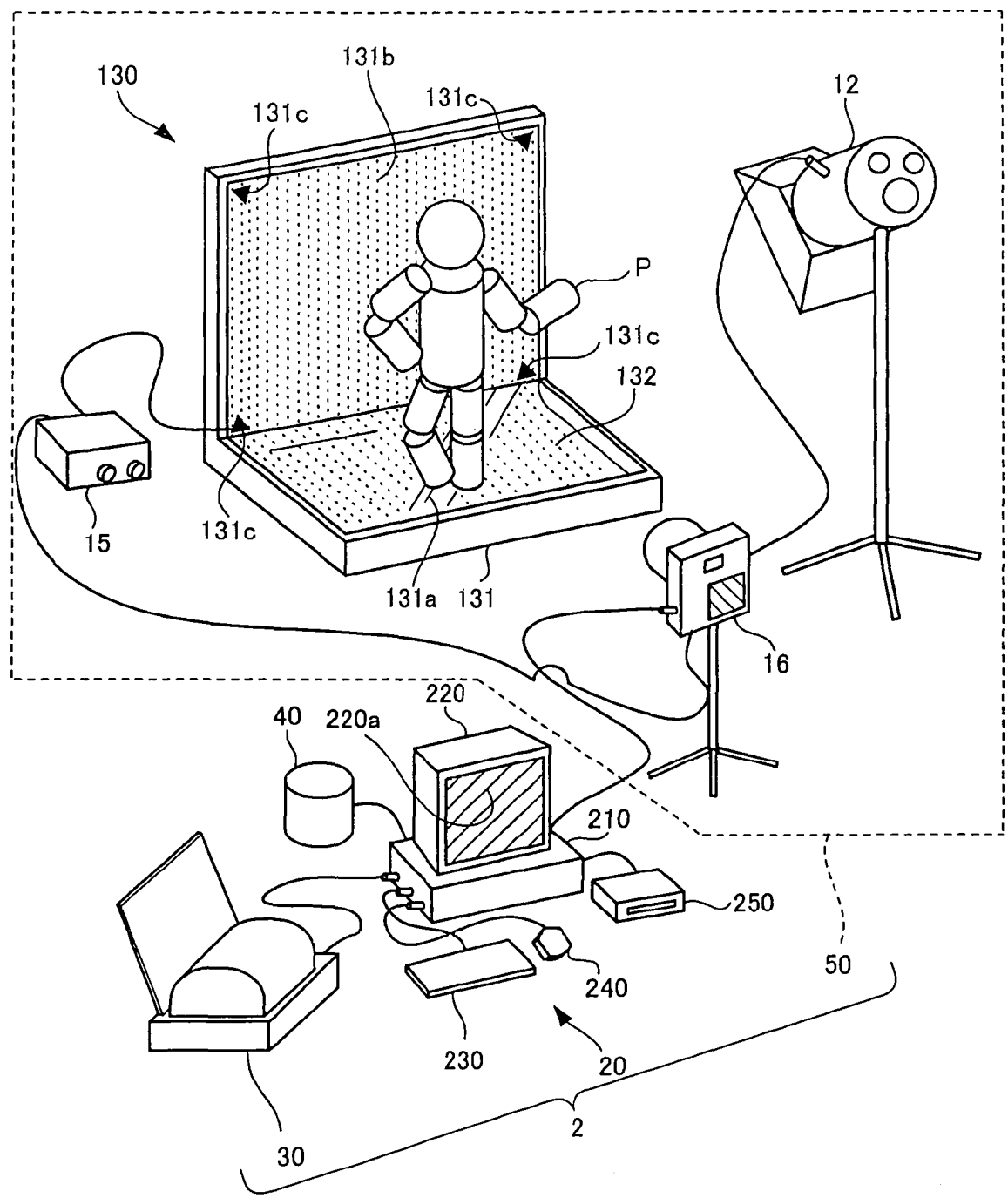
FIG. 44 is a diagram showing a second embodiment of the image-taking system according to the present invention.

FIG. 44 shows the second embodiment of the image-taking system according to the present invention.

In FIG. 44, the components equivalent to FIG. 1 are assigned the same reference characters as in FIG. 1, and in the following description by referring to FIG. 44, the explanation of these components is omitted.

In an image-taking studio 50 of the image-taking system 2 shown in FIG. 44, a power supply 15 for the EL panel 130 is connected to a digital camera 16.

As with the first embodiment, the digital camera 16, upon one pushing down of the shutter button, continuously performs an image-taking process twice. At this time, the digital camera 16 issues to the power supply 15 a panel light instruction signal to instruct the power supply 15 to turn on the EL panel 130, and then issues to the flashing device 12 a flash instruction signal to instruct the flashing device 12 to emit a flash.

The flashing device 12 emits a flash in response to the first flash instruction signal, but cannot answer the second flash instruction signal, and keeps the OFF state.

The power supply 15 is constituted to turn on the EL panel 130 when the panel light instruction signal is continuously input twice.

Described below is the flow of the operation performed by the image-taking system 2. In the description below, the components shown in FIG. 44 can be described with the reference characters shown in FIG. 44 without specifying a figure number.

Figure 45:
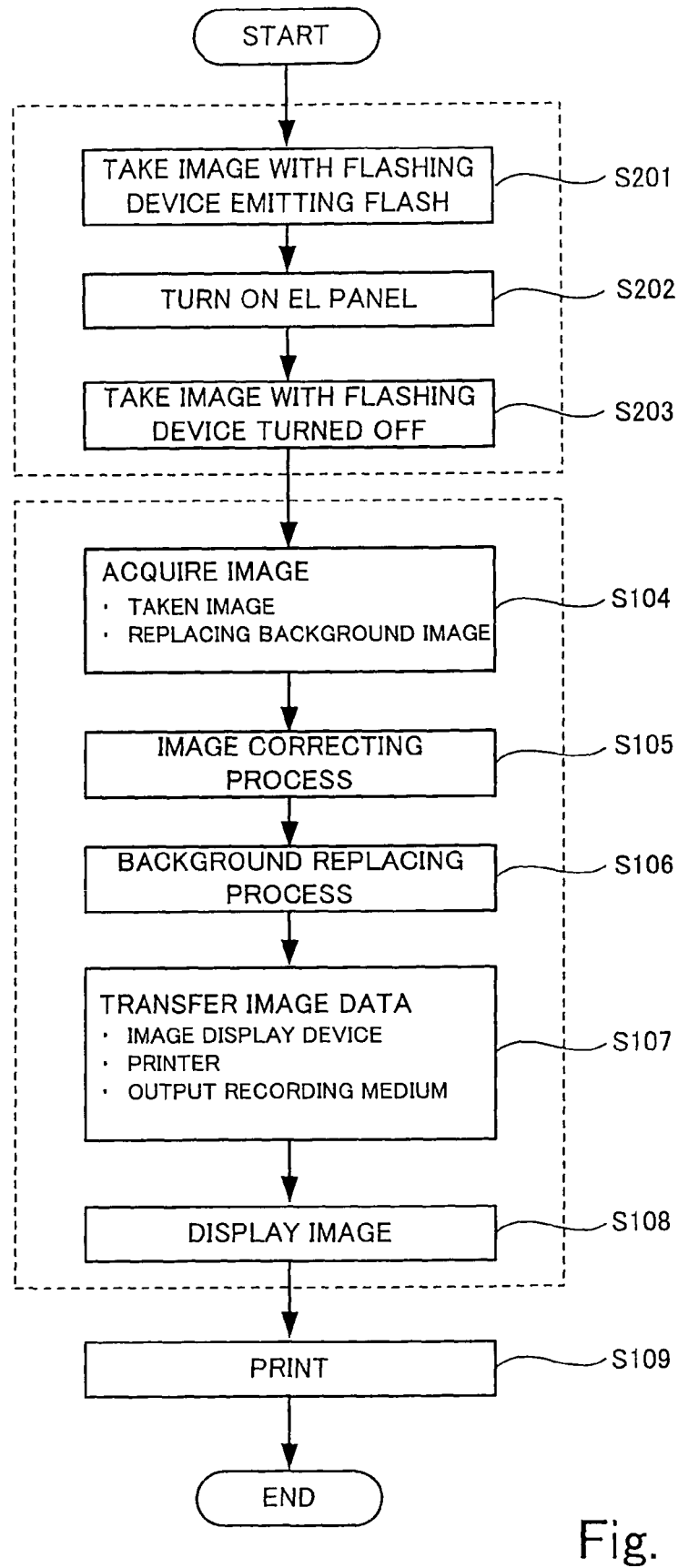
FIG. 45 is a flowchart showing the flow of the operation performed by the image-taking system shown in FIG. 44.

FIG. 45 is a flowchart showing the flow of the operation performed by the image-taking system shown in FIG. 44.

In FIG. 45, the operations equivalent to FIG. 3 are assigned the same reference characters as in FIG. 3, and in the following description by referring to FIG. 45, the explanation of these operations is omitted.

The operation shown in flowchart in FIG. 45 is performed in the image taking studio 50 based on that the subject P, the digital camera 16, and the flashing device 12 are arranged in the appropriate positions, and the EL panel 130 is in the OFF state.

After a camera user presses a shutter button of the digital camera 16 after adjusting the focus, exposure, etc., the image-taking process is continuously performed twice on the subject P. In the first image-taking process, the flashing device 12 emits a flash in response to the flash instruction signal issued by the digital camera 16, and the image of the subject P is taken in the normal illumination state by the flash (step S201). In the second image-taking process, the power supply 15 turns on the EL panel 130 according to the second panel light instruction signal (step S202). Then, the image-taking process is performed when the flashing device 12 is turned off and the EL panel 130 is turned on, that is, in the counter-illumination state by the illumination of the EL panel 130 only (step S203).

In the present embodiment, the image taking studio 50 for performing the image-taking process corresponds to an example of the image-taking-condition creating section according to the present invention for creating plural (two in the present embodiment) image-taking conditions by sequentially illuminating the subject by the flashing device 12 and the EL panel 130.

If the second image-taking process is completed in the process in step S203, the two taken images temporarily stored in the memory of the digital camera 16 are immediately passed to the personal computer 20. Afterwards, a background-replaced image is generated in the background replacing process similar to the process according to the first embodiment based on the two taken images, and displayed on the display screen 220a. Furthermore, at least one of printing on the printer 30 based on the image data indicating the background-replaced image and writing the image data to the output storage medium desired by a client is performed.

In the image-taking system 2 according to the second embodiment of the present invention described above by referring to FIGS. 44 and 45, a background-replaced image in which the background in the taken image is naturally replaced with a desired background in the taken image can be generated as in the image-taking system 1 according to the first embodiment.

Described below is the third embodiment of the present invention.

The third embodiment is partly different from the first embodiment in the configuration of the image taking studio, the image-taking process performed in the image taking studio, and the process performed by the personal computer operating as a background replacement device. Described below are the differences from the first embodiment, and the identical points are omitted.

Figure 46:
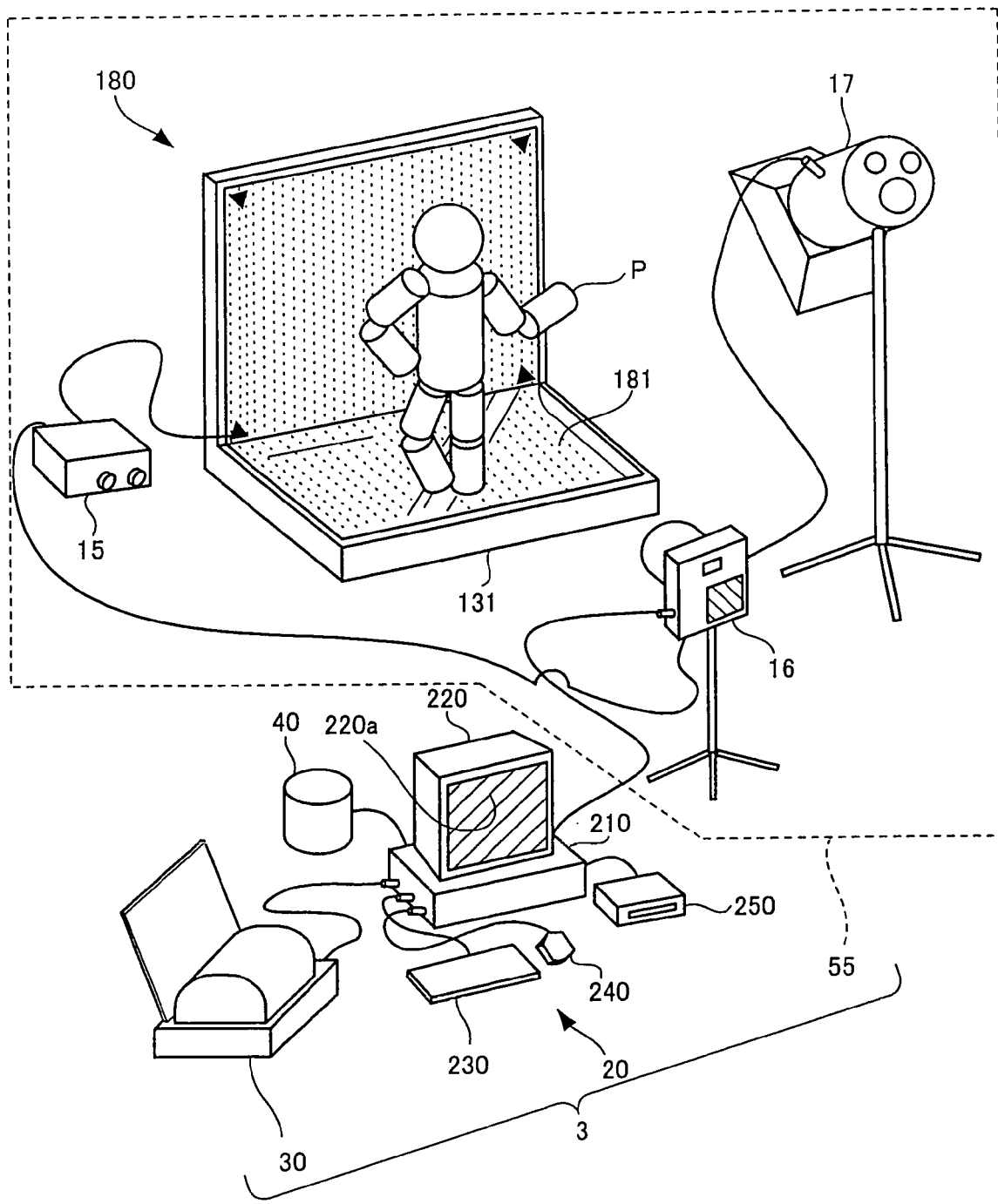
FIG. 46 is a diagram showing a third embodiment of the image-taking system according to the present invention.

FIG. 46 shows the third embodiment of the image-taking system according to the present invention.

In FIG. 46, the components equivalent to the first embodiment shown in FIG. 1 are assigned the same reference characters as in FIG. 1, and in the following description by referring to FIG. 46, the explanation of these components is omitted.

An image-taking system 3 shown in FIG. 46 is provided with, unlike in the first embodiment shown in FIG. 1, as a digital camera and a power supply for El panel, a digital camera 16 which issues a light instruction signal and a power supply 15 which operates according to the light instruction signal which are similar to those in the second embodiment shown in FIG. 44. In FIG. 46, the digital camera and the power supply are assigned the same reference characters as in FIG. 44, and the double explanation is omitted here.

Described below are the differences between the present embodiment and the first and second embodiments. The flashing device 17 and an EL panel 180 provided for an image-taking studio 55 of the image-taking system 3 shown in FIG. 46 are mainly considered.

In the flashing device 17 provided for the image-taking studio 55, the charging process is completed within a very short time. Therefore, when the continuous image-taking process is performed by the flashing device 16, the digital camera 16 emits a flash according to all flash instruction signals issued in each image-taking process.

In the EL panel 180 provided for the image-taking studio 55, the color of the emitted light of a dispersed EL element 181 stored in the housing 131 is adjusted by red fluorescent powder. Therefore, the color of the EL panel 180 is pale red when the light is turned off, and the blue green color as the color of emitted light of the dispersed EL element is adjusted as blue color when the light is emitted. The EL panel 180 corresponds to an example of the "background panel having the function of changing colors" according to the present invention.

The flow of the operations performed by the image-taking system 3 is explained below. In the description below, the components shown in FIG. 46 can be described with the reference characters shown in FIG. 46 without specifying a figure number.

Figure 47:
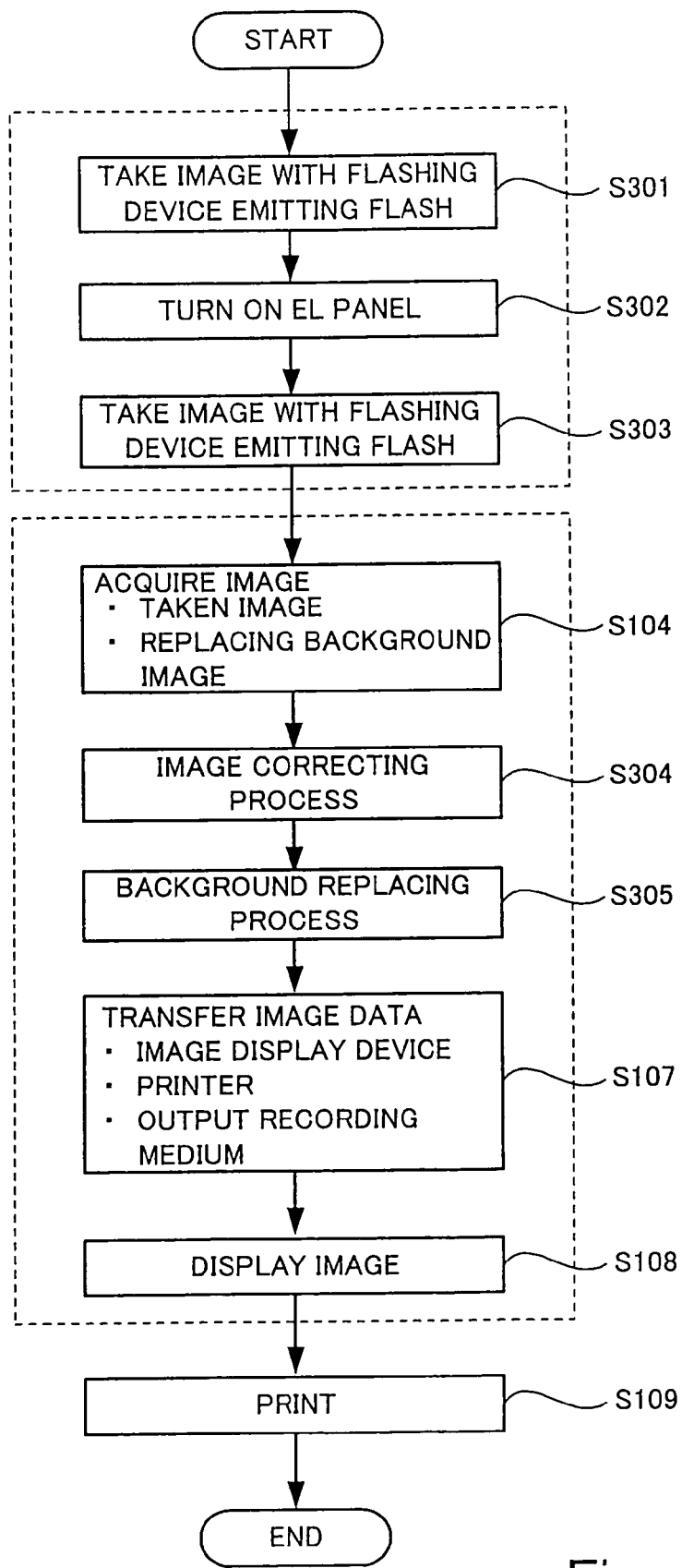
FIG. 47 is a flowchart showing the flow of the operation performed by the image-taking system shown in FIG. 46.

FIG. 47 is a flowchart showing the flow of the operation performed by the image-taking system shown in FIG. 46.

In FIG. 47, the operations equivalent to the flowchart shown in FIG. 3 are assigned the same reference characters as in FIG. 3, and in the following description by referring to FIG. 47, the explanation of these operations is omitted.

In the operations shown by the flowchart in FIG. 47 in the image taking studio 50, the subject P, the digital camera 16, and the flashing device 17 are respectively arranged in an appropriate positions, and the operations are performed based on that the EL panel 130 is turned off.

After a camera user presses a shutter button of the digital camera 16 after adjusting the focus, exposure, etc., the image-taking process is continuously performed twice on the subject P. In the first image-taking process, the flashing device 17 emits a flash in response to the flash instruction signal issued by the digital camera 16, and the image of the subject P is taken in the normal illumination state by the flash (step S301). In the first image-taking process (step S301), the EL panel 180 is turned off. Therefore, the background of the subject P is taken as pale red. In the second image-taking process, the power supply 15 turns on the EL panel 130 according to the second panel light instruction signal (step S302). In the present embodiment, the flashing device 17 emits a flash in the second image-taking process, and the second image-taking process is performed under the flash and the light from the EL panel 180 (step S303). The flash emitted by the flashing device 17 is brighter than the light of the EL panel 180. In the second image-taking process, the process is also performed in the normal illumination state in which the subject P is illuminated from the digital camera 16 side by the flash with high brightness. However, since the EL panel 180 emits light in this case, the background of the subject P is taken as blue adjusted from the blue green color. That is, in the processes in steps S301 to S303 shown in FIG. 47, two taken images different from each other in background color can be obtained.

In the present embodiment, the image taking studio 55 which performs the image-taking process corresponds to an example of the image-taking-condition creating section which changes the color of the EL panel 180 and creates plural (two in the present embodiment) image-taking conditions according to the present invention.

When two taken images different from each other in background color are obtained, the two taken images are passed to the personal computer 20 (step S104), and the following image correcting process is performed on each taken image (step S304).

The image correcting process performed in step S304 is the same as the image correcting process performed on the taken image in the first embodiment including generating a significant image by correcting the trapezoidal distortion and removing an unnecessary portion from a taken image, and the color correcting process such as minimizing red-eye, correcting an entire hue to a desired hue, etc. However, in the first embodiment, one of the two taken images to be corrected is a counter-illuminated taken image in which the subject area is biased toward the shadow side and therefore, the color correcting process is omitted for the counter-illuminated taken image. On the other hand, in the third embodiment, the two taken images to be handled in the image correcting process are both normally-illuminated taken images and therefore, in the process in step S304, the same image correcting process including the color correcting process is performed on the two taken images.

Next, a background-replaced image is generated based on the two taken images corrected in the process in step 304 (step S305), and the generated background-replaced image is output.

Described below is the process performed in step S305, that is, the process of generating a background-replaced image according to the present embodiment.

First, examples of the two corrected taken images will be described below.

Figure 48:
FIG. 48 is a diagram showing an example of a corrected taken image based on the first image-taking process.
Figure 49:
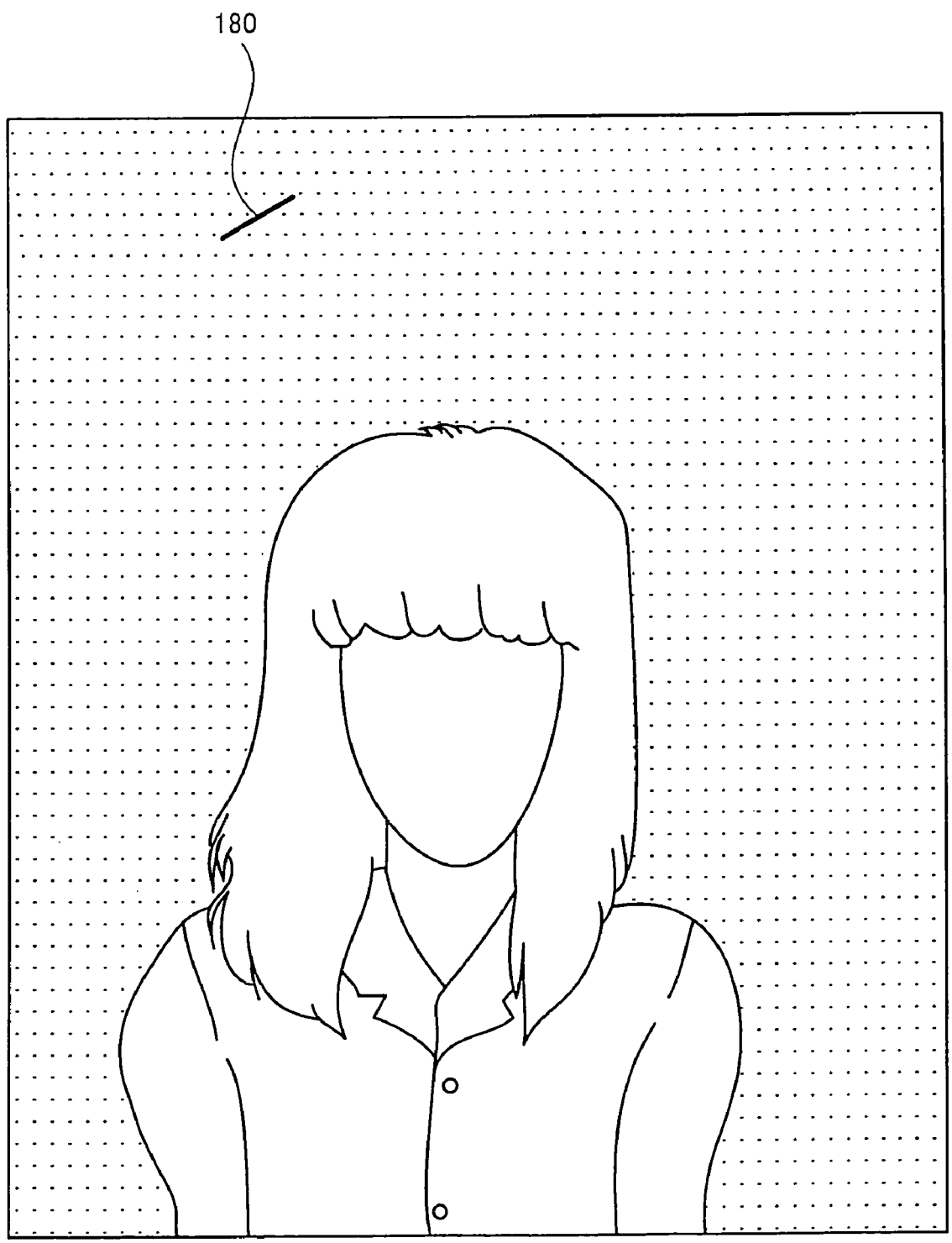
FIG. 49 is a diagram showing an example of a corrected taken image based on the second image-taking process.

FIG. 48 shows an example of a corrected taken image based on the first image-taking process. FIG. 49 shows an example of a corrected taken image based on the second image-taking process.

As shown in FIGS. 48 and 49, the two taken images are substantially the same except the color of the EL panel 180 taken as the background. That is, in the first corrected taken image (hereinafter referred to as a first taken image), the EL panel 180 is turned off. Therefore, the background color is pale red. In the second corrected taken image (hereinafter referred to as a second taken image), the EL panel 180 is turned on. Therefore, the background color is blue adjusted from the blue-green color.

In the process of generating a background-replaced image in the present embodiment, a histogram about the amount of variance of the color of each pixel forming part of the first taken image relative to the pixel at the corresponding position in the second taken image is generated.

Figure 50:
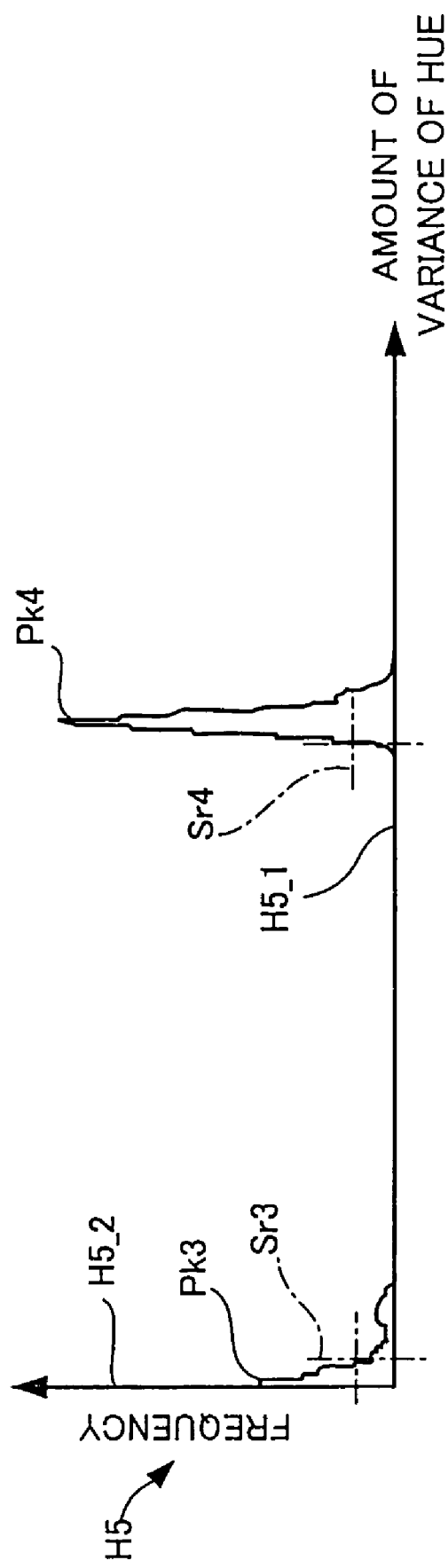
FIG. 50 is a diagram showing an example of the histogram generated in the process of generating a background-replaced image in the third embodiment of the present invention.

FIG. 50 shows an example of the histogram generated in the process of generating the background-replaced image in the third embodiment of the present invention.

In the present embodiment, the amount of variance of hue of each pixel forming part of the first taken image relative to the pixel in the corresponding position in the second taken image is adopted as the amount of variance of the color. FIG. 50 is a histogram H5 showing the amount of variance of hue of each pixel forming part of the first taken image allocated to a number of ranges, and showing the variance of hue indicated by the frequency about how many pixels are allocated to each range. In the histogram H5 showing the variance of hue, the horizontal axis H5_1 indicates the amount of variance of hue, and the vertical axis H5_2 indicates the frequency.

In the process of generating the background-replaced image according to the present embodiment, the following two thresholds are calculated based on each of the two peaks Pk3 and Pk4 in the histogram H5 of the variance of hue. As shown in FIG. 50, the first threshold Sr3 as the upper limit of the amount of variance of hue indicating the frequency equal to or higher than a predetermined value is calculated at the peak Pk3 from the peak Pk3 on the left of the drawing indicating a small amount of variance of hue. The second threshold Sr4 as the lower limit of the amount of variance of hue indicating the frequency equal to or higher than a predetermined value is calculated at the peak Pk4 from the peak Pk4 on the right of this drawing indicating a large amount of variance of hue.

In the process of generating a background-replaced image, an initial subject mask for definition of the area of the pixel having the amount of variance of hue equal to or lower than the first threshold Sr3 is set in the first taken image, and an initial background mask for definition of the area of the pixel having the amount of variance of hue equal to or higher than the second threshold Sr4 is set.

In the present embodiment, when two initial masks are set, then a background-replaced image is generated using these two initial masks, but the subsequent processes performed using these two initial masks are similar to those performed using the two initial masks in the first embodiment. Therefore, the explanation of the processes is omitted.

The generated background-replaced image is displayed on the display screen 220a, and at least one of printing on the printer 30 based on the image data indicating the background-replaced image and writing the image data to the output storage medium desired by a client is performed.

In the image-taking system 3 according to the third embodiment of the present invention described above by referring to FIGS. 46 to 50, a background-replaced image in which the background in the taken image is naturally replaced with a desired background can be generated as in the image-taking system 1 according to the first embodiment.

In the image-taking system 3 according to the third embodiment, as shown in the flowchart shown in FIG. 47, the two image-taking processes are both performed under a flash by the flashing device 17. However, to take an image of a subject such as an infant or a pet who will be frightened by a momentary flash, emission of such a flash is not desired.

In the image-taking system 3 according to the third embodiment, it is possible to take an image of such a subject for which a flash is not desired in the following manner. Emission of a flash at the time of image-taking process is avoided by turning off the flashing device 17 or by removing a cable connecting the digital camera 11 with the flashing device 17, and instead of the flash, the subject can be illuminated with steady light such as high-intensity illumination light and sunlight. In this manner, it is also possible to obtain two taken images whose respective background colors are different from each other, similar to those obtained by image-taking process performed according to the flowchart shown in FIG. 47 even when no flash is used. Therefore, subsequently, it is possible to discriminate between the subject area, background area and boundary area, thereby generating a background-replaced image in which the background in the taken image is naturally replaced with a desired background, in the way described with reference to FIGS. 48 through 50.

Described below is the fourth embodiment of the present invention.

The fourth embodiment is partly different from the first embodiment in the configuration of the image taking studio, the image-taking process performed in the image taking studio, and the process performed by the personal computer operating as a background replacement device. Described below are the differences from the first embodiment, and the identical points are omitted.

Figure 51:
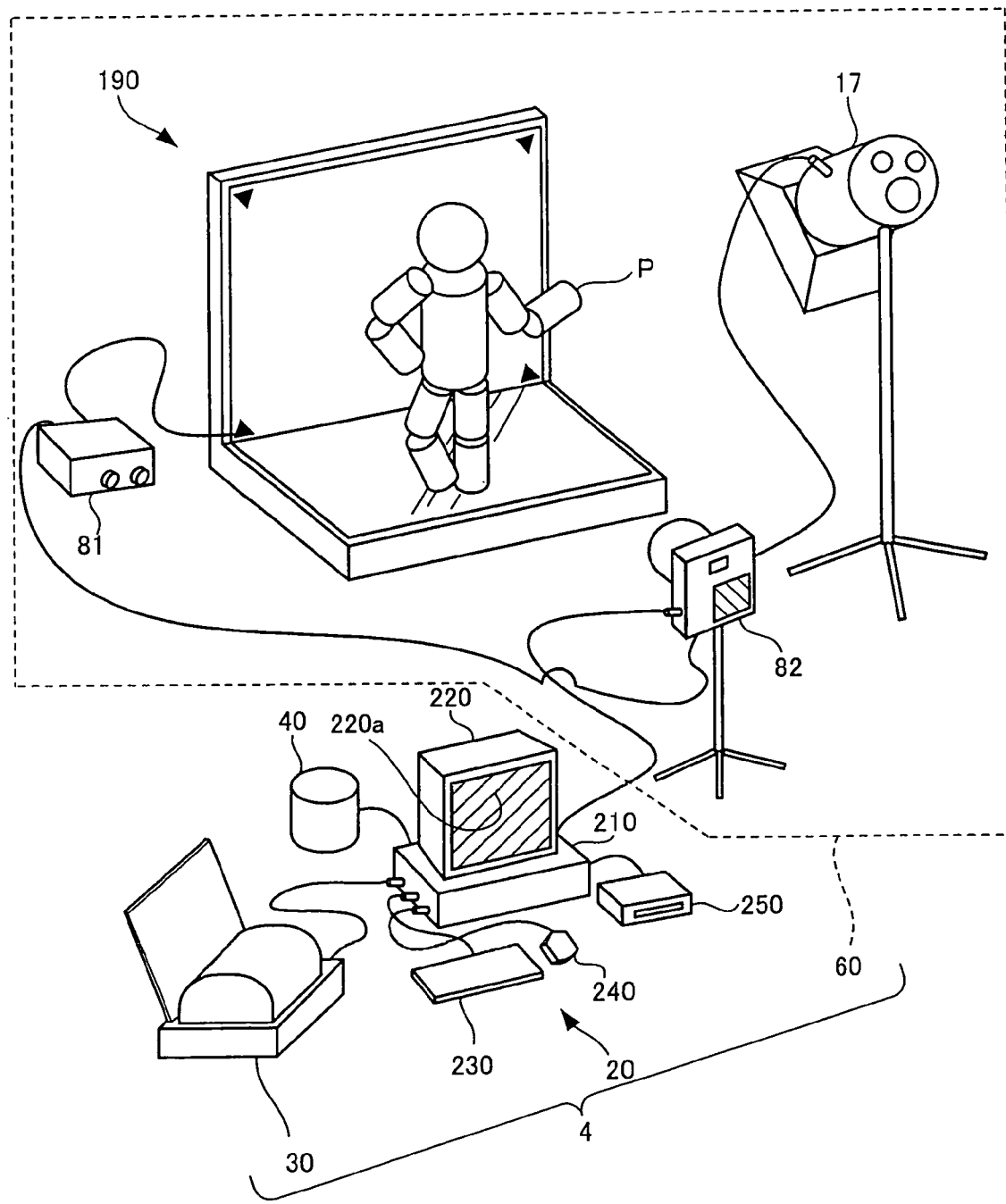
FIG. 51 is a diagram showing a fourth embodiment of the image-taking system according to the present invention.

FIG. 51 shows the fourth embodiment of the image-taking system according to the present invention.

In FIG. 51, the components equivalent to the first embodiment shown in FIG. 1 are assigned the same reference characters as in FIG. 1, and in the following description by referring to FIG. 51, the explanation of these components is omitted.

An image-taking system 4 shown in FIG. 51 is provided with, unlike in the first embodiment shown in FIG. 1, a flashing device having a short charging time equivalent to the flashing device 17 in the third embodiment shown in FIG. 46 as a flashing device. In FIG. 51, the flashing device is assigned the same reference character as in FIG. 46, and the explanation is omitted.

Described below is the difference between the present embodiment and the fist and third embodiments. An illumination panel 190, a power supply 81 for the illumination panel 190, and a digital camera 82 provided for an image-taking studio 60 of an image-taking system 4 shown in FIG. 51 will be mainly described below.

The image-taking studio 60 of the image-taking system 4 shown in FIG. 51 is provided with the illumination panel 190 described later as an example of an illumination device according to the present invention which illuminates the subject P from behind. Furthermore, the image taking studio 60 includes the power supply 81 for the illumination panel 190 and the digital camera 82 which performs the image-taking process twice each time the shutter button is pressed once, issues a flash instruction signal to the flashing device 17 each time the image-taking process is performed, and issues to the power supply 81 a light instruction signal to light the illumination panel 190. The power supply 81 is designed to light the illumination panel 190 when the light instruction signal is input continuously twice.

Figure 52:
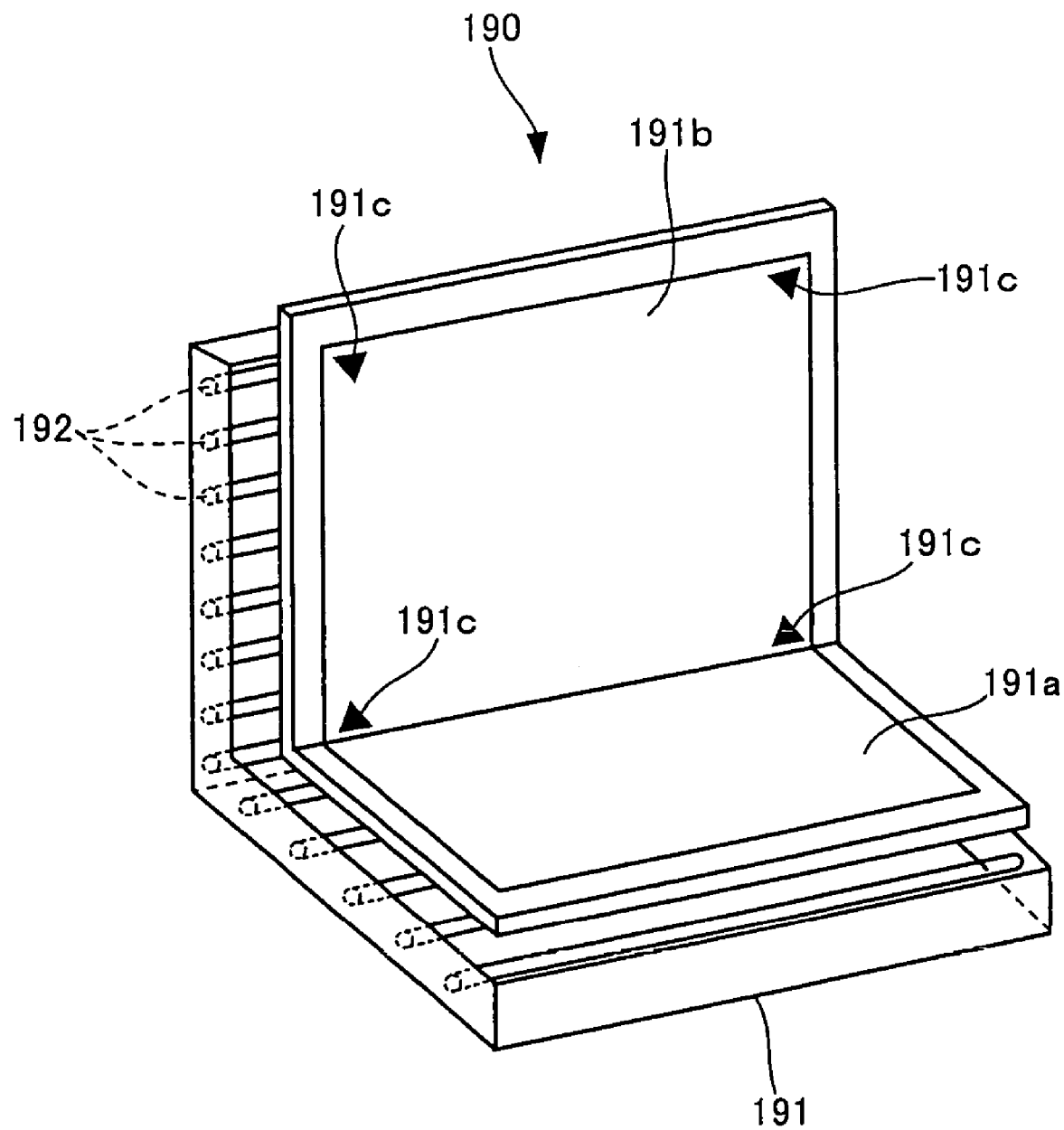
FIG. 52 is a diagram showing the internal structure of an illumination panel shown in FIG. 51.

FIG. 52 shows the internal structure of the illumination panel shown in FIG. 51.

The illumination panel 190 includes a housing 191 having a setting surface 191a on which the subject P is placed and a back surface 191b, and a fluorescent lamps 192 arranged and stored in the housing 191. The two surfaces 191a and 191b of the housing 191 function as dispersing plates for equally illuminating the subject P by dispersing the light of the fluorescent lamps 192. At the four corners of the back surface 191b behind the subject P, four markers 191c are arranged. The function of these four markers 191c is the same as that of the markers 131c in the first embodiment described above. Therefore, the explanation is omitted here.

Described below is the flow of the operation performed by the image-taking system 4 explained above by referring to FIGS. 51 and 52. In the description below, the components shown in FIGS. 51 and 52 are assigned the same reference characters as in FIGS. 51 and 52 without specifying a figure number.

Figure 53:
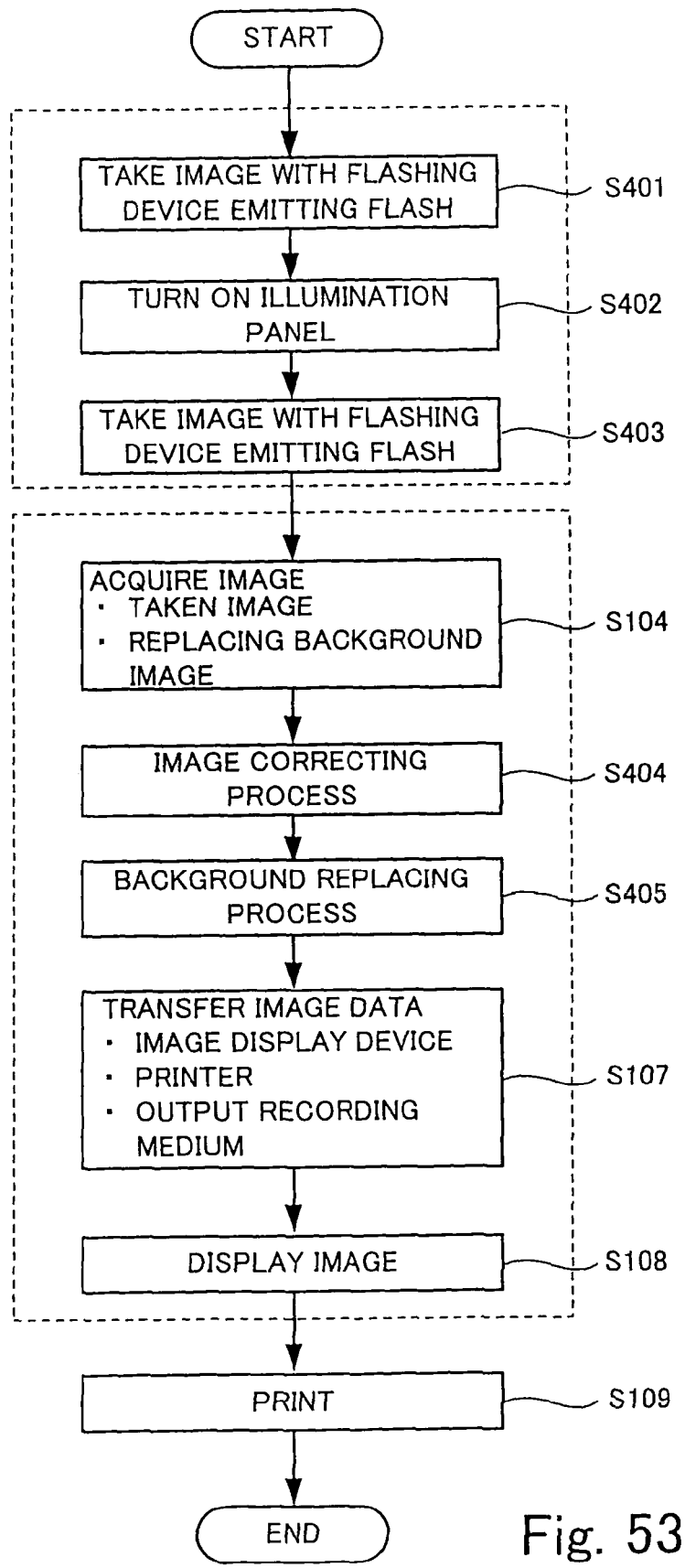
FIG. 53 is a flowchart showing the flow of the operation performed by the image-taking system shown in FIG. 51.

FIG. 53 is a flowchart showing the flow of the operation performed by the image-taking system shown in FIG. 51.

In FIG. 53, the operations equivalent to the flowchart shown in FIG. 3 are assigned the same reference characters as in FIG. 3, and in the following description by referring to FIG. 53, the explanation of these operations is omitted.

In the operations shown by the flowchart in FIG. 53 in the image taking studio 60, the subject P, the digital camera 82, and the flashing device 17 are respectively arranged in appropriate positions, and the operations are performed based on that the EL panel 190 is turned off.

After a camera user presses a shutter button of the digital camera 82 after adjusting the focus, exposure, etc., the image-taking process is continuously performed twice on the subject P. In the first image-taking process, the flashing device 17 emits a flash in response to the flash instruction signal issued by the digital camera 82, and the image of the subject P is taken in the normal illumination state by the flash (step S401). In the first image-taking process (step S401), the illumination panel 190 is turned off. Therefore, the background of the subject P is taken as a dark background. In the second image-taking process, the power supply 15 turns on the illumination panel 190 according to the second light instruction signal (step S402). In the present embodiment, the flashing device 17 emits a flash in the second image-taking process, and the second image-taking process is performed under the flash and the light from the illumination panel 190 (step S403). In this second image-taking process, since the subject P is illuminated by a flash of high brightness from the digital camera 82 side, the image-taking process is performed in the normal illumination state. However, since the illumination panel 190 emits light in this case, the background of the subject P is taken as a bright background. That is, in the processes in steps S401 to S403 shown in FIG. 53, two taken images different from each other in background brightness can be obtained.

In the present embodiment, the image taking studio 60 which performs the image-taking process corresponds to an example of the image-taking-condition creating section which changes the brightness of the light illuminating a subject by the illumination panel 190 and creates plural (two in the present embodiment) image-taking conditions according to the present invention.

When two taken images different from each other in background brightness are obtained, the two taken images are passed to the personal computer 20 (step S104), and the same image correcting process is performed on the two taken images including the color correcting process as in the above-mentioned third embodiment (step S404).

Next, a background-replaced image is generated based on the two taken images corrected in the process in step 404 (step S405), and the generated background-replaced image is output.

Described below is the process performed in step S405, that is, the process of generating a background-replaced image according to the present embodiment.

First, examples of the two corrected taken images will be described below.

Figure 54:
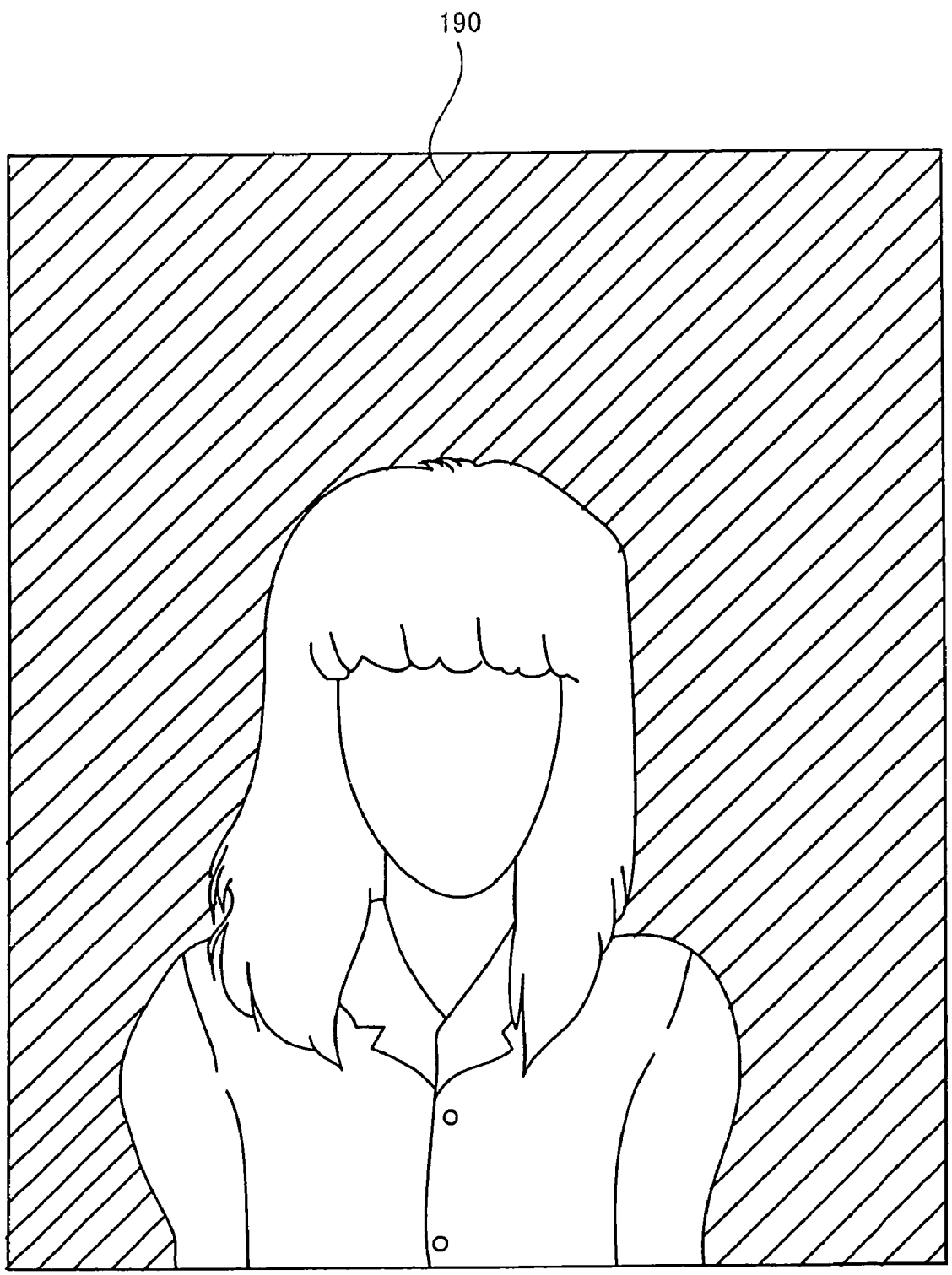
FIG. 54 is a diagram showing an example of a corrected taken image based on the first image-taking process.
Figure 55:
FIG. 55 is a diagram showing an example of a corrected taken image based on the second image-taking process.

FIG. 54 shows an example of a corrected taken image based on the first image-taking process. FIG. 55 shows an example of a corrected taken image based on the second image-taking process.

As shown in FIGS. 54 and 55, the two taken images are substantially the same except the brightness of the illumination panel 190 taken as the background. That is, in the first corrected taken image (hereinafter referred to as a first taken image), the illumination panel 190 is turned off. Therefore, the background is dark. In the second corrected taken image (hereinafter referred to as a second taken image), the illumination panel 190 is turned on. Therefore, the background is bright.

In the process of generating a background-replaced image in the present embodiment, a histogram about the amount of variance of brightness of each pixel forming part of the first taken image relative to the pixel at the corresponding position in the second taken image is generated.

Figure 56:
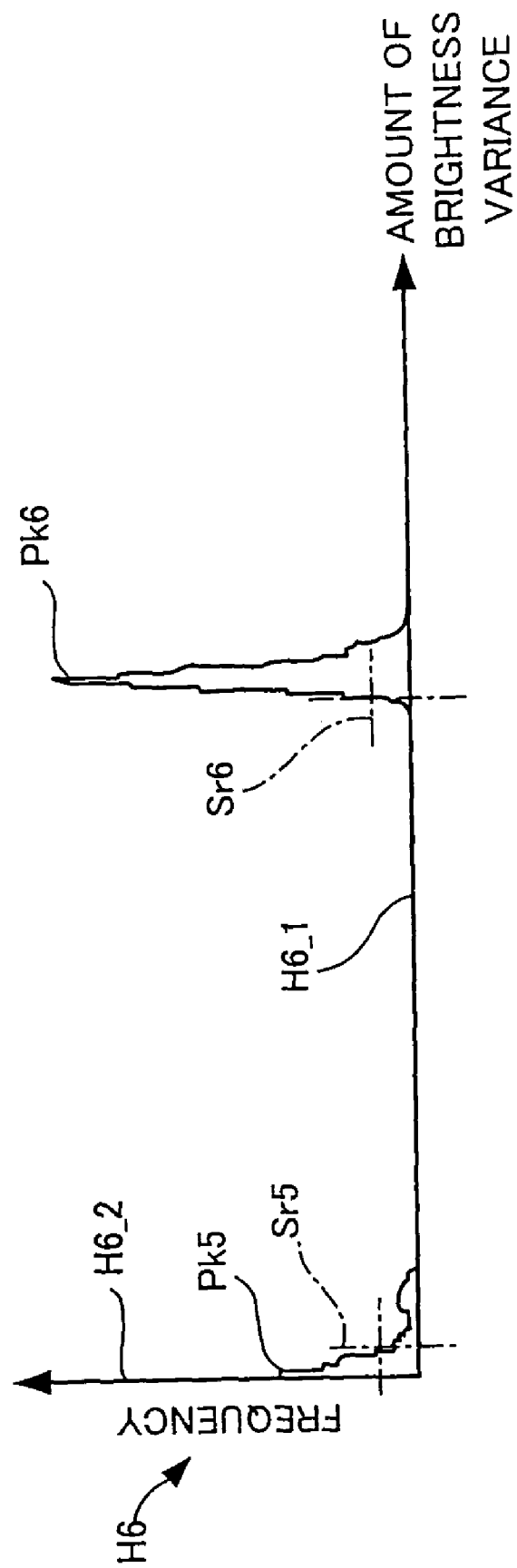
FIG. 56 is a diagram showing an example of the histogram generated in the process of generating the background-replaced image in the fourth embodiment of the present invention.

FIG. 56 shows an example of the histogram generated in the process of generating the background-replaced image in the fourth embodiment of the present invention.

In the present embodiment, the amount of variance of brightness of each pixel forming part of the first taken image relative to the pixel in the corresponding position in the second taken image is adopted as the amount of brightness. FIG. 56 is a histogram H6 showing the amount of variance of brightness of each pixel forming part of the first taken image allocated to a number of ranges, and showing the variance of brightness indicated by the frequency about how many pixels are allocated to each range. In the histogram H6 showing the variance of brightness, the horizontal axis H6_1 indicates the amount of variance of brightness, and the vertical axis H6_2 indicates the frequency.

In the process of generating the background-replaced image according to the present embodiment, the following two thresholds are calculated based on each of the two peaks Pk5 and Pk6 in the histogram H6 of the variance of brightness. As shown in FIG. 56, the first threshold Sr5 as the upper limit of the amount of variance of brightness indicating the frequency equal to or higher than a predetermined value is calculated at the peak Pk5 from the peak Pk5 on the left of FIG. 48 indicating a small amount of variance of brightness. The second threshold Sr6 as the lower limit of the amount of variance of brightness indicating the frequency equal to or higher than a predetermined value is calculated at the peak Pk6 from the peak Pk6 on the right of FIG. 48 indicating a large amount of variance of brightness.

In the process of generating a background-replaced image, an initial subject mask for definition of the area of the pixel having the amount of variance of brightness equal to or lower than the first threshold Sr5 is set in the first taken image, and an initial background mask for definition of the area of the pixel having the amount of variance of brightness equal to or higher than the second threshold Sr6 is set.

In the present embodiment, when two initial masks are set, then a background-replaced image is generated using these two initial masks, but the subsequent processes performed using these two initial masks are similar to those performed using the two initial masks in the first embodiment. Therefore, the explanation of the processes is omitted.

The generated background-replaced image is displayed on the display screen 220a, and at least one of printing on the printer 30 based on the image data indicating the background-replaced image and writing the image data to the output storage medium desired by a client is performed.

In the image-taking system 4 according to the fourth embodiment of the present invention described above by referring to FIGS. 51 to 56, a background-replaced image in which the background in the taken image is naturally replaced with a desired background can be generated as in the image-taking system 1 according to the first embodiment.

Described below is the fifth embodiment of the present invention.

The fifth embodiment is partly different from the first embodiment in the configuration of the image taking studio and the process performed by the personal computer operating as a background replacement device. Described below are the differences from the first embodiment, and the identical points are omitted.

Figure 57:
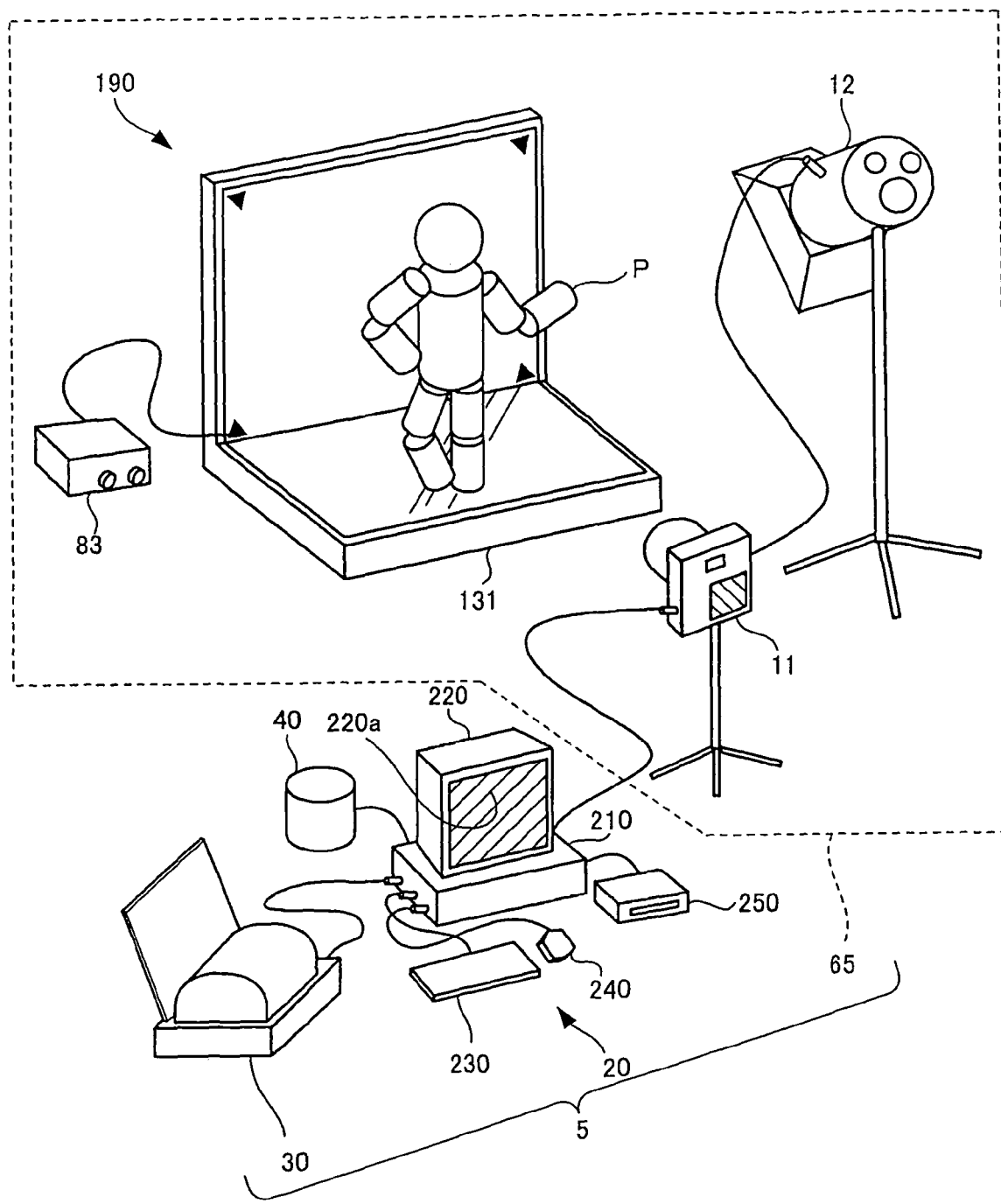
FIG. 57 is a diagram showing a fifth embodiment of the image-taking system according to the present invention.

FIG. 57 shows the fifth embodiment of the image-taking system according to the present invention.

In FIG. 57, the components equivalent to the first embodiment shown in FIG. 1 are assigned the same reference characters as in FIG. 1, and in the following description by referring to FIG. 57, the explanation of these components is omitted.

An image-taking system 5 shown in FIG. 57 is provided with, unlike in the first embodiment shown in FIG. 1, an illumination panel equivalent to the illumination panel 190 in the fourth embodiment shown in FIG. 51. In FIG. 57, the illumination panel is assigned the same reference character as in FIG. 51, and the explanation is omitted.

An image-taking studio 65 shown in FIG. 57 includes the flashing device 12 equivalent to the first embodiment shown in FIG. 1. Since the flashing device 12 takes some time in charging as described above, it emits a flash only in the first image-taking process when the digital camera 11 continuously performs an image-taking process, and is turned off in the second image-taking process.

A power supply 83 for the illumination panel 190 provided for the image-taking studio 65 is manually operated.

Described below is the flow of the operation performed by the image-taking system 5. In the description below, the components shown in FIG. 57 can be described with the reference characters shown in FIG. 57 without specifying a figure number.

Figure 58:
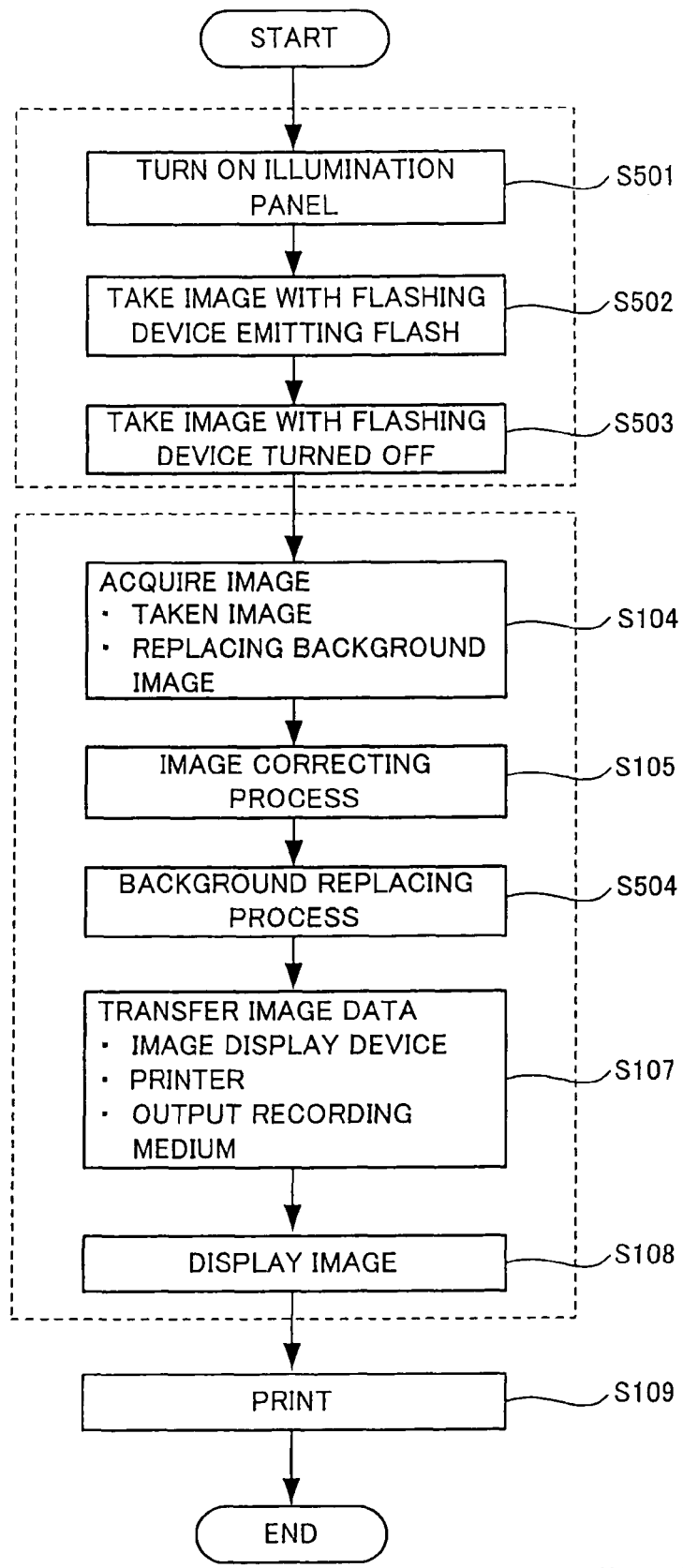
FIG. 58 is a flowchart showing the flow of the operation performed by the image-taking system shown in FIG. 57.

FIG. 58 is a flowchart showing the flow of the operation performed by the image-taking system shown in FIG. 57.

In FIG. 58, the operations equivalent to the flowchart shown in FIG. 3 are assigned the same reference characters as in FIG. 3, and in the following description by referring to FIG. 58, the explanation of these operations is omitted.

In the operations shown by the flowchart in FIG. 58 in the image taking studio 65, the subject P, the digital camera 11, and the flashing device 12 are respectively arranged in the appropriate positions.

First, the power supply 83 is operated and the voltage is applied to the illumination panel 190 from the power supply 83 (step S501). Then, in the image taking studio 65, the image-taking process (step S502) in the normal illumination state by a flash, emitted by the flashing device 12, of brightness higher than the illumination of the illumination panel 190, and the image-taking process (step S503) in the counter-illumination state by the illumination by the illumination panel 190 only are continuously performed.

In the present embodiment, the image taking studio 65 which performs the image-taking processes corresponds to an example of the image-taking-condition creating section according to the present invention which creates plural (two in the present embodiment) image-taking conditions depending on the constant existence of the illumination by the illumination panel 190 and the presence/absence of the illumination by the flash of the flashing device 12.

The brightness at the light emission of the illumination panel 190 is strong enough to suppress the influence of the flash from the flashing device 12. As a result, the two taken images which are substantially the same in background brightness, but different in subject brightness can be obtained in the image-taking process in the normal illumination state (step S502) and the image-taking process in the counter-illumination state (step S503).

When two taken images, that is, a normally-illuminated taken image and a counter-illuminated taken image, are obtained in the processes in steps S501 to S503, the two taken images are passed to the personal computer 20 (step S104) Then, as in the first embodiment, the process of generating a significant image by correcting the trapezoidal distortion and removing an unnecessary portion from a taken image, and the color correcting process such as minimizing red-eye, correcting an entire hue to a desired hue, etc. are performed on the normally-illuminated taken image. On the counter-illuminated taken image, the same image correcting process as on the normally-illuminated taken image is performed except the color correcting process (step S105).

Next, a background-replaced image is generated based on the two taken images corrected in the process in step 105 (step S504), and the generated background-replaced image is output.

Described below is the process performed in step S504, that is, the process of generating a background-replaced image according to the present embodiment.

First, examples of the two corrected taken images will be described below.

Figure 59:
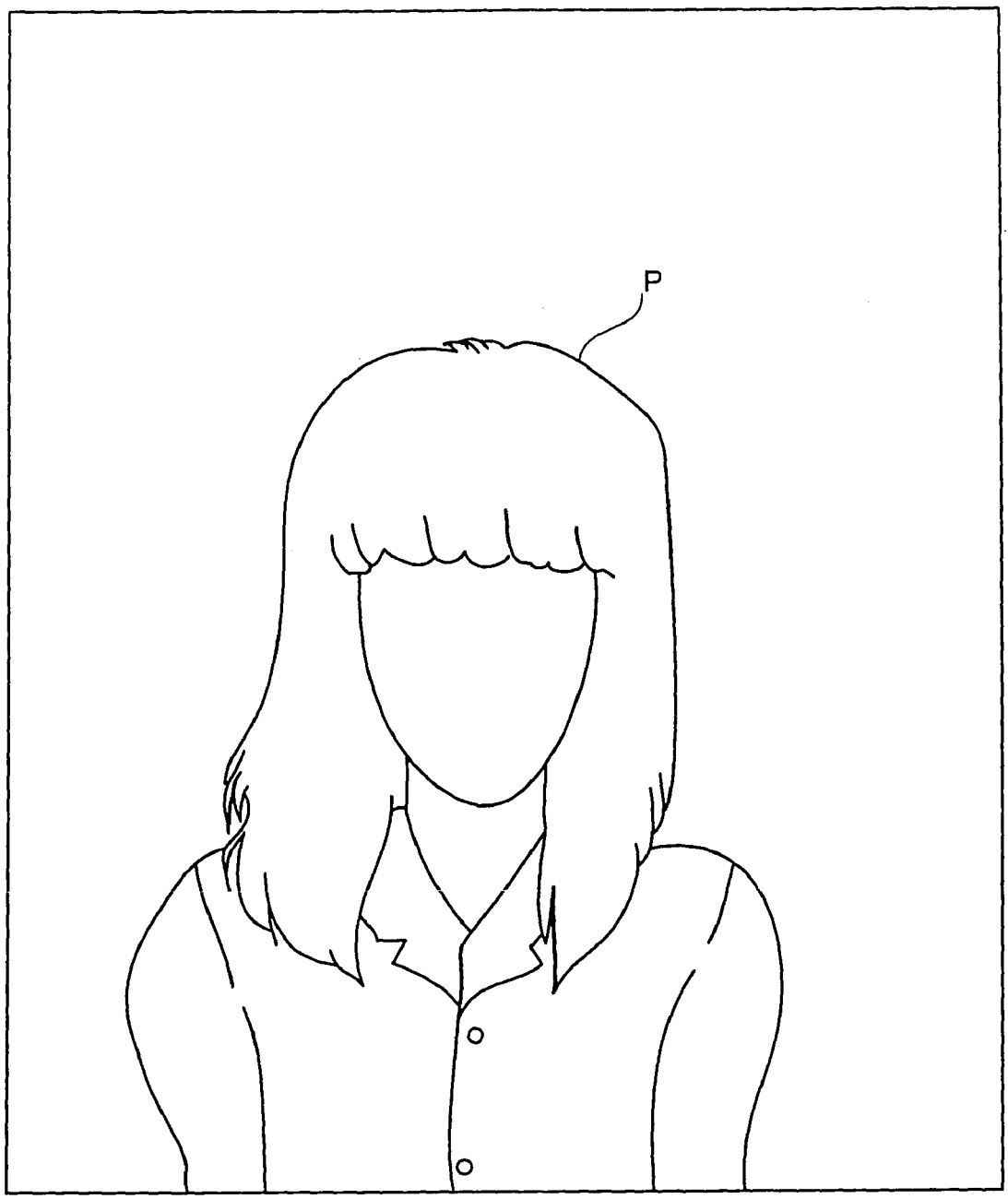
FIG. 59 is a diagram showing an example of a corrected taken image based on the first image-taking process.
Figure 60:
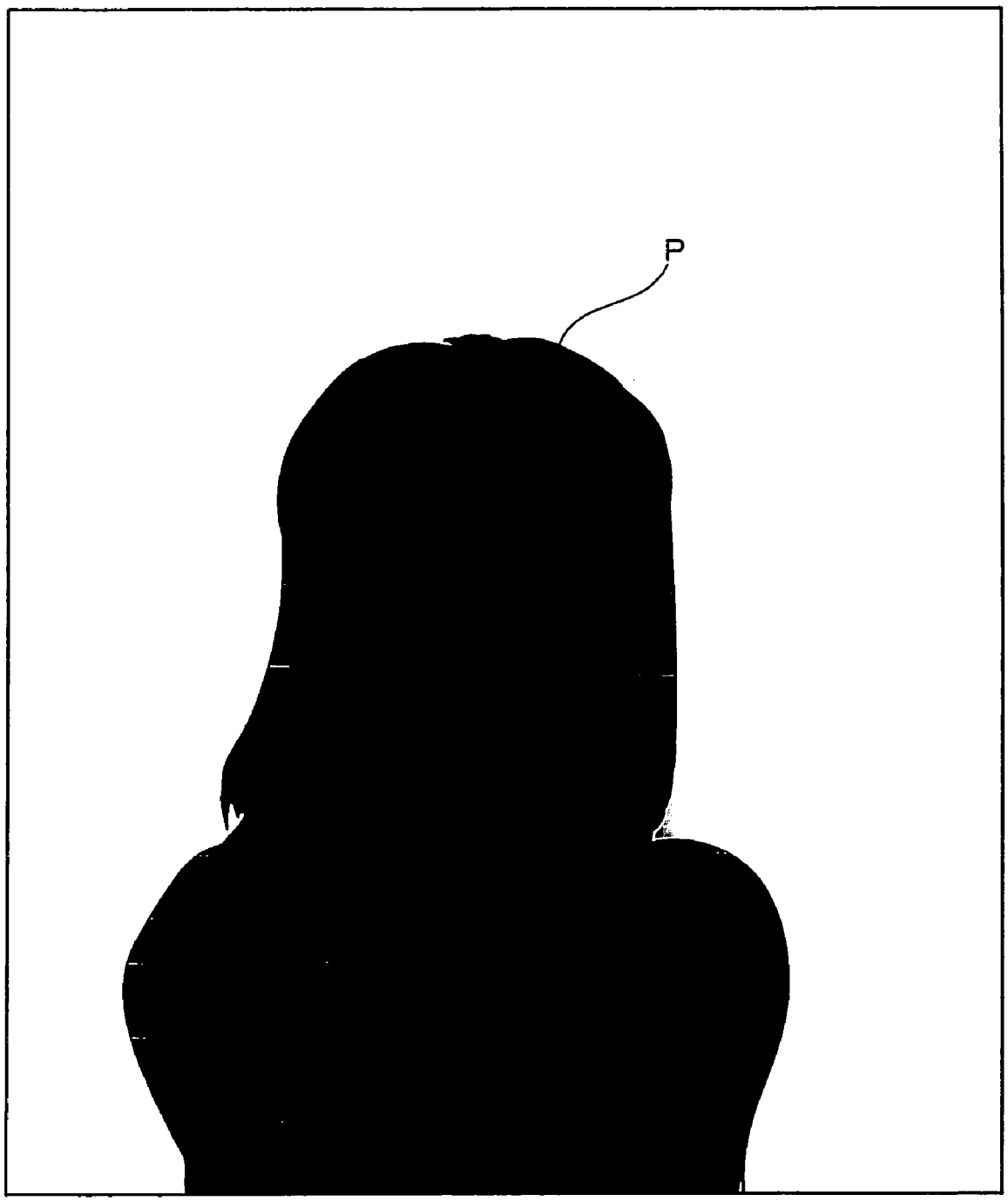
FIG. 60 is a diagram showing an example of a corrected taken image based on the second image-taking process.

FIG. 59 shows an example of a corrected taken image based on the first image-taking process. FIG. 60 shows an example of a corrected taken image based on the second image-taking process.

As shown in FIGS. 59 and 60, the two taken images are substantially the same except the brightness of the subject P. That is, the first corrected taken image (hereinafter referred to as a first taken image) is taken in the normal illumination state. Therefore, the subject in the image is bright. The second corrected taken image (hereinafter referred to as a second taken image) is taken in the counter-illumination state. Therefore, the subject is dark.

In the process of generating a background-replaced image in the present embodiment, a histogram about the amount of variance of brightness of each pixel forming part of the first taken image relative to the pixel at the corresponding position in the second taken image is generated.

Figure 61:
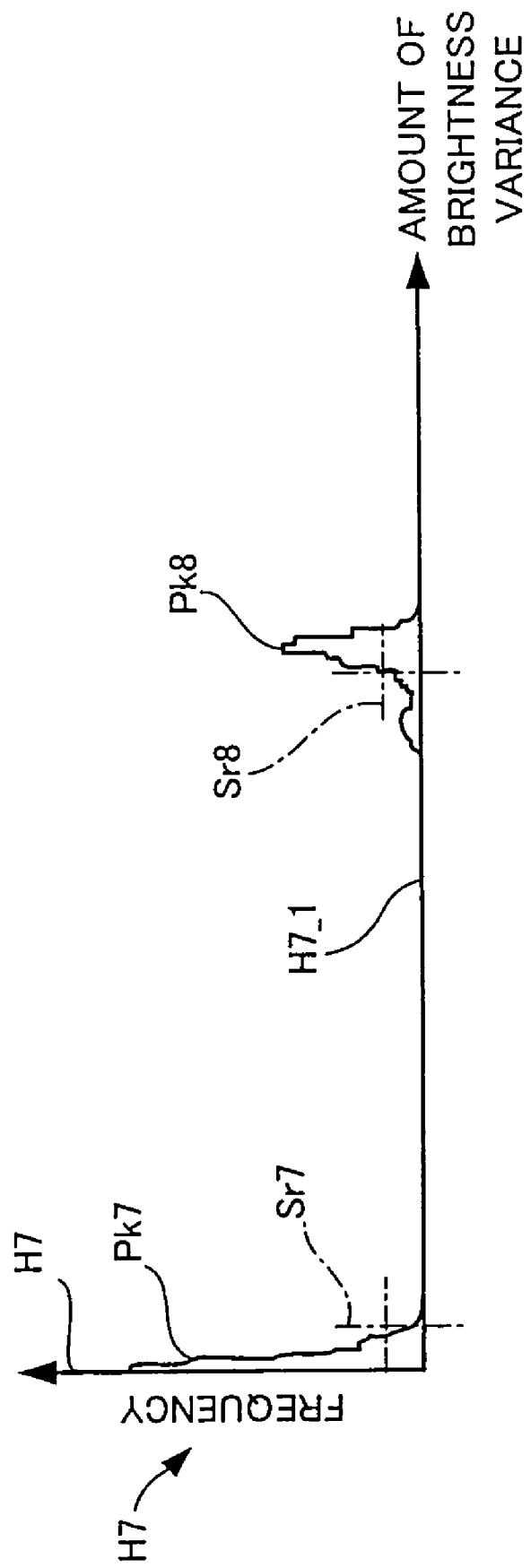
FIG. 61 is a diagram showing an example of the histogram generated in the process of generating a background-replaced image in the fourth embodiment of the present invention.

FIG. 61 shows an example of the histogram generated in the process of generating the background-replaced image in the fifth embodiment of the present invention.

In the present embodiment, the amount of variance of brightness of each pixel forming part of the first taken image relative to the pixel in the corresponding position in the second taken image is adopted as the amount of variance of brightness. FIG. 61 is a histogram H7 showing the amount of variance of brightness of each pixel forming part of the first taken image allocated to a number of ranges, and showing the variance of brightness indicated by the frequency about how many pixels are allocated to each range. In the histogram H7 showing the variance of brightness, the horizontal axis H7_1 indicates the amount of variance of brightness, and the vertical axis H7_2 indicates the frequency.

In the process of generating the background-replaced image according to the present embodiment, the following two thresholds are calculated based on each of the two peaks Pk7 and Pk8 in the histogram H7 of the variance of brightness. As shown in FIG. 61, the first threshold Sr7 as the upper limit of the amount of variance of brightness indicating the frequency equal to or higher than a predetermined value is calculated at the peak Pk7 from the peak Pk7 on the left of the drawing indicating a small amount of variance of brightness. The second threshold Sr8 as the lower limit of the amount of variance of brightness indicating the frequency equal to or higher than a predetermined value is calculated at the peak Pk8 from the peak Pk8 on the right of the drawing indicating a large amount of variance of brightness.

In the process of generating a background-replaced image, an initial background mask for definition of the area of the pixel having the amount of variance of brightness equal to or lower than the first threshold Sr7 is set in the first taken image, and an initial subject mask for definition of the area of the pixel having the amount of variance of brightness equal to or higher than the second threshold Sr8 is set.

In the present embodiment, when two initial masks are set, then a background-replaced image is generated using these two initial masks, but the subsequent processes performed using these two initial masks are similar to those performed using the two initial masks in the first embodiment. Therefore, the explanation of the processes is omitted.

The generated background-replaced image is displayed on the display screen 220a, and at least one of printing on the printer 30 based on the image data indicating the background-replaced image and writing the image data to the output storage medium desired by a client is performed.

In the image-taking system 5 according to the fifth embodiment of the present invention described above by referring to FIGS. 57 to 61, a background-replaced image in which the background in the taken image is naturally replaced with a desired background can be generated as in the image-taking system 1 according to the first embodiment.

Described below is the sixth embodiment of the present invention.

The sixth embodiment is partly different from the first embodiment in the configuration of the image taking studio, the image-taking process performed in the image taking studio, and the process performed by the personal computer operating as a background replacement device. Described below are the differences from the first embodiment, and the identical points are omitted.

Figure 62:
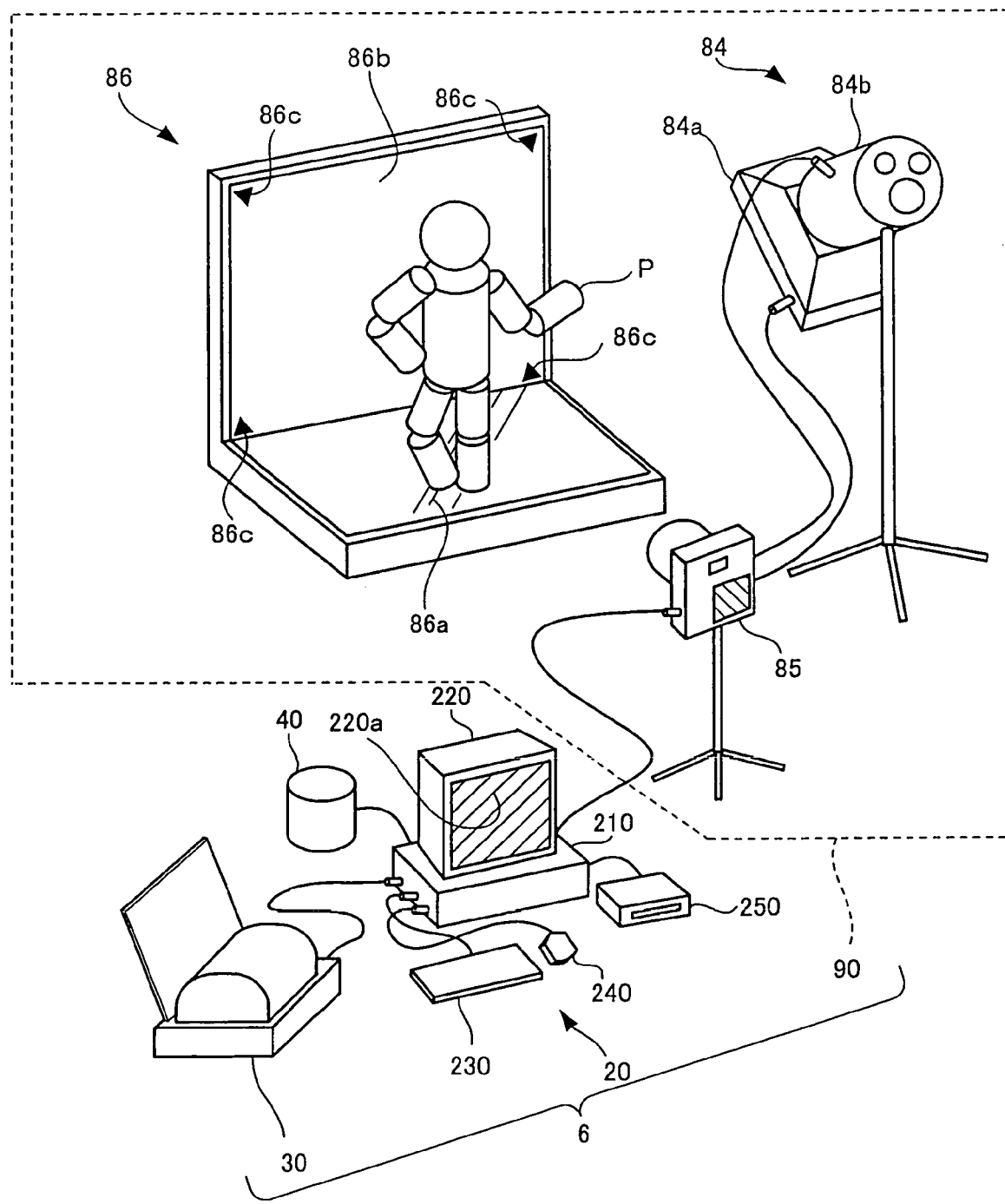
FIG. 62 is a diagram showing a sixth embodiment of the image-taking system according to the present invention.

FIG. 62 shows the sixth embodiment of the image-taking system according to the present invention.

In FIG. 62, the components equivalent to the first embodiment shown in FIG. 1 are assigned the same reference characters as in FIG. 1, and in the following description by referring to FIG. 62, the explanation of these components is omitted.

Described below is the difference between the first embodiment and the present embodiment, that is, a flashing device 84, a digital camera 85, and a background panel 86 of an image taking studio 90 in an image-taking system 6 shown in FIG. 62.

The image-taking studio 90 includes the flashing device 84 having a short charging time provided with a polarization plate 84a for changing the polarization state of a flash. The polarization plate 84a of the flashing device 84 basically changes a flash to a linear polarization in the first direction. However, when a polarization switch signal described later is received, the flash is changed to linear polarization in the second direction orthogonal to the first direction.

The digital camera 85 provided for the image-taking studio 90 continuously performs the image-taking process twice when a camera user presses the shutter button once as in the first embodiment. At this time, the digital camera 85 issues to a body 84b of the flashing device 84 a flash instruction signal instructing the body 84b to emit a flash each time the image-taking process is performed. When the flash instruction signal is issued for the second time, the polarization switch signal to instruct the polarization plate 84a to change the polarization state of the flash is issued to the polarization plate 84a of the flashing device 84, and then the flash instruction signal is issued. Thus, the flashing device 84 emits a flash polarized in the first direction in the first image-taking process, and emits a flash polarized in the second direction in the second image-taking process.

The image taking studio 90 is provided with the background panel 86 having different brightness levels of reflected light depending on the polarization state respectively for a setting surface 86a and a back surface 86b. The two surfaces 86a and 86b of the background panel 86 softly reflect the light polarized in the first direction, and strongly reflect the light polarized in the second direction. There are four markers 131c arranged at the four corners of the back surface 86b of the subject P. The functions of the four markers 86c are the same as those of the markers 131c according to the first embodiment, and the explanation of them is omitted here.

The flashing device 84 according to the present embodiment corresponds to an example of the "flashing device having the function of changing the polarization state of a flash" according to the present invention, and the background panel 86 corresponds to an example of the "background panel having different brightness of reflected light depending on the polarization state" according to the present invention.

Described below is the flow of the operation performed by the image-taking system 6. In the description below, the components shown in FIG. 62 can be described with the reference characters shown in FIG. 62 without specifying a figure number.

Figure 63:
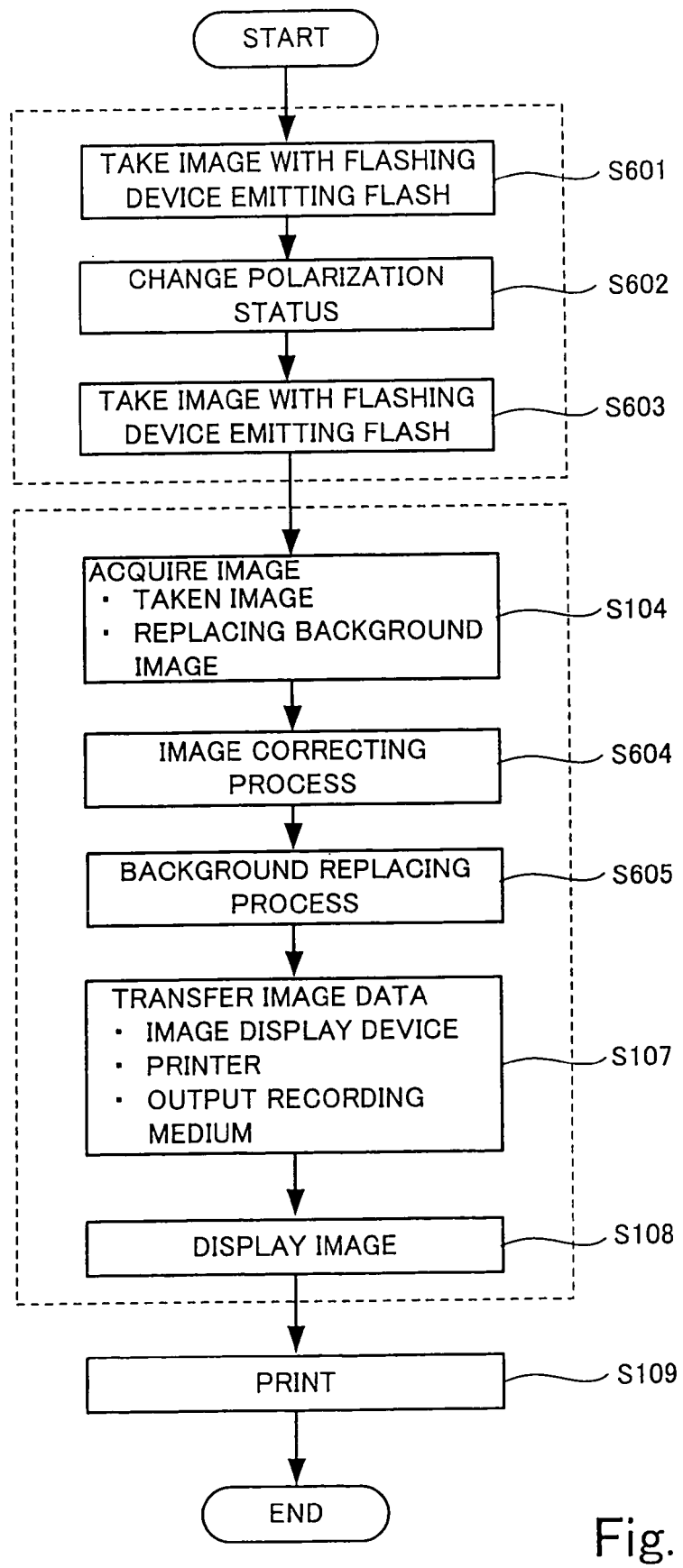
FIG. 63 is a flowchart showing the flow of the operation performed by the image-taking system shown in FIG. 62.

FIG. 63 is a flowchart showing the flow of the operation performed by the image-taking system shown in FIG. 62.

In FIG. 63, the operations equivalent to the flowchart shown in FIG. 3 are assigned the same reference characters as in FIG. 3, and in the following description by referring to FIG. 63, the explanation of these operations is omitted.

In the operations shown by the flowchart in FIG. 63 is performed under a situation where the subject P, the digital camera 85 and the flashing device 84 are respectively arranged in the appropriate positions in the image-taking studio 90.

After a camera user presses a shutter button of the digital camera 85 after adjusting the focus, exposure, etc., the image-taking process is continuously performed twice on the subject P. In the first image-taking process, the flashing device 84 emits a flash in response to the flash instruction signal issued by the digital camera 85, and the image of the subject P is taken (step S601). In the first image-taking process (step S601), a flash is polarized in the first direction, and the background panel 86 softly reflects the flash, thereby taking a dark background of the subject P. In the second image-taking process, first the polarization plate 84a of the flashing device 84 is set to change a flash to the linear polarization in the second direction according to the polarization switch signal (step S602). Then, according to the flash instruction signal, the flashing device 84 emits a flash and the second image-taking process is performed (step S603). In the second image-taking process (step S603), the flash is polarized in the second direction, and the background panel 86 strongly reflects the flash, thereby taking a bright background of the subject P. That is, in the process in steps S601 to S603 shown in FIG. 55, two taken images having different background brightness levels can be obtained.

In the present embodiment, the image taking studio 90 which performs the above-mentioned image taking operations corresponds an example of the image-taking-condition creating section according to the present invention for creating plural (two according to the present embodiments) image-taking conditions by a flash emitted plural times (twice in the present embodiment) having different polarization states by the flashing device 84.

When two taken images different from each other in background brightness are obtained, the two taken images are passed to the personal computer 20 (step S104), and the same image correcting process is performed on the two taken images including the color correcting process as in the above-mentioned third and fourth embodiments (step S604).

Next, a background-replaced image is generated based on the two taken images corrected in the process in step 604 (step S605), and the generated background-replaced image is output.

Described below is the process performed in step S605, that is, the process of generating a background-replaced image according to the present embodiment.

First, examples of the two corrected taken images will be described below.

Figure 64:
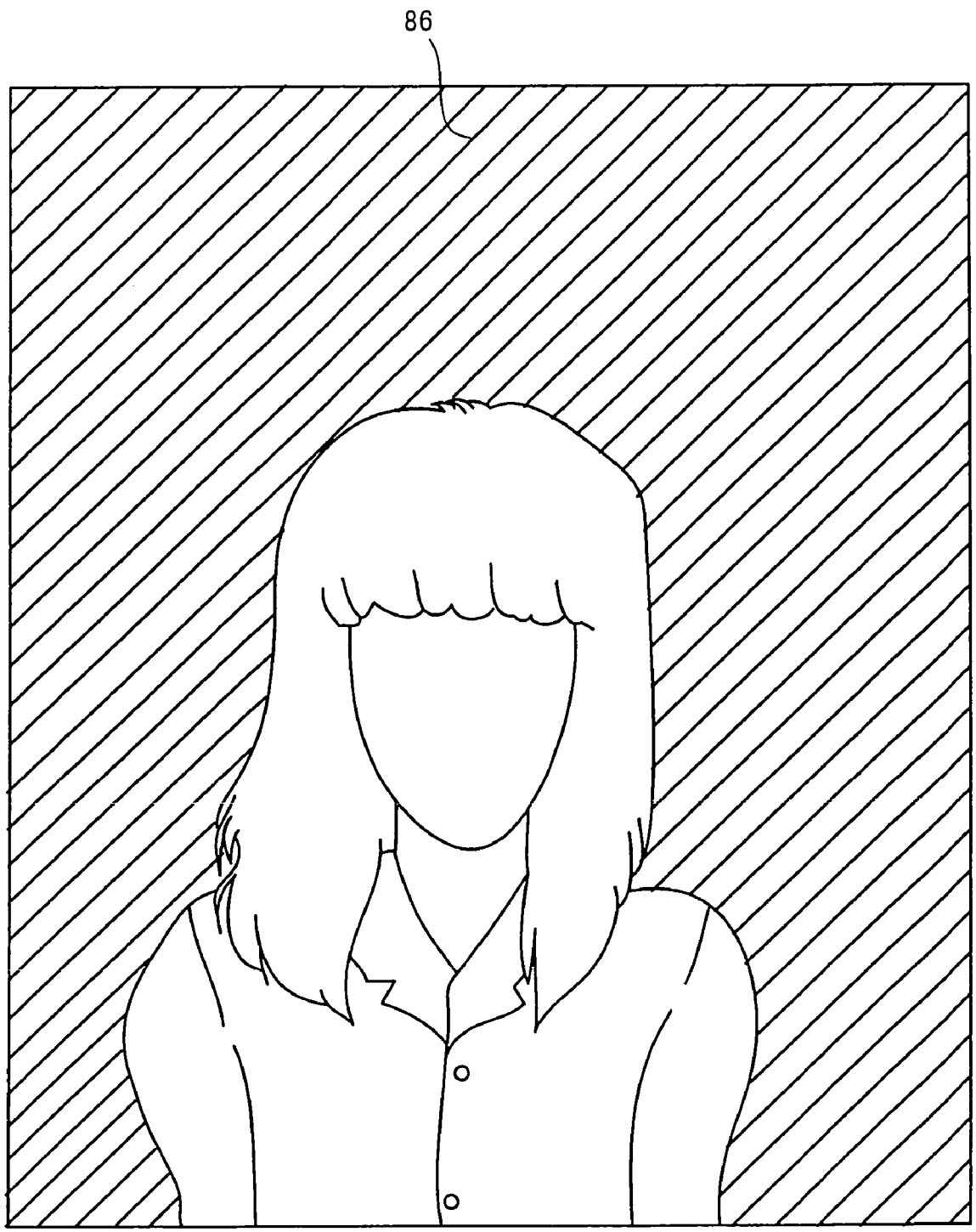
FIG. 64 is a diagram showing an example of a corrected taken image based on the first image-taking process.
Figure 65:
FIG. 65 is a diagram showing an example of a corrected taken image based on the second image-taking process.

FIG. 64 shows an example of a corrected taken image based on the first image-taking process. FIG. 65 shows an example of a corrected taken image based on the second image-taking process.

As shown in FIGS. 64 and 65, the two taken images are substantially the same except the brightness of the background panel 86 taken as the background. That is, in the first corrected taken image (hereinafter referred to as a first taken image), the background panel 86 softly reflects the flash in the image-taking process. Therefore, the background is dark. In the second corrected taken image (hereinafter referred to as a second taken image), the background panel 86 strongly reflects the flash in the image-taking process. Therefore, the background is bright.

In the process of generating a background-replaced image in the present embodiment, a histogram about the amount of variance of brightness of each pixel forming part of the first taken image relative to the pixel at the corresponding position in the second taken image is generated.

Figure 66:
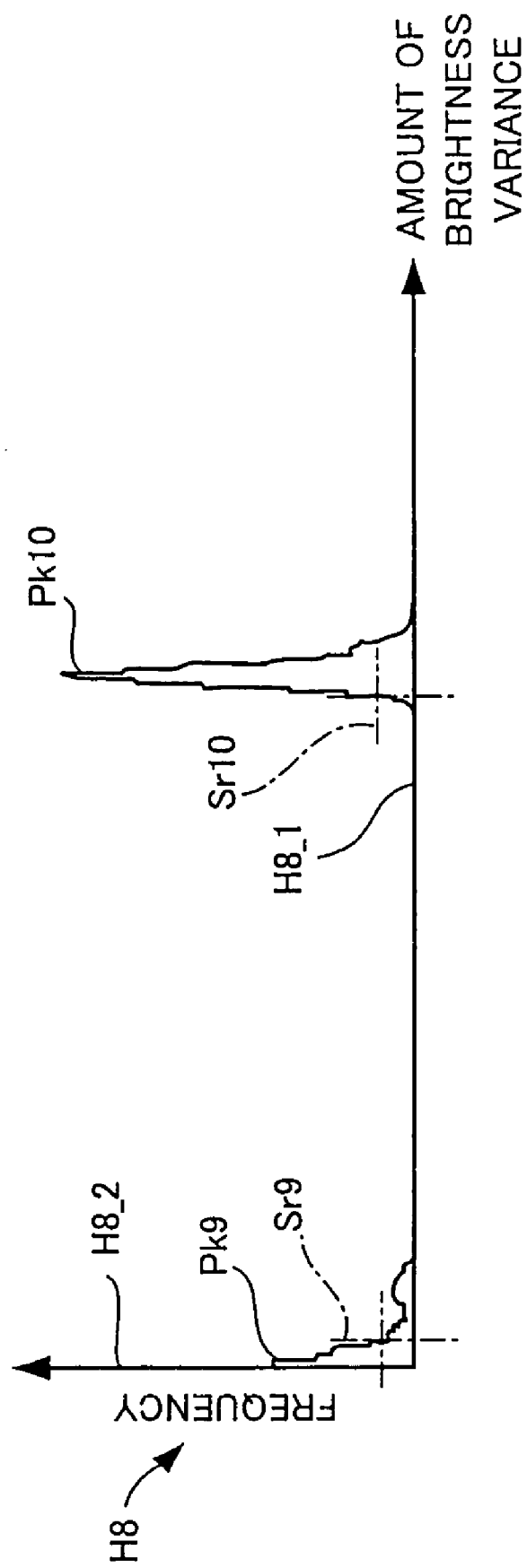
FIG. 66 is a diagram showing an example of the histogram generated in the process of generating a background-replaced image in the fourth embodiment of the present invention.

FIG. 66 shows an example of the histogram generated in the process of generating the background-replaced image in the sixth embodiment of the present invention.

In the present embodiment, the amount of variance of brightness of each pixel forming part of the first taken image relative to the pixel in the corresponding position in the second taken image is adopted as the amount of variance of brightness. FIG. 66 is a histogram H8 showing the amount of variance of brightness of each pixel forming part of the first taken image allocated to a number of ranges, and showing the variance of brightness indicated by the frequency about how many pixels are allocated to each range. In the histogram H8 showing the variance of brightness, the horizontal axis H8_1 indicates the amount of variance of brightness, and the vertical axis H8_2 indicates the frequency.

In the process of generating the background-replaced image according to the present embodiment, the following two thresholds are calculated based on each of the two peaks Pk9 and Pk10 in the histogram H8 of the variance of brightness. As shown in FIG. 66, the first threshold Sr9 as the upper limit of the amount of variance of brightness indicating the frequency equal to or higher than a predetermined value is calculated at the peak Pk9 from the peak Pk9 on the left of the drawing indicating a small amount of variance of brightness. The second threshold Sr10 as the lower limit of the amount of variance of brightness indicating the frequency equal to or higher than a predetermined value is calculated at the peak Pk10 from the peak Pk10 on the right of the drawing indicating a large amount of variance of brightness.

In the process of generating a background-replaced image, an initial subject mask for definition of the area of the pixel having the amount of variance of brightness equal to or lower than the first threshold Sr9 is set in the first taken image, and an initial background mask for definition of the area of the pixel having the amount of variance of brightness equal to or higher than the second threshold Sr10 is set.

In the present embodiment, when two initial masks are set, then a background-replaced image is generated using these two initial masks, but the subsequent processes performed using these two initial masks are similar to those performed using the two initial masks in the first embodiment. Therefore, the explanation of the processes is omitted.

The generated background-replaced image is displayed on the display screen 220a, and at least one of printing on the printer 30 based on the image data indicating the background-replaced image and writing the image data to the output storage medium desired by a client is performed.

In the image-taking system 6 according to the sixth embodiment of the present invention described above by referring to FIGS. 62 to 66, a background-replaced image in which the background in the taken image is naturally replaced with a desired background can be generated as in the image-taking system 1 according to the first embodiment.

Described below is the seventh embodiment of the present invention.

The seventh embodiment is partly different from the first embodiment in the configuration of the image-taking studio. Described below are the differences from the first embodiment, and the identical points are omitted.

Figure 67:
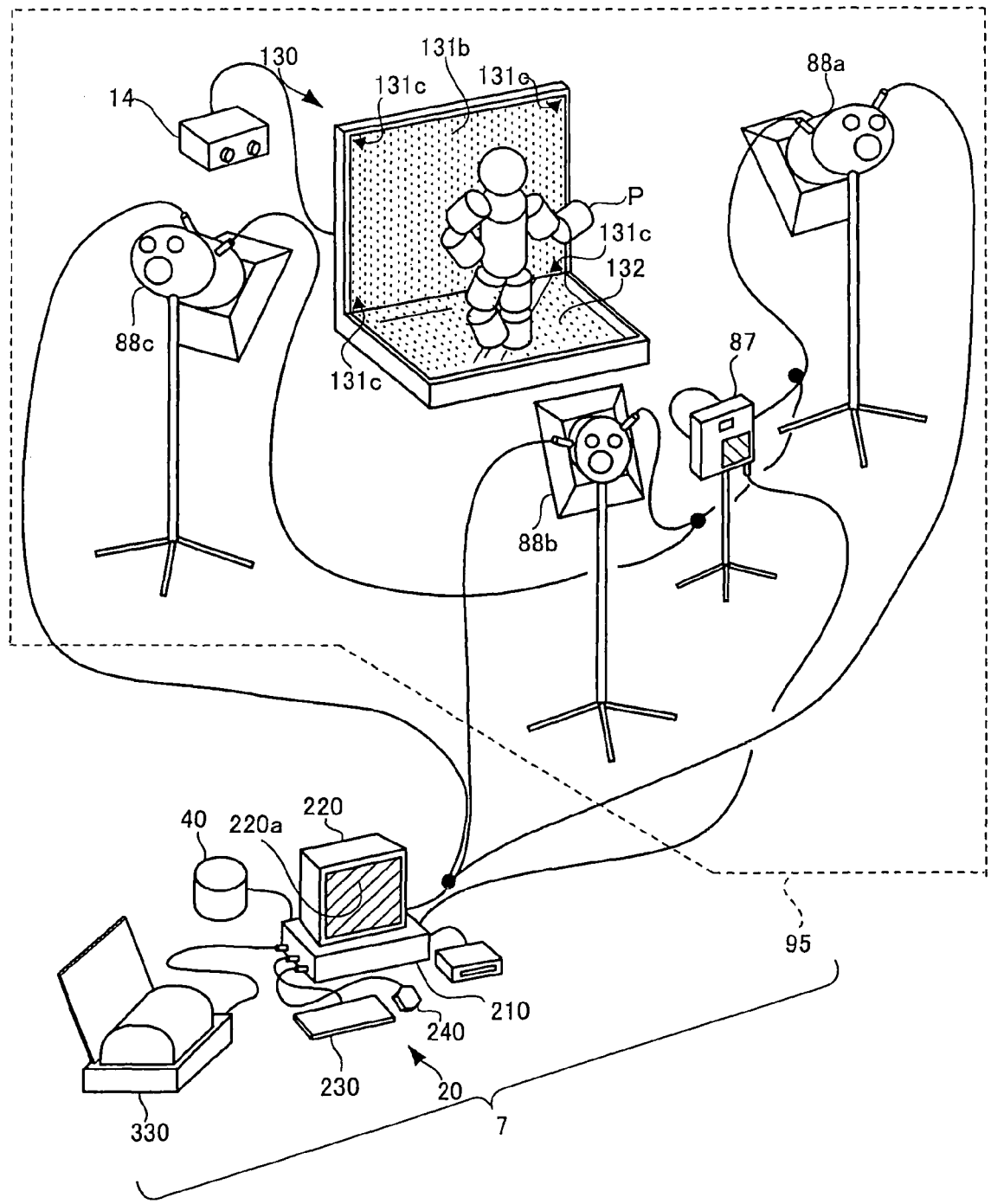
FIG. 67 is a diagram showing a seventh embodiment of the image-taking system according to the present invention.

FIG. 67 shows the seventh embodiment of the image-taking system according to the present invention.

In FIG. 67, the components equivalent to the first embodiment shown in FIG. 1 are assigned the same reference characters as in FIG. 1, and in the following description by referring to FIG. 67, the explanation of these components is omitted.

Described below is the difference between the first embodiment and the present embodiment, that is, a flashing devices 88a, 88b and 88c, a digital camera 87 of an image taking studio 95 in an image-taking system 7 shown in FIG. 67.

The image-taking studio 95 includes three flashing devices 88a, 88b and 88c capable of changing the amount of light therefrom. These three flashing devices 88a, 88b and 88c are connected to a personal computer 20. The combination of the three flashing devices 88a, 88b and 88c corresponds to an example of the "flashing device" according to the present invention.

In the present embodiment, plural backgrounds to be used as a replacing background are stored in a server 40, and optical information representing conditions such as the direction and brightness of light emitted to a subject is attached to each of the stored backgrounds. The optical information corresponds to an example of the "optical information" according to the present invention.

For example, to a background in which light coming from the right side of an image, optical information representing a condition that indicates a subject needs to be irradiated with light from the right side is attached. Also, for example, to a dark background with sunset or cloudy sky, optical information representing a condition that indicates a subject needs to be irradiated with low-intensity light is attached.

In the personal computer 20, when another background desired by a client is determined as a background to replace the current background in the taken image, emission conditions such as the on/off state and the amount of light of each of the three flashing devices 88a, 88b and 88c are so determined as to realize a maximum of a condition represented by optical information attached to the determined replacing background. The personal computer 20 then provides each of the flashing devices with an instruction signal for instructing them to each emit a flash based on the amount of light and the on/off state indicated by the determined emission conditions.

The digital camera 87 continuously performs the image-taking process twice when a camera user presses the shutter button once as in the first embodiment. At this time, the digital camera 87 issues to each of the flashing devices a flash instruction signal instructing them to emit a flash each time the image-taking process is performed. Accordingly, the three flashing devices 88a, 88b and 88c each emit a flash at the first image-taking process based on the on/off state and the amount of light ordered by the personal computer 20. As a result, there is obtained at the first image-taking process a normally-illuminated taken image in which a subject is irradiated with a flash according to the replacing background. Subsequently, by use of the obtained normally-illuminated taken image, there is generated a background-replaced image in which a subject is irradiated with natural light suitable for the background.

In the above description, as one embodiment of the image-taking system of the present invention, there has been described the image-taking system 1 in which the flashing device 12 emits a flash in the first image-taking process, and the flashing device 12 is turned off in the second image-taking process, thereby continuously taking a normally-illuminated taken image and a counter-illuminated taken image in this order. However, the present invention is not limited to this application. That is, for example, the normally-illuminated taken image and the counter-illuminated taken image can be continuously taken in the reverse order. The image-taking system in this mode can be constituted by mounting a cutoff circuit, etc. on a transmission line of an instruction signal between the digital camera and the flashing device in the embodiment for cutting off an instruction signal in the first image-taking process and for passing in the second image-taking process which instructs the flashing device to emit a flash, and is issued from a digital camera to a flashing device each time an image-taking process is performed, In the description above, the flashing device 12 as an example of the flashing device according to the present invention takes some time in charging until next emission can be realized after preceding emission, and emits a flash only in the first image-taking process when the process is continuously performed twice. However, the present invention is not limited to this application. That is, the flashing device according to the present invention can be a high speed flashing device capable of, for example, charging power within a very short time and emitting a flash twice when the image-taking process is continuously performed twice. When such a high-speed flashing device is used, the above-mentioned cutoff circuit, etc. is required to cut off an unnecessary instruction signal.

In the description above, the digital camera 11 is described as an example of the image-taking device according to the present invention, but the present invention is not limited to this application. That is, the image-taking device according to the present invention can be a film camera, etc. for taking an image on film. In this case, the taken image on the film is read by, for example, a film scanner, etc. as image data, and is provided for the personal computer 20 operating as a background replacement device.

In the description above, the digital camera 11 as an embodiment of the image-taking system according to the present invention is connected to the personal computer 20 operating as a background replacement device, and the taken image obtained by the digital camera 11 is passed to the personal computer 20 immediately after the image-taking process by the image-taking system 1. However the present invention is not limited to the application. The image-taking system according to the present invention can be realized by, for example, storing a taken image on a small storage medium in a digital camera, manually setting the small storage medium in a personal computer operating as a background replacement device, thereby passing the taken image to the personal computer, etc.

In the description above, an EL panel is described as an example of a "background panel having the function of changing colors" according to the present invention. However, the present invention is not limited to this application. That is, the "background panel having the function of changing colors" can be, for example, a panel light source, etc. formed by plural types of light sources having different light colors such as plural types of LEDs, fluorescent lamps, etc. having different light colors and a two-dimensional and equally dispersed arrangement covered with a dispersion plate for dispersing the light of each light source, etc. The panel light source can switch the types of light sources to change colors.

Furthermore, an EL panel having a dispersed EL element as a light source and an illumination panel having a fluorescent lamp as a light source are described as examples of the illumination devices according to the present invention. However, the present invention is not limited to the application. For example, the illumination device according to the present invention can use an LED, a cold cathode tube, etc. as a light source.

The background replacement device 700 for generating a histogram of a value G in a value R, a value G, and a value B for expressing the color of each pixel as a histogram of the brightness of each pixel forming part of a corrected counter-illuminated taken image is described as an example of the background replacement device according to the present invention. However, the present invention is not limited to this application. The background replacement device according to the present invention can generate a histogram about the value R or value B, or a histogram of the brightness of each pixel.

As an example of the background replacement device according to the present invention, there is described a device that generates a histogram of the amount of hue variance as an example of generating a histogram indicating an amount of color variance in each of pixels forming one of two taken images relative to pixels at the corresponding positions in the other taken image. However, the present invention is not limited to this application. The background replacement device according to the present invention can generate a histogram indicating an amount of variance of the value R, the value G, or the value B, as a histogram indicating the amount of color variance in each of pixels forming one of two taken images relative to pixels at the corresponding positions in the other taken image.

Furthermore, as an example of the background replacement device according to the present invention, there is described a device that generates a histogram of the amount of brightness variance as an example of a histogram indicating an amount of color variance in each of pixels forming one of two taken images relative to pixels at the corresponding positions in the other taken image. However, the present invention is not limited to this application. The background replacement device according to the present invention can generate a histogram indicating an amount of variance of the value R, the value G, or the value B, as a histogram indicating the amount of color variance in each of pixels forming one of two taken images relative to pixels at the corresponding positions in the other taken image.

What is claimed is:

1. An image-taking system, comprising:
    an image-taking device which takes an image of a subject;
    an image-taking-condition creating section which creates a plurality of image-taking conditions relating to light; and
    a background replacement device which acquires a plurality of images of the subject taken by the image-taking device under the respective plurality of image-taking conditions created by the image-taking-condition creating section, discriminates among a subject area, a background area and a boundary area in a taken image based on the acquired images, and replaces a background in the taken image with another background based on the three discriminated areas,
    wherein the image-taking-condition creating section comprises:
        a flashing device which emits a flash from the image-taking device side and illuminates the subject with the flash from the image-taking device side; and
        a background panel which is positioned opposite the image-taking device with the subject interposed between the image-taking device and the background panel, the background panel constituting a background to the subject,
    wherein the flashing device is capable of changing a polarization state of the flash, which is emitted from the flashing device and incident on the subject and the background panel, selectively among a plurality of predetermined polarization states,
    the background panel varies, when the background panel reflects the flash which is emitted from the flashing device and incident on the background panel, brightness of reflected light from the background panel depending on which of the plurality of predetermined polarization states is the polarization state of the flash incident on the background panel, and the image-taking-condition creating section creates the plurality of image-taking conditions corresponding to the plurality of predetermined polarization states, respectively by making the flashing device emit a plurality of flashes whose polarization states correspond to the plurality of predetermined polarization states, respectively, and wherein the background replacement device discriminates among the subject area, the background area and the boundary area based on an amount of brightness variance among the plurality of taken images which are taken by the image-taking device, and wherein the plurality of predetermined polarization states are a first predetermined polarization state, in which the flash emitted from the flashing device and incident on the subject and the background panel is polarized in a first predetermined direction, and a second predetermined polarization state, in which the flash emitted from the flashing device and incident on the subject and the background panel is polarized in a second predetermined direction, the second predetermined direction being orthogonal to the first predetermined direction, the background panel reflects the flash in the second predetermined polarization state, emitted from the flashing device and incident on the background panel, more strongly than the flash in the first predetermined polarization state, emitted from the flashing device and incident on the background panel, and the background replacement device discriminates among the subject area, the background area and the boundary area based on a difference between brightness of a first pixel, included in a first image which is taken by the image-taking device under the emission of the flash in the first predetermined polarization state by the flashing device, and brightness of a second pixel, included in a second image which is taken by the image-taking device under the emission of the flash in the second predetermined polarization state by the flashing device, a position of the first pixel in the first image being same as that of the second pixel in the second image.

2. The image-taking system according to claim 1, wherein the image-taking device takes the plurality of images of the subject by performing an image-taking process a plurality of times in a predetermined time.

3. The image-taking system according to claim 1, wherein the background panel extends from a side opposite the image-taking device to a bottom of the subject.

4. The image-taking system according to claim 1, wherein the background panel has a surface positioned opposite the image-taking device and illuminates the subject interposed between the image-taking device and the surface with light reflected from the surface, and the background panel comprises a marker indicating a range of the surface.

5. The image-taking system according to claim 1, wherein the background panel illuminates the subject with reflected light of brightness equal to or lower than brightness of a flash emitted by the flashing device.

6. An image-taking system, comprising:

an image-taking device which takes an image of a subject;

an image-taking-condition creating section which creates a plurality of image-taking conditions relating to light; and a background replacement device which acquires a plurality of images of the subject taken by the image-taking device under the respective plurality of image-taking conditions created by the image-taking-condition creating section, discriminates among a subject area, a background area and a boundary area in a taken image based on the acquired images, and replaces a background in the taken image with another background based on the three discriminated areas, wherein the image-taking-condition creating section comprises a background panel which is positioned opposite the image-taking device with the subject interposed between the image-taking device and the background panel, the background panel constituting a background to the subject, wherein the background panel is capable of changing a color of the background panel selectively among a plurality of predetermined colors whose hues are different among the plurality of predetermined colors and the image-taking-condition creating section creates the plurality of image-taking conditions corresponding to the plurality of predetermined colors, respectively by making the background panel change the color of the background panel among the plurality of predetermined colors, and the background replacement device discriminates among the subject area, the background area and the boundary area based on differences among hues of a plurality of pixels which are included in the plurality of images, respectively which are taken by the image-taking device, wherein a position of each of the plurality of pixels in each of the plurality of taken images is same among the plurality of pixels, and wherein the plurality of predetermined colors are red and blue, and the background replacement device discriminates among the subject area, the background area and the boundary area based on a difference between a hue of a first pixel, included in a first image which is taken by the image-taking device when the color of the background panel is red, and a hue of a second pixel, included in a second image which is taken by the image-taking device when the color of the background panel is blue, a position of the first pixel in the first image being same as that of the second pixel in the second image.

\* \* \* \* \*